United States Patent [19]
Frost

[11] 3,894,194
[45] July 8, 1975

[54] AUTOMATIC MOBILE RADIO TELEPHONE SYSTEM

[76] Inventor: Edward G. Frost, 12000 Old Georgetown Rd., Rockville, Md. 20852

[22] Filed: Feb. 16, 1973

[21] Appl. No.: 333,142

[52] U.S. Cl................... 179/41 A; 325/55; 343/176
[51] Int. Cl.$^2$.......................................... H04M 5/08
[58] Field of Search.......... 179/41 A, 7.1 R, 7.1 TP; 325/55, 64; 343/176

[56] References Cited

UNITED STATES PATENTS

| | | | |
|---|---|---|---|
| 2,803,744 | 8/1957 | Berger et al. | 325/55 |
| 3,351,714 | 11/1967 | Kunzelman et al. | 179/41 A |
| 3,513,264 | 5/1970 | Baer | 325/55 |
| 3,555,424 | 1/1971 | Malm | 179/41 A |
| 3,634,627 | 1/1972 | Velentini | 179/41 A |

*Primary Examiner*—Kathleen H. Claffy
*Assistant Examiner*—Gerald L. Brigance
*Attorney, Agent, or Firm*—Rose & Edell

[57] ABSTRACT

In a multi-channel radio telephone system, each mobile station is assigned a home channel for receiving calls but can initiate calls on any idle channel. Communication is normally in a duplex mode but automatically reverts to semi-duplex when a calling mobile initiates a call to a called mobile on the called mobile's home channel. Automatic subscriber ticketing is accomplished at the base station, and each channel communicates with the public telephone system via a respective dedicated line. A non-subscribing mobile attempting to initiate a call on the system is automatically connected to the base station operator for completion of the call, the caller's I.D. number being automatically displayed for the operator. When called, a mobile automatically returns a decode complete signal to the base station. If the decode complete signal is not received within a predetermined time interval, the call is terminated and the base station automatically proceeds to determine if the called mobile is busy or out-of-service and returns a corresponding signal to the calling party. The mobiles are adapted to operate in other systems wherein the normally assigned home channel is unavailable. In such cases the mobile automatically seeks a channel bearing a predetermined code which identifies that channel as an alternate home channel for the mobile.

45 Claims, 31 Drawing Figures

TERMINAL-TO-MOBILE SIGNALLING

MOBILE-TO-MOBILE ON SAME CHANNEL

AUTOMATIC MOBILE RADIO TELEPHONE SYSTEM

BACKGROUND OF THE INVENTION

The present invention relates to multiple channel radio telephone systems and, more particularly, to a flexible radio telephone system with complete two-way automatic dialing capabilities wherein subscriber metering is accomplished independently of the telephone system central office and which is capable of being integrated with similar systems located in diverse geographic areas.

In present day radio telephone systems, one or more base stations are employed to transmit and receive messages between a plurality of mobile stations, the transmission and reception occurring over predetermined communication channels. If the system is integrated as part of the local public telephone system, the base stations are connected by telephone line to a telephone system central office. Since most mobile stations are in actual use for relatively short periods of time, it is conventional to utilize fewer communication channels than there are mobile subscribers; the mobile stations thus share the communications channels in accordance with a pre-arranged scheme. For example, one such scheme assigns each channel to a different plurality of mobile stations and permits those mobile stations to receive and initiate calls only on that channel. This arrangement is essentially a party line system and suffers from the disadvantages of denying a mobile station access to the system, for both receiving and initiating calls, if that station's assigned channel is being used by another mobile station. In other words, at any given time a mobile station may encounter a busy condition on its assigned channel while other channels are not in use. Various arrangements have been proposed for overcoming this problem and optimizing channel utilization. Accordingly, in another prior art arrangement, each mobile station is capable of selecting one of a group of communications channels, such as by push-buttons, and an indication is provided at the mobile station to indicate when each channel is busy. This manual-selection arrangement, however, requires knowledge and effort on the part of the user above that required for ordinary telephone usage; in addition it enables one party to monitor the conversation of another.

Another prior art system avoids the aforementioned problems by coding one of the communication channels which is not busy. All mobile stations automatically lock on to the coded channel so that the next call initiated or received by a mobile station utilizes the coded channel. Once that coded channel is seized for use, the code is applied to another idle channel and all inactive mobile stations lock onto the new coded channel. This arrangement maximizes channel utilization by assuring that no mobile station is prevented from having access to the system as long as one or more channels is idle. The major disadvantage with this approach resides in the fact that switching between channels by the mobile stations requires a finite and significant time interval. During that time interval all inactive mobile stations are effectively out-of-service and, if called during this interval, return a busy signal to the calling station. Likewise, a mobile station attempting to initiate a call during the channel switching interval receives a busy signal which effectively blocks that station's access to the system.

It is therefore one object of the present invention to provide a radio telephone system arranged to permit a mobile station to initiate a call at any time one or more communication channels is idle.

Another problem in prior art radio telephone systems relates to compatibility between systems located in different geographical areas. For example, a mobile station which normally operates in conjunction with one base station is unable to automatically receive or initiate calls when located beyond the signal range of that base station but within the range of a base station serving another area. The major problem in this regard relates to billing of the mobile station. Specifically, if a mobile station were permitted to automatically initiate a call through a base station other than that to which it is assigned, this other base station would have no way of assuring that the mobile station would be properly billed for the call.

It is therefore another object of the present invention to provide a radio telephone system which affords mobile stations the capability of initiating and receiving calls in geographic areas covered by base stations other than that to which the mobile station is normally assigned.

Practical radio telephone systems now in use operate in a two-frequency base duplex mode whereby each channel includes one frequency for transmission from the base station to the mobile station and a second frequency for transmission from the mobile station to the base station. This two-frequency base duplex mode eliminates the need for push-to-talk operation and renders the system more realistically simulative of conventional telephone operation. A practical problem arises, however, in communication between two mobile stations. Specifically, since each mobile station communicates with the base station via a respective channel, mobile to mobile communication requires that two channels be tied up. This significantly reduces channel availability during mobile to mobile communication and increases the possibility that other mobile stations will be denied access to the system.

It is therefore another object of the present invention to provide a radio telephone system in which channel utilization is minimized during telephone calls between two mobile stations.

Metering of telephone calls initiated at mobile stations in radio telephone systems is generally performed at a central office of the public telephone system. Since no metering or billing computation equipment is present at the radio telephone base station, even calls between two mobile stations are metered at and billed from the public telephone system. This is disadvantageous to the proprietor of the radio telephone system whose costs are increased by virtue of this use of public telephone system services.

Is is therefore another object of the present invention to provide a radio telephone system in which metering of calls initiated by mobile stations is effected at the radio telephone base station independently of the public telephone system equipment.

Another problem in prior art radio telephone systems results when one or more mobile stations is out-of-service for some reason. A call to an out-of-service mobile station requires that a communication channel be tied up during the time that a ringing signal is transmitted to the out-of-service station; in some systems the channel is additionally tied up until and during transmission of a busy indication by the out-of-service station.

It is therefore another object of the present invention to provide a radio telephone system in which utilization of a communication channel is minimized during calls made to an out-of-service mobile station.

SUMMARY OF THE INVENTION

In accordance with one aspect of the present invention each mobile station in a radio telephone system is assigned one of plural communication channels on which that mobile station can receive calls. In initiating a call, however, a mobile station may seize any idle channel. Thus, if a mobile station's home channel is in use, that station is prevented from receiving calls but is not denied access to the system for purposes of initiating a call. In addition, if a mobile station enters a geographic area covered by a base station other than that to which the mobile station is assigned, the mobile station automatically locks on to the same home channel to which it is normally assigned. If that channel is not available in the new area, the mobile station automatically searches for a special code appearing on one of the other channels and temporarily locks onto that channel as its home channel.

According to another aspect of the present invention communication reverts to a semi-duplex mode employing only a single channel if, when one mobile station calls another mobile station, the calling station seizes the home channel of the called station. This feature not only minimizes channel utilization but also avoids the anomaly of preventing one mobile station, upon seizing the home channel of a second mobile station, from being unable to call that second station because the second station's home channel has been rendered busy by the calling station.

According to still another aspect of the present invention a base station in a radio telephone system is provided with a complete automatic metering capability which permits the radio telephone subscribers to be billed independently of the public telephone system. In this arrangement, each channel appears to the public telephone system as an individual subscriber line. The proprietor of the radio telephone system is therefore billed by the public telephone system on the basis of telephone line utilization time, irrespective of which mobile stations are using the lines. The subscribers in turn are billed by the radio telephone system proprietor on the basis of each subscriber's use of the radio telephone system.

In accordance with another aspect of the present invention, automatic intervention by a base station operator occurs when a mobile station, not assigned to the base station, attempts to utilize the base station to make a call. An identification number of such mobile station is automatically displayed for the base station operator in order that the assigned base station of the calling mobile station may be checked for purposes of billing. This arrangement permits mobiles from other areas to utilize the system and still be billed appropriately from their home base.

In accordance with still another aspect of the present invention, each operable mobile station automatically decodes identification signals it receives on its home channel. If the identification signal corresponds to that assigned to the mobile station, indicating that the mobile station is being called, a "decode complete" indication is returned to the base station to indicate that the mobile station equipment is in service. If the decode indication signal is not received at the base station within a predetermined time interval, the home channel of the called mobile station is released and an out-of-service signal is returned to the calling station. If a called, in-service mobile station is party to a call on other than its home channel, a busy signal is returned to the calling station.

In addition to the aforementioned objects and advantages of the present invention, it is still another object of the present invention to provide a radio telephone system capable of being readily integrated into the public telephone system, yet which is operable independently of the public telephone system for purposes of calls between mobile subscribers and for billing such calls.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

General Description of System

The present invention is directed to a radio telephone communication system for establishing communication lines between a plurality of mobile subscriber stations and a conventional public telephone system via a predetermined number of separate radio channels. In addition the system is capable of establishing communication between the mobile subscriber stations themselves. The system in accordance with the invention may comprise one or more base radio stations, each being interconnected via central office terminal equipment to the truck lines of the public telephone system. Each base station serves a relatively large number of mobile subscriber stations which are adapted to initiate and receive communications via radio channels linking the mobile stations with the base station. The base station and each of the mobile stations are preferably capable of two-way, i.e. duplex, operation in order that signals may be transmitted simultaneously in both directions over any channel. Any conventional multiple channel transmitting and receiving method may be employed; for example, each channel may include two frequencies, one for transmission from the mobile station to the base station and the other for transmission in the opposite direction. Another alternative for providing duplex transmission would be subcarrier frequency division multiplex operation. In any event, the outgoing or transmitting communication link from the base station should be separate from the receiving communication link at the base station. By keeping the transmitting and receiving communication links separate, a complete two-way or duplex communication system is assured.

Figure 1:
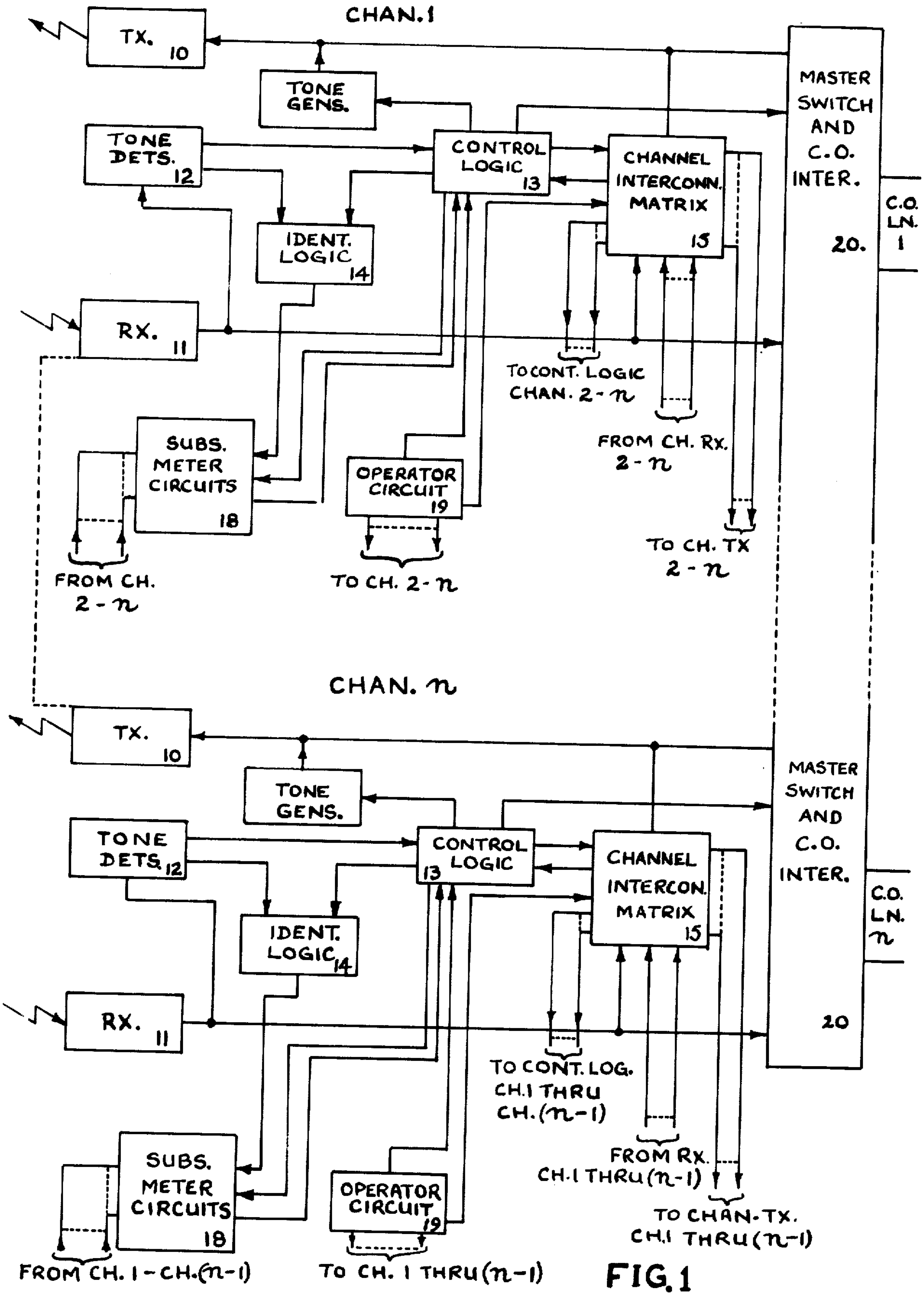
FIG. 1 is a functional block diagram of the base station of a radio telephone system according to the present invention.

Referring specifically to FIG. 1 of the accompanying drawings, there is illustrated a functional block diagram of a base station for a radio telephone system according to the present invention. The base station includes N identical channel circuits of which only the circuits for channels 1 and N are shown in detail, subscriber metering circuits 18 which are common to all the channel circuits, an operator circuit 19 capable of being connected to any channel circuit, and a master switch and central office interface 20 which selectively connects the channel circuits to respective central office telephone lines. N individual telephone lines, each associated with a respective radio telephone channel, provide the only connection between the public telephone system and the radio telephone system of the present invention. The central office lines treat their associated channel as individual public telephone subscribers and billing is computed at the central office on the basis of the time utilized by a channel initiating a call via its central office line. The logic for operatively connecting a channel circuit to its associated central office line is wholly contained within the radio telephone system.

Each channel circuit at the base station includes a transmitter 10 and receiver 11. Transmitter 10 is responsible for transmitting control and information signals from the base station to mobile stations utilizing the channel. Likewise receiver 11 receives information and control signals from mobile stations utilizing the channel. Control tones received by receiver 11 are detected by a tone detector 12 which apply corresponding control signals to control logic circuitry 13 and identification logic circuitry 14. Control logic 13 is responsible for determining when a call has been initiated, received and terminated on its channel and for providing control signals to effect system operation consistent with channel activity. Identification logic 14 is responsible for identifying the mobile station which initiates a call on its channel and enabling the meter circuit for that mobile station.

A channel interconnection matrix 15 in each channel circuit is responsible for interconnecting the various channel circuits when calls are made between two mobile stations. The channel interconnection matrix 15 both receives control signals from and applies control signals to control logic circuitry 13. The channel interconnection matrix 15 illustrated for channel 1 includes N identical circuits, one for each channel. Likewise, the channel interconnection matrix in each channel circuit includes N identical circuits. When a mobile station utilizes channel 1 to call another mobile station having channel N as its home channel, the portion of the channel 1 interconnection matrix 15 allocated to channel N is activated; all other portions of the channel 1 interconnection matrix, and all portions of the channel N interconnection matrix are automatically "busied out" by virtue of removal of the marker signal from these channels. The two activated circuits cooperate to interconnect the two mobile subscriber stations without the necessity of intervention by the public telephone system central office.

The master switch and central office interface unit 20 is operative in response to control logic 13 to connect the channel transmitter 10 and receiver 11 to its associated central office line. In addition, unit 20 includes appropriate interface circuitry to assure that the interface between the public telephone system and the radio telephone system meets the telephone company specifications.

The subscriber metering circuits 18 include a meter and appropriate circuitry for each subscriber of the radio telephone system. In addition automatic print out and storage of billing information is provided. When a call is initiated at a mobile station, the identity of the station is determined by the identidication logic 14 which activates the meter circuit for the identified station. If a meter circuit is properly actuated an indication is returned to the control logic 13 which effects completion of the call. If proper meter actuation is not recognized, the call is automatically reverted to the base station operator who may complete the call for the calling mobile station.

Operator circuit 19 is capable of being selectively connected to any channel and to any central office line servicing the radio telephone system. A mobile station may employ the operator to place calls if automatic dialing is not possible or desirable. In addition, as described above, a call initiated by a mobile station having no meter will be automatically reverted to the operator. The operator is provided with a display which automatically indicates the identification number of a mobile station with which the operator is in communication.

Before proceeding with a more detailed description of the invention, it is important to set forth certain conventions, formats, and design approaches employed in the system. To begin with, in the description which follows, the binary logic convention employed utilizes a relatively positive signal for binary one and a relatively negative signal for binary zero. This of course is a design choice and is not of itself important. Standard TTL logic elements are employed throughout unless otherwise specified, and both wired-OR and diode OR gates are used in various circuits. Any conventional approach to telephone system signal format may be employed; in this description supervisory tones are employed for the following purposes:

| | |
|---|---|
| Channel marker | 1633 Hz |
| Start-stop Pulses (ID) | 1209 + 941 Hz |
| End of Call | 1209 + 941 Hz |
| Reconfigure | 411 Hz |
| Home Channel Coding | 2900 Hz |
| Busy Tone | 520 Hz intermittent 500 ms on, 500 ms off. |
| Out of Service Tone | 520 Hz intermittent 200 mx on, 100 ms off. |

In addition, while impulse signalling is utilized in the present system, dual-tone multi-frequency signalling (e.g. — standard Touchtone) may be utilized. In fact, for automatic identification purposes, the dual-tone approach is employed.

Further, in order to facilitate understanding of the invention, the detailed description which follows, unless otherwise specified, refers to only one base station channel circuit (channel 1) and its relationship to the mobile stations, the central office, and other base station channel circuits. It is to be understood, therefore, that each circuit described has a counterpart in each of the other base station channel circuits.

Finally, reference to "public telephone systems" stations is intended to mean the conventional land base telephone stations, either privately operated systems or systems serviced by the local public utility, and stations which can only be reached through such system.

Figure 2:
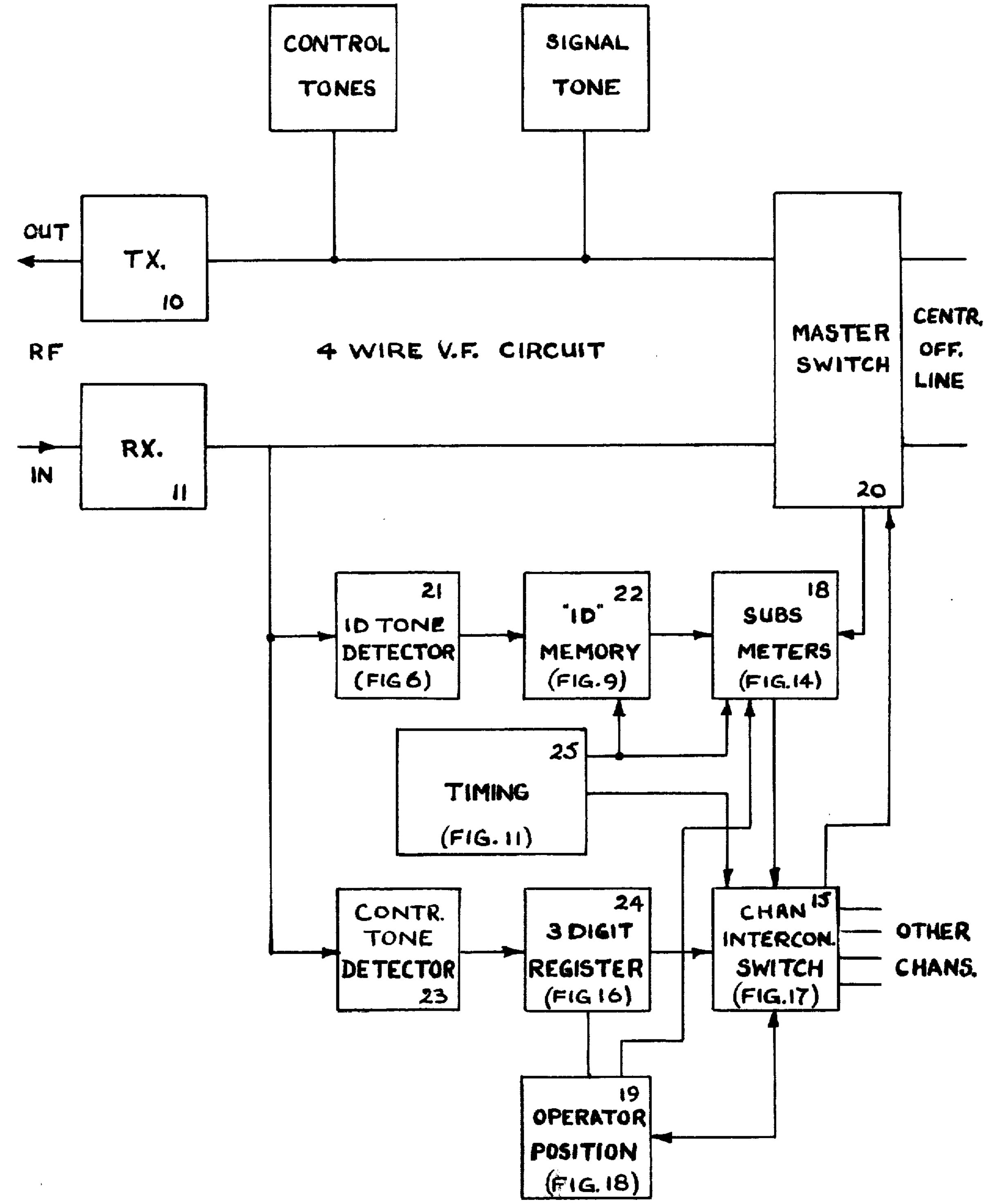
FIG. 2 is a functional block diagram of a single channel of the system of the present invention, presented in somewhat greater detail than in FIG. 1.

Referring specifically to FIG. 2 of the accompanying drawings there is illustrated a somewhat more detailed block diagram of a single channel circuit located at the base station of the radio telephone system of the present invention. For present purposes it shall be considered that the circuitry illustrated in FIG. 2 and in other figures, unless otherwise specified, refers to channel 1. In addition, wherever possible, circuits represented by blocks in FIG. 2 and 4 include parenthesized designations of the figure number in which a detailed schematic of the circuit may be found.

Figure 29:
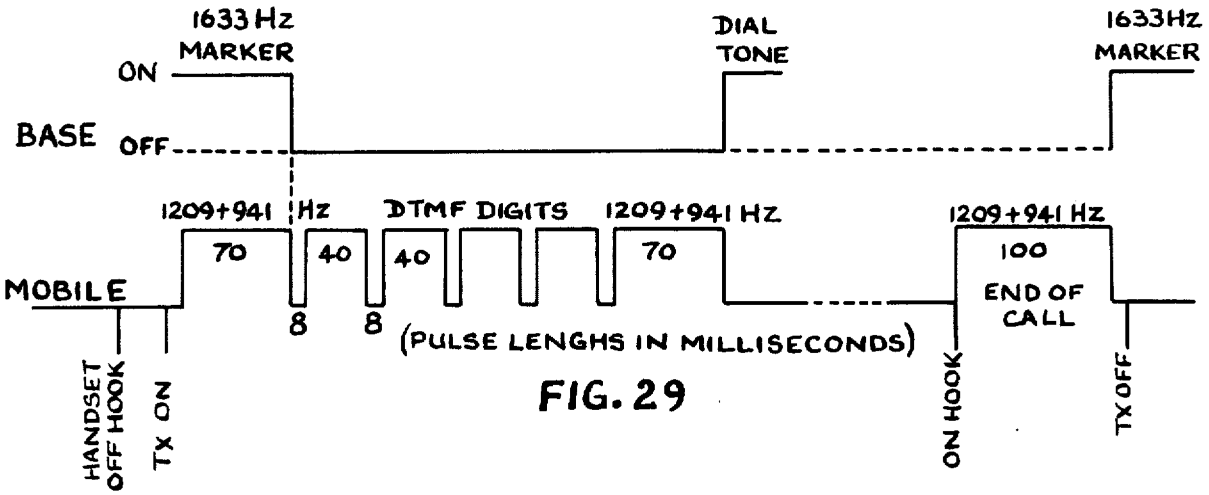
FIG. 29 is a timing diagram illustrating the mobile identification sequence according to the present invention.

As illustrated in FIG. 2 the base station channel circuit includes an I.D. tone detector 21 which is primarily responsible for decoding the dual-tone multi-frequency identification signals which are automatically transmitted to the base station from a mobile station when the mobile station goes "off-hook". Specifically, if channel 1 is idle the channel marker (1633 Hz tone) appears on the channel as best illustrated in the timing diagram of FIG. 29. When a mobile station hand set is taken off hook and seizes channel 1, the mobile station generates a start pulse comprising the dual tones of 1209 Hz + 941 Hz, the start pulse persisting for 70 milliseconds. When the start pulse is received at the base station, in a manner described subsequently in relation to FIG. 4, the control logic removes the 1633 Hz channel marker indicating that the channel has been seized. Immediately thereafter the mobile station transmits four 40 millisecond pulses representing the identification number of that mobile station. These identification pulses are spaced by 8 milliseconds and are followed by a 70 millisecond stop pulse. The I.D. pulses are in dual-tone multi-frequency format and are decoded by the I.D. tone detector 21 of FIG. 2 which initiates a mobile identification operation. Upon identifying the mobile station initiating a call on the channel, the I.D. tone detector 21 stores the identification of the mobile station in the I.D. memory 22 which in turn primes the appropriate subscriber meter in the subscriber meter circuits 18.

Assuming for a moment that a call has been made by a mobile station, at the end of the call the mobile station hand set is replaced on hook which automatically initiates an end-of-call pulse of 100 milliseconds duration and comprising the 1209 + 941 Hz tones. After generating the end-of-call pulse the transmitter at the mobile station automatically switches off. Receipt of the end-of-call pulse at the base station results in the channel marker being switched on again to indicate that channel 1 is idle.

The four pulse I.D. sequence described above and illustrated in FIG. 29 is not considered limiting on the present invention in that a wide variety of identification formats are possible. For purposes of the system described herein, the four digits represented by the four I.D. pulses constitute the last four digits of the mobile station telephone number. In this regard the telephone number of the mobile subscriber consists of seven (or more) digits. The first digit is the system access digit which signifies the radio telephone system. The second and third digits are channel routing digits which identify respective channels and their corresponding central office lines. The final four digits, as described above, represent individual mobile stations subscribing to the radio telephone system. The final four digits are the only digits transmitted from the base station to the mobile station when that mobile station is being called; likewise, when a mobile station identifies itself, it transmits only its unique four digit identification to the base station.

It should be mentioned at this point that completely automatic two way dialing is possible with the present system. Dialing a mobile station directly from a public telephone system is dependent upon either the use of dual-tone multi-frequency signalling or, in the case of dial impulse signalling, the digit-repeat facility of the connecting exchange. In the system as disclosed, two-way dialing is performed by impulse signalling, although modification to dual-tone multi-frequency signalling is clearly an alternative. In this example two separate tone frequencies are utilized in signalling: 2805 Hz from base to mobile; and 1500 Hz from mobile to base. Other common signalling frequencies may be used, of course, such as frequency shift signalling, etc.

Figure 30:
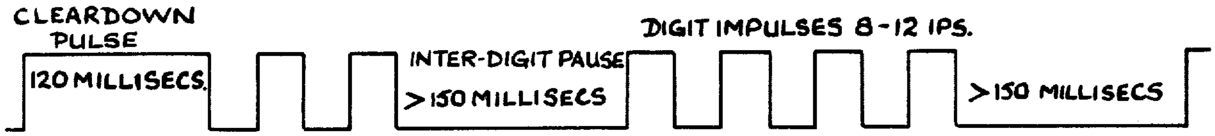
FIG. 30 is a timing diagram illustrating the terminal to mobile signalling sequence according to the present invention.

Base station to mobile station signalling is graphically illustrated in FIG. 30. A 120 millisecond clear down pulse is transmitted by the base station prior to transmitting the four digit impulse trains identifying the mobile station being called. This clear down pulse is automatically inserted by the base station in the inter-digit pause in the impulse train and serves to clear the mobile station decoders of any spurious pulses counted as a result of noise. As illustrated in FIG. 30, each digit transmitted from the base station to a called mobile station comprises a series of impulses of 2805 Hz tone, and successive digit impulse series are separated by an inter-digit pause of at least 150 milliseconds. If dual-tone multi-frequency signalling between base station and mobile station is to be employed, each series of impulses representing a digit would of course be replaced by a single pulse consisting of two tones corresponding to the digit being transmitted.

In order for a mobile station to obtain access to the system for various purposes, the access numbers listed in Table 1 must first be dialed:

TABLE 1

| | |
|---|---|
| Operator | 0 |
| Central Office | 9, wait for dial tone, then dial number |
| Mobile station to mobile station | 7, plus two channel routing digits followed by four digit identification of called mobile station. |

Returning again to FIG. 2, and assuming a mobile station to be instituting a call to a public telephone company station, automatic identification of the calling mobile station proceeds in the manner described above. If a calling mobile station has a meter present in the subscriber meter circuits 18, dial tone is returned by the base station to the mobile station in the manner described above in relation to FIG. 29. The mobile station subscriber then dials 9 for access to the central office line associated with channel 1. The control tone detector circuit 23 detects the 1500 Hz tone pulses and supplies nine impulses to the three-digit register 24. The primary function of the three-digit resister 24, as its name implies, is to decode the first three digits dialed by a mobile station utilizing the channel. In addition, the three-digit register recognizes the access digit, in this case 9, dialed by the mobile station for the purpose of indicating to the channel interconnection matrix switch 15 whether or not a mobile-to-mobile call has been initiated and to the operator circuit 19 whether or not a call for operator assistance has been made. When an access digit 9 is received and decoded by three-digit register 24, channel interconnection matrix switch 15 and operator circuit 19 are disabled and the central office line of channel 1 is seized. Dial tone is then returned to the mobile station from the central office, permitting the mobile station to dial the desired number. When the called station goes off hook, reversed battery supervision signalling is returned from the central office to initiate metering at the calling mobile station meter.

Figure 3:
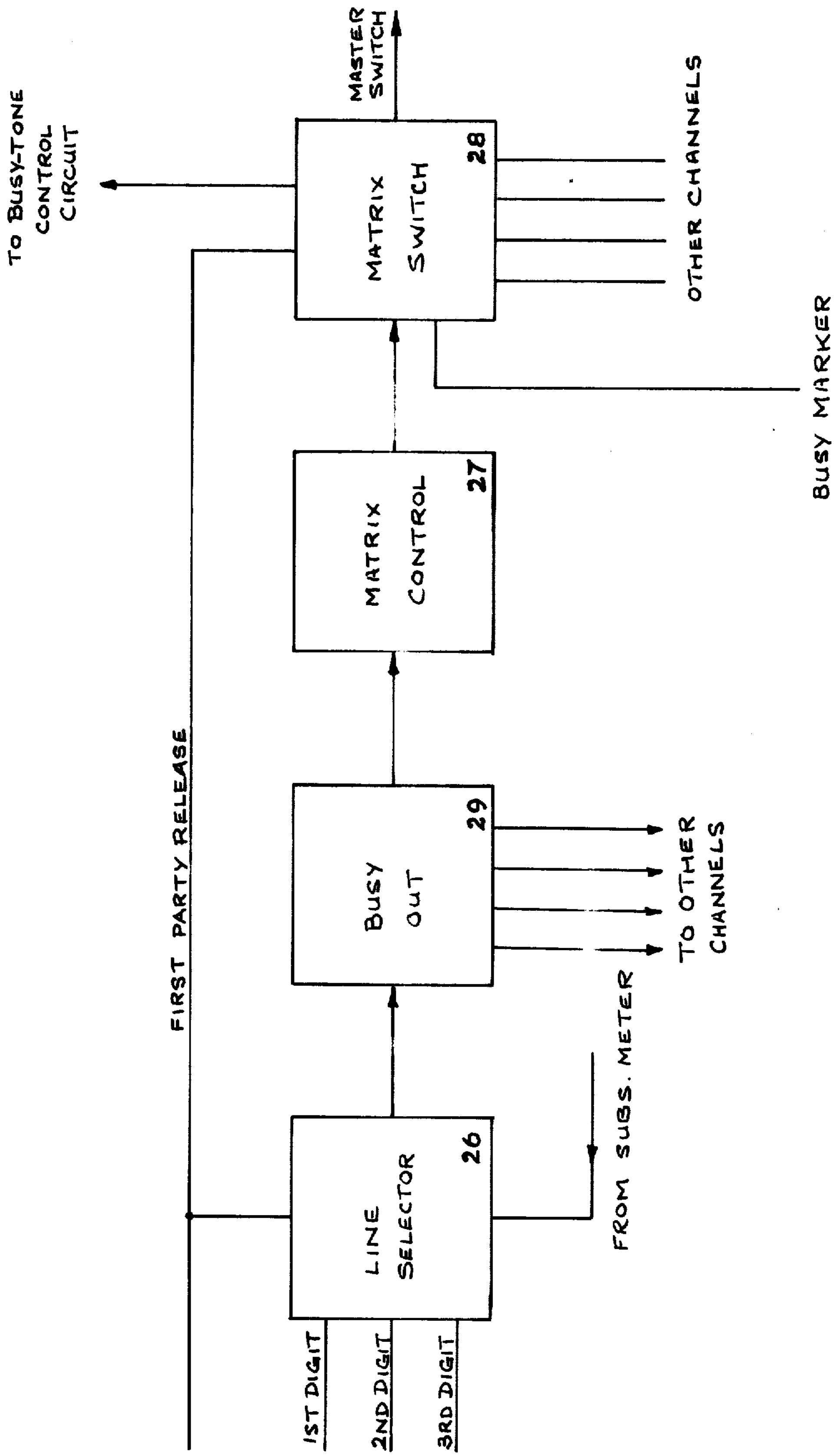
FIG. 3 is a block diagram of the channel interconnection matrix circuit of the present invention.

In the case of a call from one mobile station to another mobile station, the operation of seizing the channel, automatic identification of the calling mobile station, meter preparation, and return of dial tone proceeds in the same manner as described above for a mobile station to public telephone station call. Upon receiving the dial tone from the base station the mobile station dials 7 which is decoded by the three-digit register 24 in FIG. 2. The three-digit register responds by preparing the appropriate mobile station-to-mobile station interconnection in the channel interconnection matrix switch 15. This mobile to mobile preparation is illustrated in somewhat greater detail in FIG. 3 of the accompanying drawings. Specifically, when the first digit of the called number, as decoded by three-digit register 24, is 7, the line selector circuit 26 primes all sections of the matrix switch for channel 1. As mentioned previously in relation to FIG. 1, the matrix switch includes N identical circuits, each for connecting channel 1 to one of the other N-1 channels. Thus when a 7 is dialed as the first digit by a mobile station calling on channel 1, all of the identical matrix sections in the channel 1 matrix switch are primed to await an indication as to which of these N sections is to be enabled to permit communication between channel 1 and another channel. This indication as to which channel is to be placed in communication with channel 1 is present in the second and third digits dialed by the mobile station initiating the call. As described above these second and third digits designate the home channel, or channel on which a call may be received, for the mobile station being called. When the second and third digits of the called number are decoded by the three-digit register 24, the line selector circuitry 26 and appropriate matrix control portion 27 are enabled. If the home channel of the called mobile station is free (i.e. — not busy), the corresponding channel section for all other channel circuit matrices are busied out; in other words, if the home channel of the called subscriber is channel N, the matrix section for channel N in the base station circuit for every channel receives a busy signal which prevents channel N from being accessed by the other channels. In addition, the channel N section in matrix switch 28 is enabled to permit communication between channel 1 and channel N to proceed. The idle channel marker on channel N is then removed and the final four digits, identifying the called mobile station, are dialed from the calling mobile station.

Inter-channel switching takes place within a period of a few microseconds, and, upon removal of the idle channel marker tone, a 120 millisecond clear down pulse is transmitted by the base station to the mobile station as illustrated in FIG. 30. This entire sequence readily fits into the time period of the inter-digit pause which, as described above, is at least 150 milliseconds in duration.

Transmission of the digit impulses to the called subscriber is effected on channel N, assumed herein to be the home channel of the called mobile station. For this purpose, reference is made to FIG. 4 of the accompanying drawings which during the present discussion will be considered as representing circuitry in the base station channel circuit for the called channel (N). The four identification digits transmitted to the called mobile station are counted by the four-digit counter 31 in FIG. 4. In addition a 300 millisecond timer 32 is started. If the called mobile station does not return a decode complete pulse to the base station within 300 milliseconds of the transmission of the four-digit identification code, either out-of-service tone or busy tone is returned to the calling mobile station to indicate that the called mobile station is busy or out-of-service; these conditions are distinguished as described below. If the decode complete pulse is received within the 300 millisecond period, control pulse detector 23 indicates this to the 300 millisecond timer, which is then disabled, and ringing tone is returned to the calling mobile station.

Figure 31:
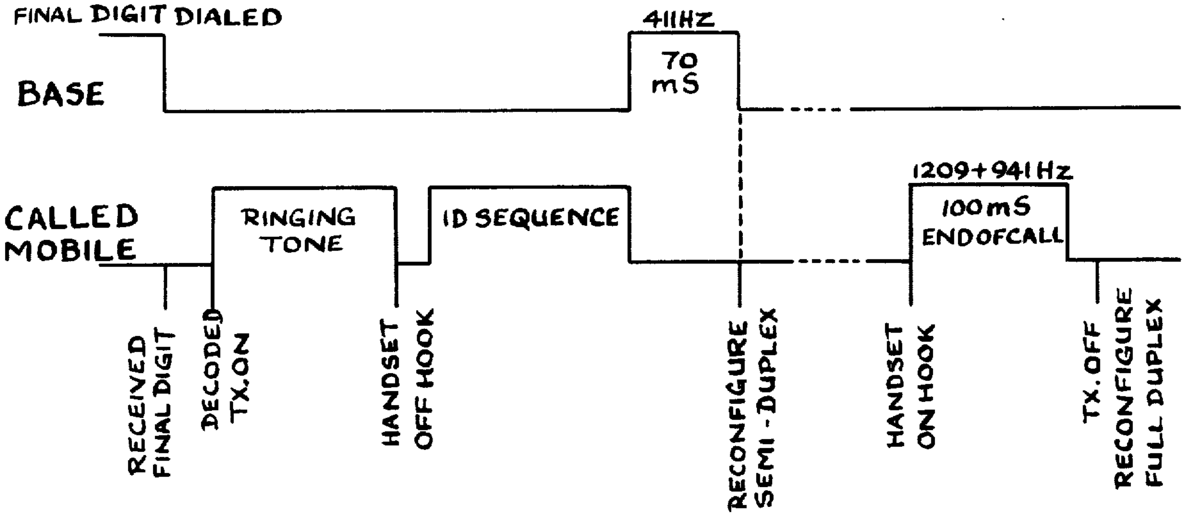
FIG. 31 is a timing diagram illustrating the signalling between a base station and a called mobile station during a mobile to mobile call on the same channel according to the features of the present invention.

If, in a mobile to mobile call, the calling mobile station happens to seize the home channel of the called mobile station, the two mobile stations and the corresponding channel circuit at the base station are automatically reconfigured to operate in the semi-duplex mode. Under such circumstances a re-configure pulse (411 Hz) of 70 milliseconds duration is transmitted to both mobile stations when the called mobile station lifts the hand set off hook. This sequence is best illustrated graphically in FIG. 31 which illustrates the final digit transmitted from the base station and received by the called mobile station, followed by ringing tone received at the called mobile station. Upon the hand set of the called mobile station being taken off hook, the called mobile station automatically transmits its I.D. pulse sequence to the base station in the same manner described above in relation to FIG. 29 when a mobile station initiates a call. The 411 Hz reconfigure pulse is automatically triggered upon receipt of a 70 millisecond start pulse in the I.D. sequence, this latter pulse also serving to actuate the calling subscriber's meter.

Upon termination of the call, when either mobile station hand set is replaced on hook, each mobile returns to full duplex configuration; this is an automatic function performed at the mobile and does not require a control tone. The base station is returned to full duplex operation when the channels are released and all circuits are automatically cleared and reset.

Assuming that the interconnecting central office has a capability of repeating digits, a call to a mobile station may be automatically dialed by a station in the public telephone system. Under such circumstances the central office line seizes its associated channel by operating the master switch circuit 20 in FIG. 2. Impulse dialing received on the central office line is then converted into 2805 Hz tone impulses and transmitted on the channel. The connection of the central office line to the channel immediately causes the 1633 Hz idler marker tone to be removed from the channel and causes a 120 millisecond clear down pulse to be generated and transmitted to all idle mobile stations employing the seized channel as a home channel. The four identification digits are counted by the four-digit counter 31 of FIG. 4, as in the mobile-to-mobile call. and the 300 millisecond timer 32 is started as soon as the final digit is completed. Ringing tone or out-of-service/busy tone is returned to the calling public telephone station as described in reference to a mobile-to-mobile call.

When the interconnecting central office does not have the capability of repeating digits, the four digits are dialed by the operator at the base station. In this regard, the central office seizes the terminal and the operator is alerted by ringing and by an indicator lamp. The process of dialing is more fully described in the detailed circuit description hereinbelow.

A mobile subscriber may call the operator by dialing 0. The initial sequence, up to receipt of the first dial tone, is precisely the same as described above for all other calls originated at a mobile station. The dialed 0 is decoded by three-digit register 24, (FIG. 2) and appropriate gating circuitry is operated to activate the operator circuit 19. The operator is then alerted by a call lamp and a ringing signal. The operator lifts the hand set off hook, and momentarily actuates a channel button corresponding to the channel call lamp which is lit. The ringing ceases and the lamp is extinguished. The mobile identification number, consisting of the final four digits of the mobile subscriber's number, are displayed on a visual display at the operator location. The operator may place a call on behalf of the calling mobile station either to another mobile station or to a station in the public telephone system. When the calling mobile station has a meter at the base station, the call is metered on that meter. When a meter is not available for a calling mobile station the call is metered by the operator's meter for that specific channel. In this regard, the operator has N meters, one for each cnannel.

In order to dial a number on behalf of a calling mobile station, the operator holds the mobile station circuit and releases the three-digit register in that channel. The three-digit register is then used by the operator to set up the required call. When the operator circuit is released, call routing through the terminal is then the same as if the call had been dialed by the mobile station.

Figure 5:
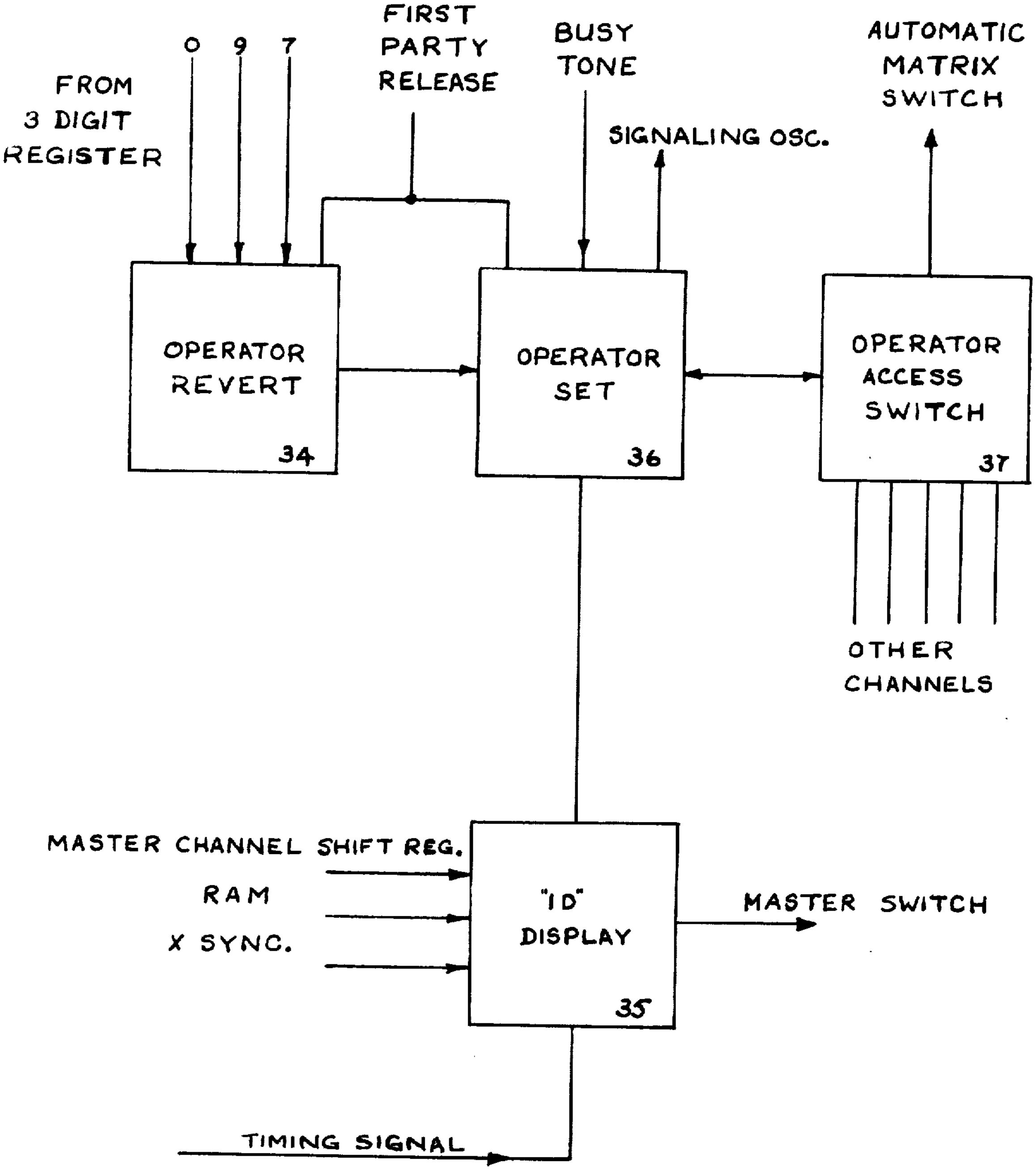
FIG. 5 is a block diagram of the operator circuit of the present invention.

When a mobile station having no meter at the base station attempts to originate a call, the call is automatically reverted to the operator for handling. Referring to FIG. 5 of the accompanying drawings, if any access digit other than zero is dialed by an unmetered mobile station, the operator revert circuit 34 is actuated, resulting in a ringing at the operator station 36 and the actuation of an indicator lamp informing the operator that an unmetered mobile station is attempting access to the system. Operator access switch 37 connects the operator to the proper channel via channel interconnection matrix 15 of FIG. 1. The final four digits of the unmetered calling mobile station are displayed at the operator's I.D. display unit 35 as soon as the operator answers the call. The I.D. display unit 35 is controlled by the master channel shift register (to be described subsequently) which steps from channel to channel to interrogate the I.D. memory 22 (see FIG. 2) in each channel circuit. I.D. display unit 35 is therefore synchronized with memory interrogation and is activated by a channel button which is momentarily depressed by the operator when the operator's hand set is taken off hook.

At the end of the call, when the hand sets are placed on hook, the I.D. memory 22 is cleared by the master timing circuit 25 (FIG. 2). It should be noted that the base station operates on a first party release basis wherein the base station completely clears down and resets upon either party replacing its hand set on hook. The base station only clears down when the operator replaces her hand set on hook if the call has been solely between the subscriber and operator; if the operator has dialed on behalf of a subscriber, replacement of the operator's hand set does not release the call.

Individual Circuit Description

This section includes description of the details of individual circuits and their operation. In order to provide an understanding as to how the individual circuits interrelate to one another, Table II is provided below. Specifically, the first or left hand column of Table II contains signal designations appearing in the various figures to be described. The second column includes the name or description characterizing the signal designated in the first column. The third column indicates the figure in which the signal originates and also the reference numeral, in parenthesis, of the element from which the signal is derived. Column 4 indicates the figure in which the signal terminates and the element which utilizes that signal. In some cases more than one destination is provided for a given signal.

TABLE II

Figure 6:
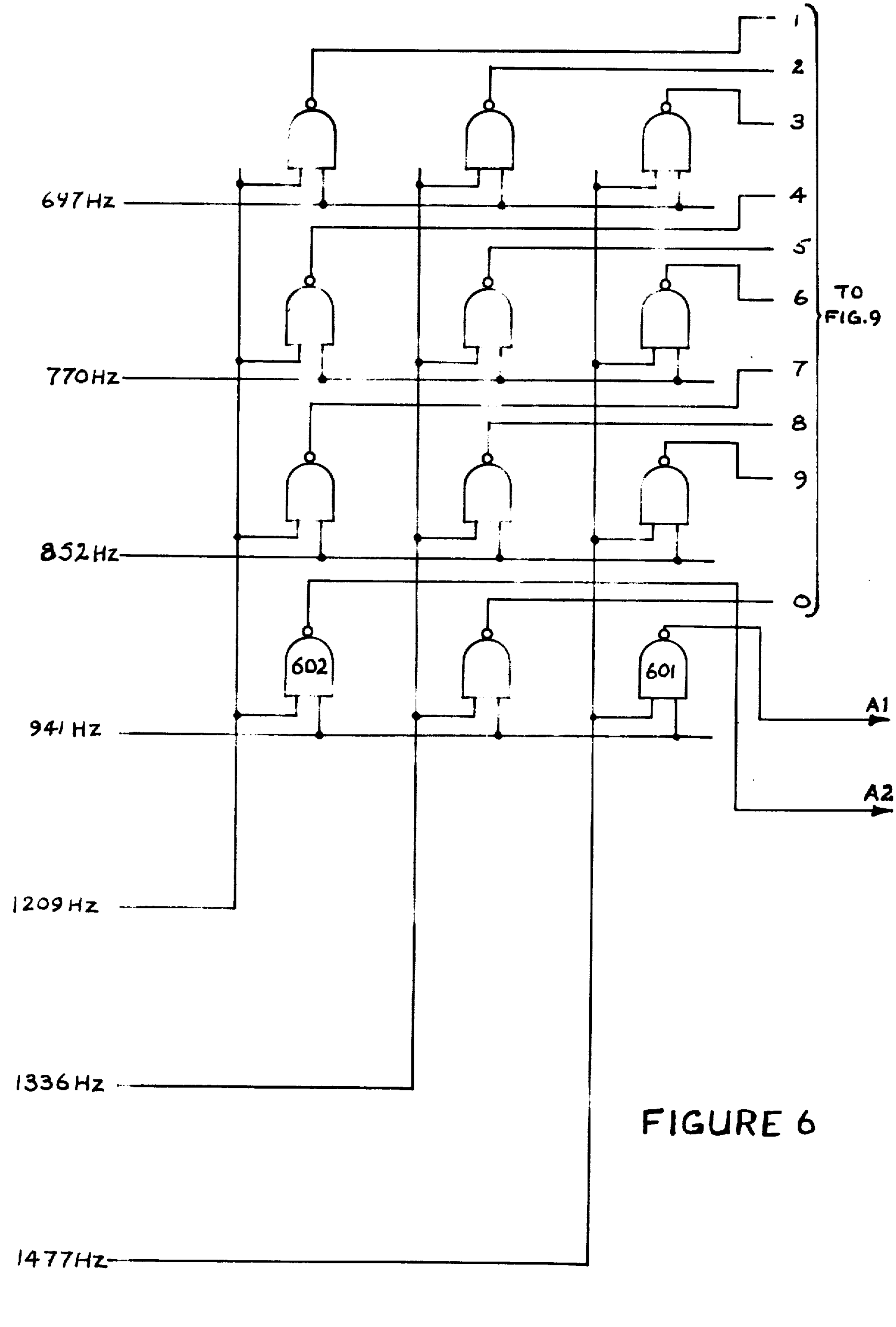
FIG. 6 is a schematic diagram of the dual-tone multifrequency ID decoder circuit utilized in the present invention.
Figure 7:
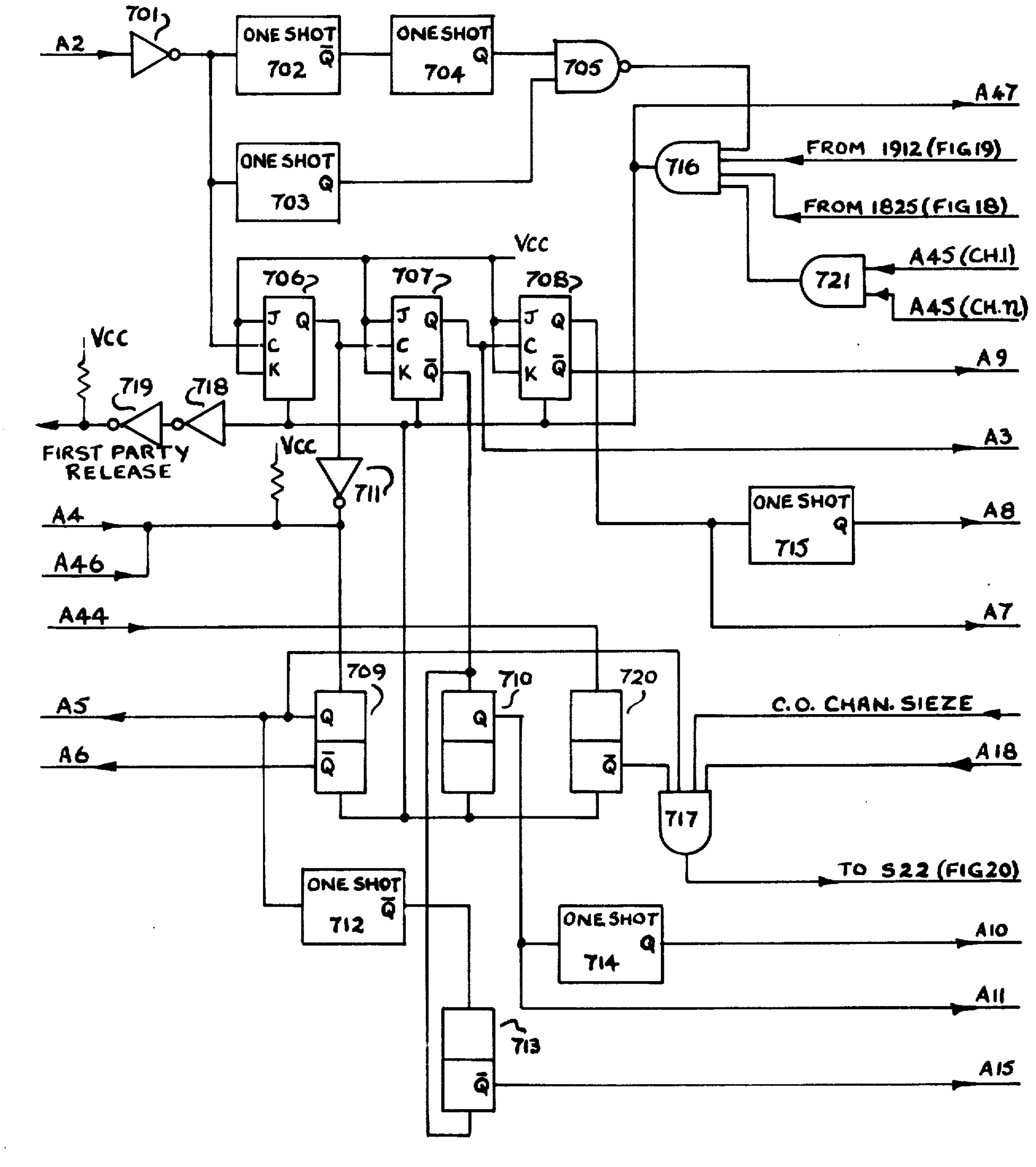
FIG. 7 is a schematic diagram of the control pulse detector circuit utilized in the present invention.
Figure 8:
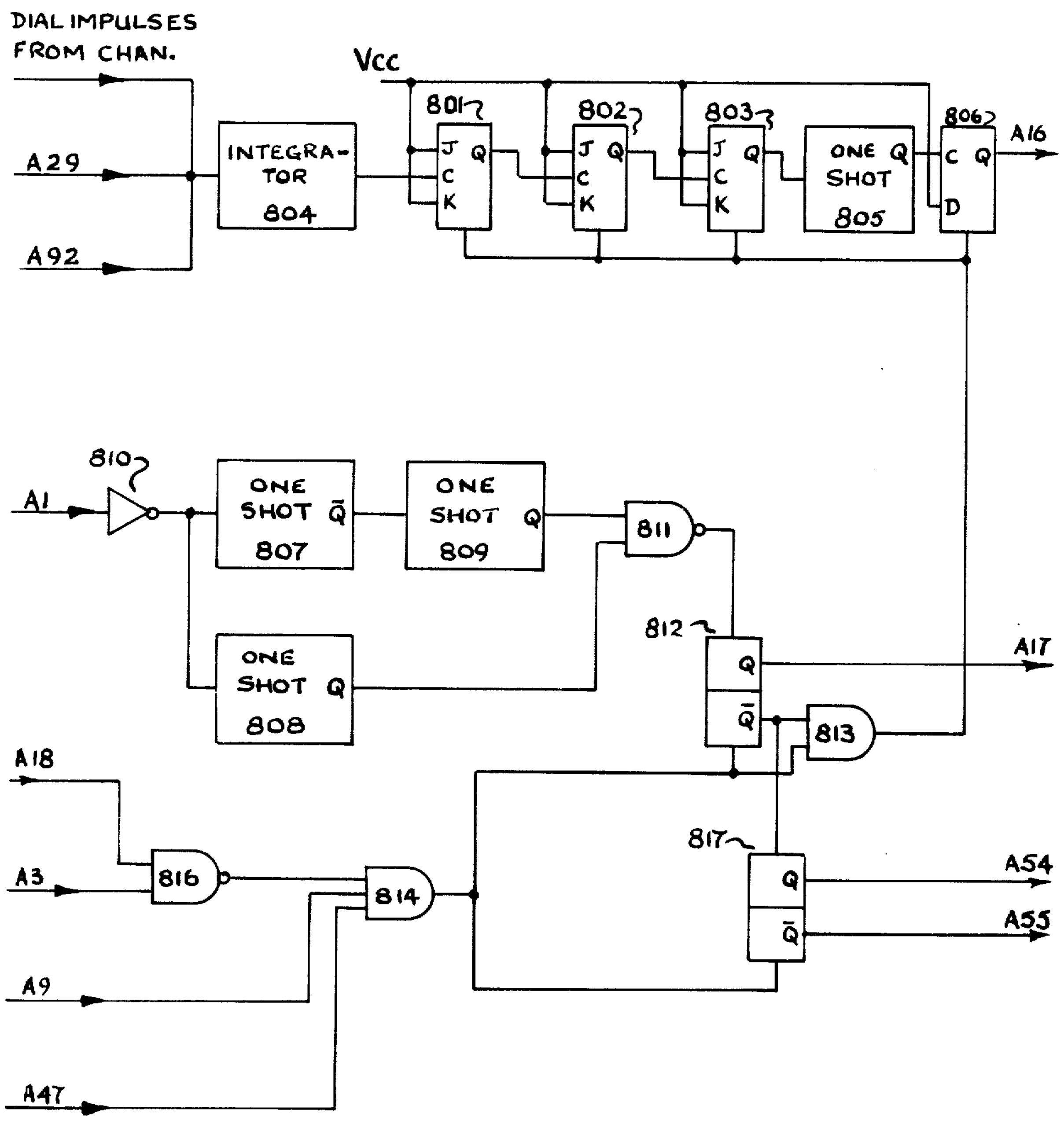
FIG. 8 is a schematic diagram of the out-of-service and ring return circuit utilized in the present invention.

| SIGNAL DESIGNATION | SIGNAL DESCRIPTION | SIGNAL DERIVATION | SIGNAL DESTINATION |
|---|---|---|---|
| A1 | Decode Complete | FIG. 6 (601) | FIG. 8 (810) |
| A2 | (1209 + 941) Control Pulse | FIG. 6 (602) | FIG. 7 (701) |
| A3 | I.D. Stop | FIG. 7 (707) | FIG. 8 (816) |
| A4 | Channel Seized By C.O. | FIG. 19 (1905) | FIG. 7 (709)<br>FIG. 17 (1714) |
| A5 | Marker Off | FIG. 7 (709) | FIG. 17 (1709) |
| A6 | Marker Control | FIG. 7 (709) | FIG. 18 (S15)<br>FIG. 9 (985) |
| A7 | Called Mobile I.D. Stop | FIG. 7 (708) | FIG. 17 (1723) |
| A8 | 411 Hz Osc. Control | FIG. 7 (715) | 411 Hz Oscillztor |
| A9 | Ring Circuit Inhibit | FIG. 7 (708) | FIG. 8 (814) |
| A10 | Clear Three Digit Register | FIG. 7 (714) | FIG. 16 (1620) |
| A11 | Channel Seized by Mobile | FIG. 7 (710) | FIG. 17 (1721) |
| A15 | I.D. Sequence Start | FIG. 7 (713) | FIG. 9 (907)<br>FIG. 10 (1009–1008) |
| A16 | Out of Service Tone Control | FIG. 8 (806) | FIG. 13 (1308) |
| A17 | Ring Decoded at Mobile | FIG. 8 (812) | FIG. 17 (S5)<br>FIG. 18 (S17) |
| A18 | Reconfigure Mode | FIG. 17 (1712) | FIG. 8 (816) |
| A19 | Memory Count Enable | FIG. 11 (1109) | FIG. 9 (984) |
| A20 | Memory Output | FIG. 9 (984) | FIG. 12 (1205)<br>FIG. 21 (2120) |
| A21 | Channel Enable | FIG. 11 (1108) | FIG. 9 (984)<br>FIG. 15 (1502)<br>FIG. 18 (1816)<br>FIG. 10 (1005) |
| A22 | Release | FIG. 11 (1110) | FIG. 14 (1416) |
| A23 | Channel Sync | FIG. 11 (1102) | FIG. 12 (1203) |
| A24 | X Sync | FIG. 12 (1202) | FIG. 21 (2117) |
| A25 | Meter Decode | FIG. 14 (1422)<br>(of each meter) | FIG. 15 (1501)<br>(in each ch.)<br>FIG. 18 (1814)<br>(for each ch.) |
| A26 | Metering Pulse | FIG. 15 (1509)<br>(in each ch.) | FIG. 14 (1423)<br>(of each meter) |
| A27 | Meter Operating | FIG. 15 (1503) | FIG. 17 (1704)<br>FIG. 18 (1803)<br>FIG. 19 (1902) |
| A28 | Reverse Battery Combined | FIG. 17 (1724, 1725, 1726) | FIG. 15 (1506)<br>FIG. 18 (1814) |
| A29 | Operator Digit Impulses | FIG. 18 (1815) | FIG. 16 (1601) |
| A30 | Blanking Signal | FIG. 16 (1606) | FIG. 17 (1702)<br>FIG. 18 (1803) |
| A31 | First Digit Seven | FIG. 16 (1619) | FIG. 17 (1705)<br>FIG. 18 (1803) |
| A32 | Channel Interconnection control | FIG. 17 (1711) | FIG. 17 (1721) |
| A33 | Second Digit Received | 3-digit Reg. | FIG. 17 (1706) |
| A34 | Third Digit Received | 3-digit Reg. | FIG. 17 (1707) |
| A35 | Operator Override | FIG. 18 (1805) | FIG. 17 (1704)<br>FIG. 19 (1902) |
| A36 | Operator Voice Signal | FIG. 18 (S20) | FIG. 17 (S4) |
| A37 | Reverse Battery | Central Off. | FIG. 17 (1726) |
| A38 | Signalling Tone Control | FIG. 17 (1716) | FIG. 20 (S25) |
| A39 | First Digit Zero | FIG. 16 (1619) | FIG. 18 (1802) |
| A40 | First Digit Nine | FIG. 16 (1619) | FIG. 18 (1801)<br>FIG. 19 (1901) |
| A41 | Clear Three Digit Register (Oper) | FIG. 18 (1812) | FIG. 16 (1621) |
| A42 | Operator Circuit Control | FIG. 17 (S6) | FIG. 18 (S21) |
| A43 | Operator Display Control | FIG. 18 (1816) | FIG. 21 (2105) |

TABLE II – Continued

Figure 12:
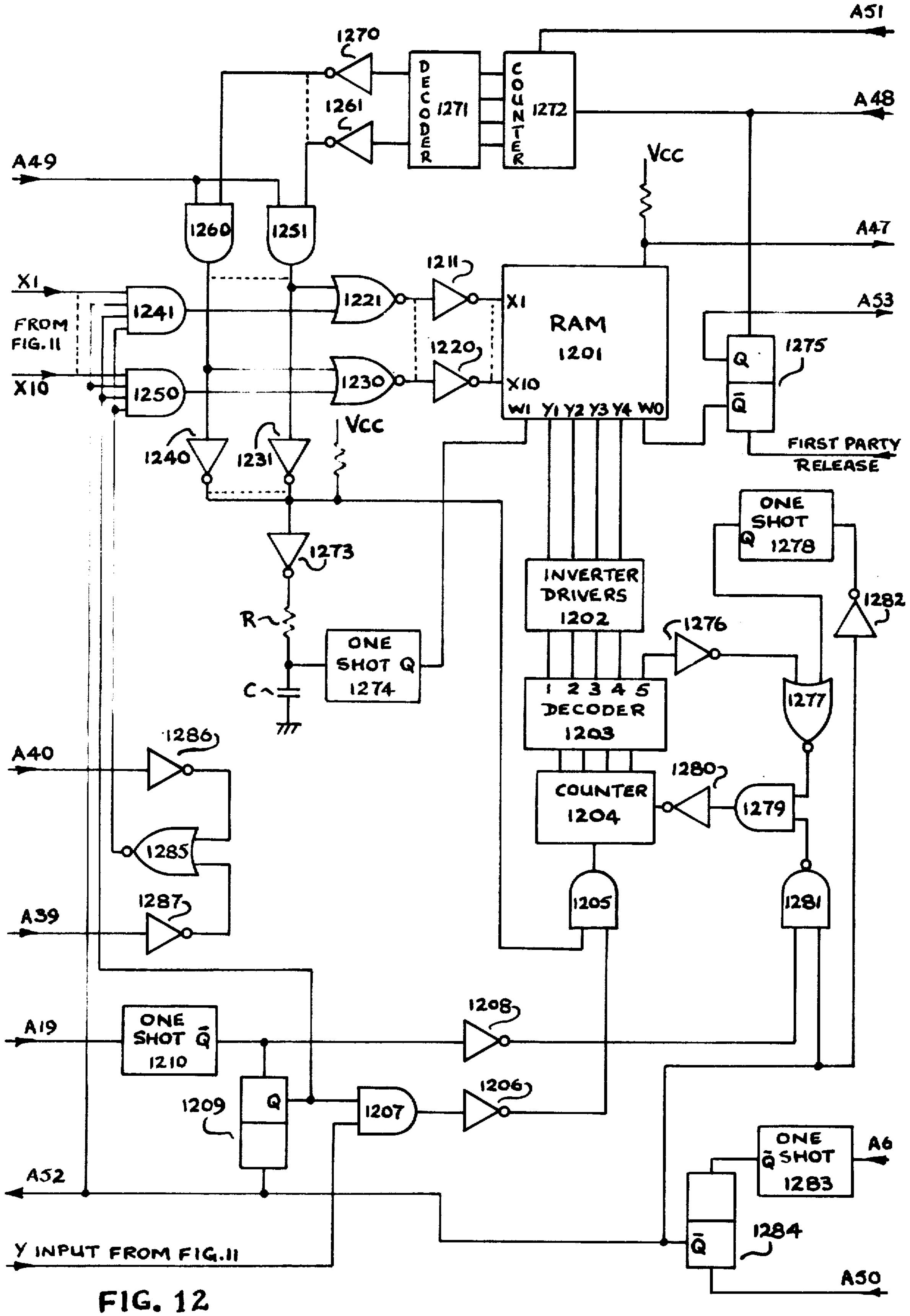
FIG. 12 is a schematic diagram of the mobile busy memory circuit utilized in the present invention.
Figure 13:
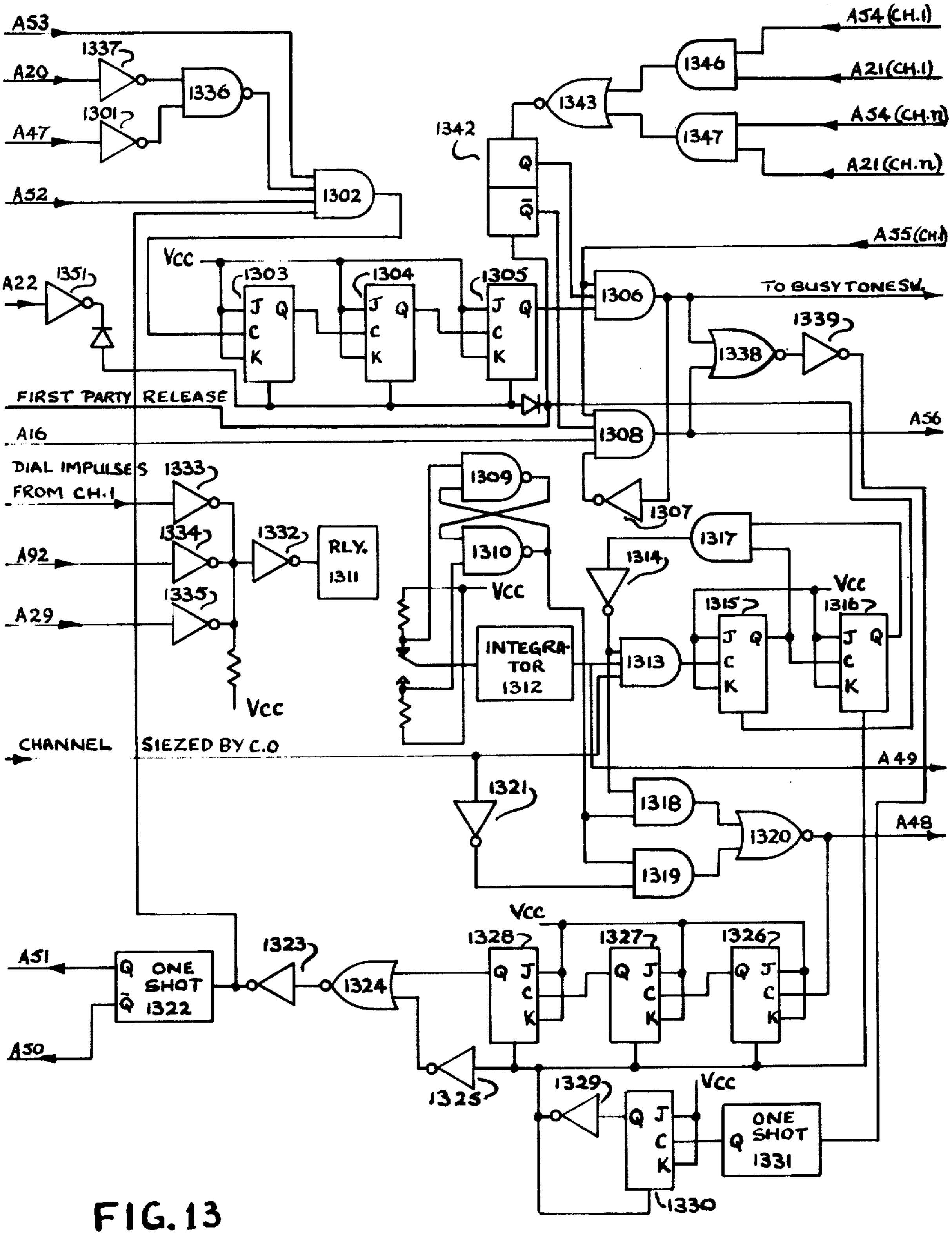
FIG. 13 is a schematic diagram of the mobile busy memory control circuit utilized in the present invention.
Figure 16:
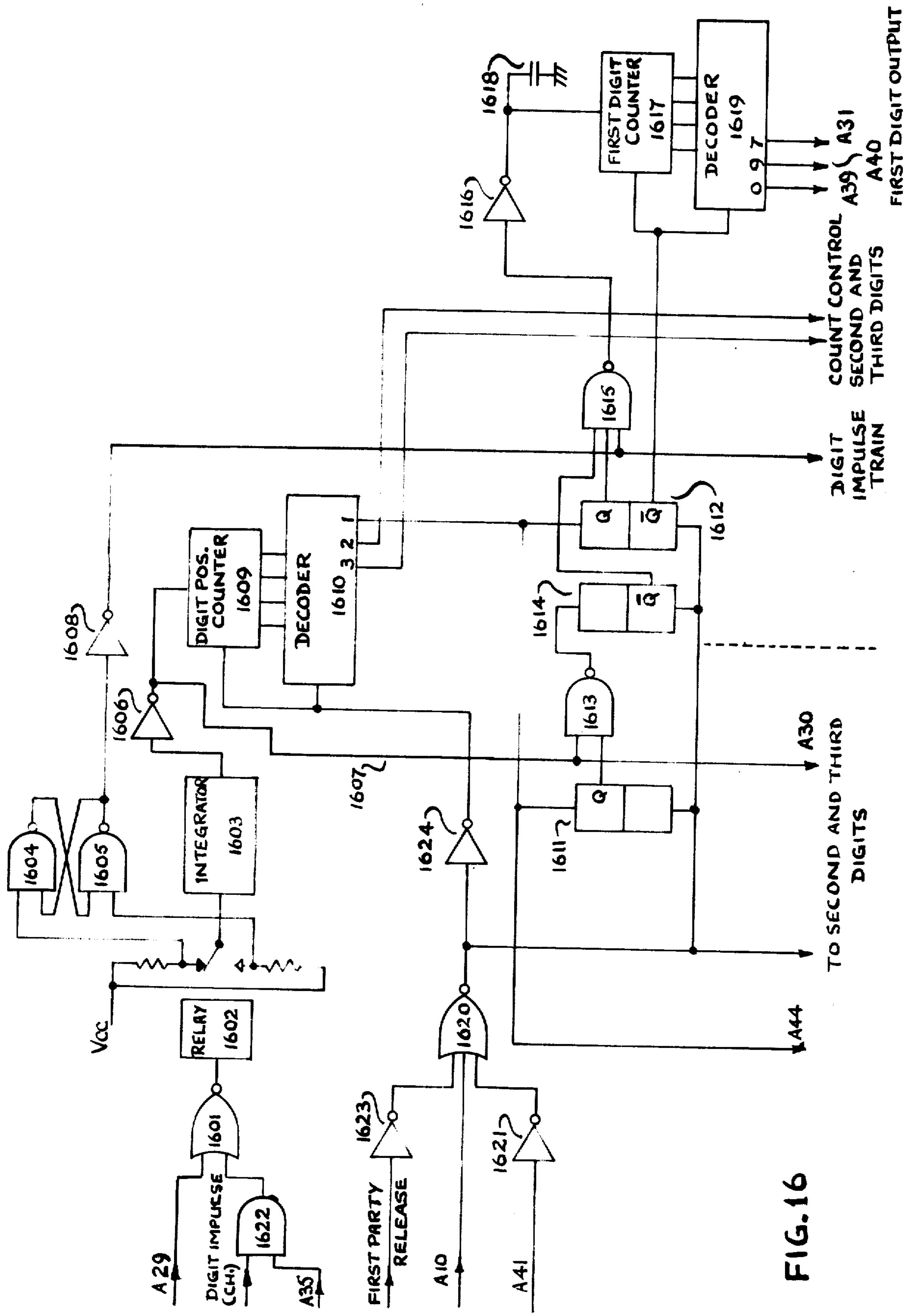
FIG. 16 is a schematic diagram of the three-digit register utilized in the present invention.
Figure 17:
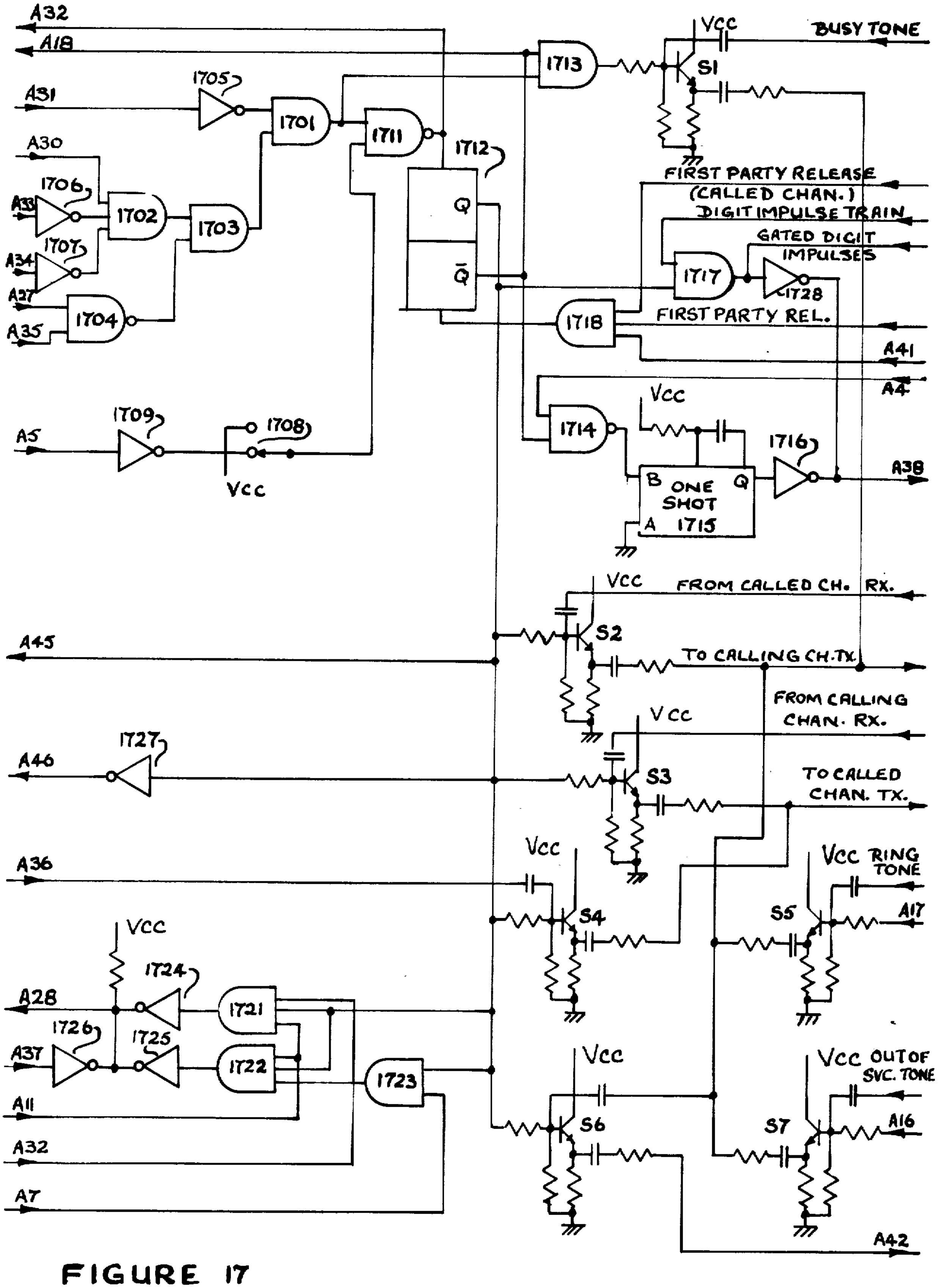
FIG. 17 is a schematic diagram of the channel interconnection matrix circuit utilized in the present invention.
Figure 18:
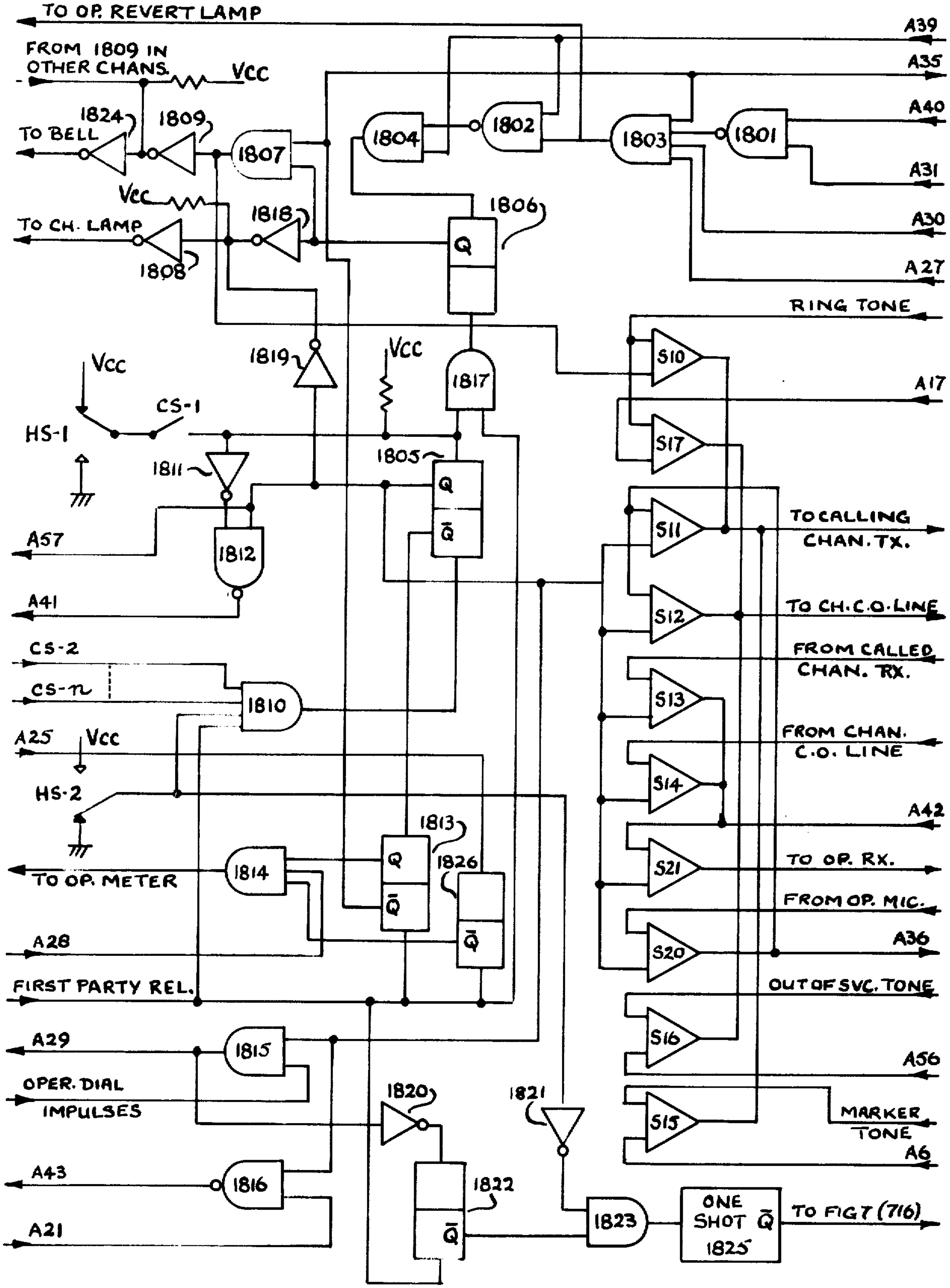
FIG. 18 is a schematic diagram of a portion of the operator circuit utilized in the present invention.
Figure 19:
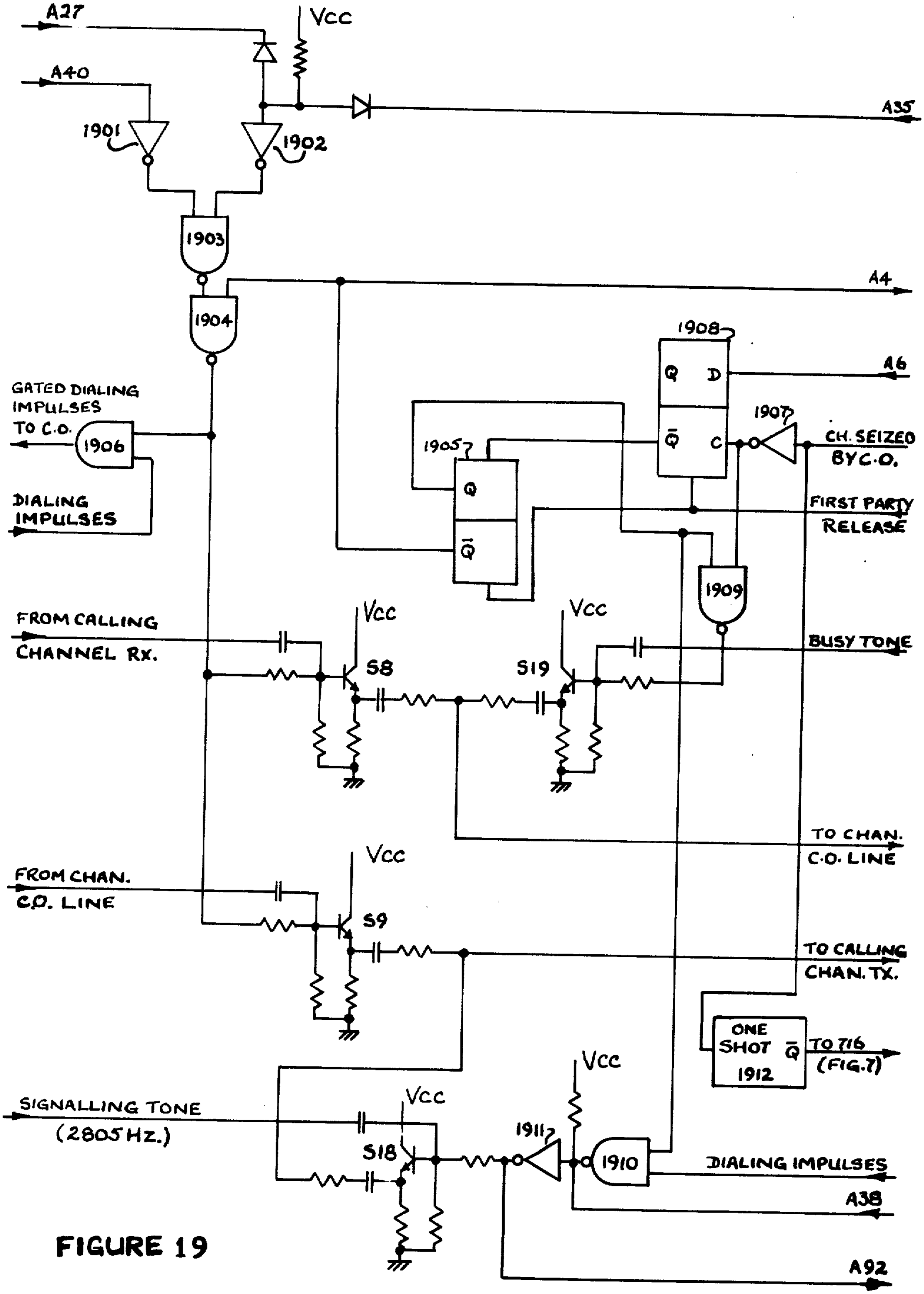
FIG. 19 is a schematic diagram of the central office line switch circuit utilized in the present invention.
Figure 20:
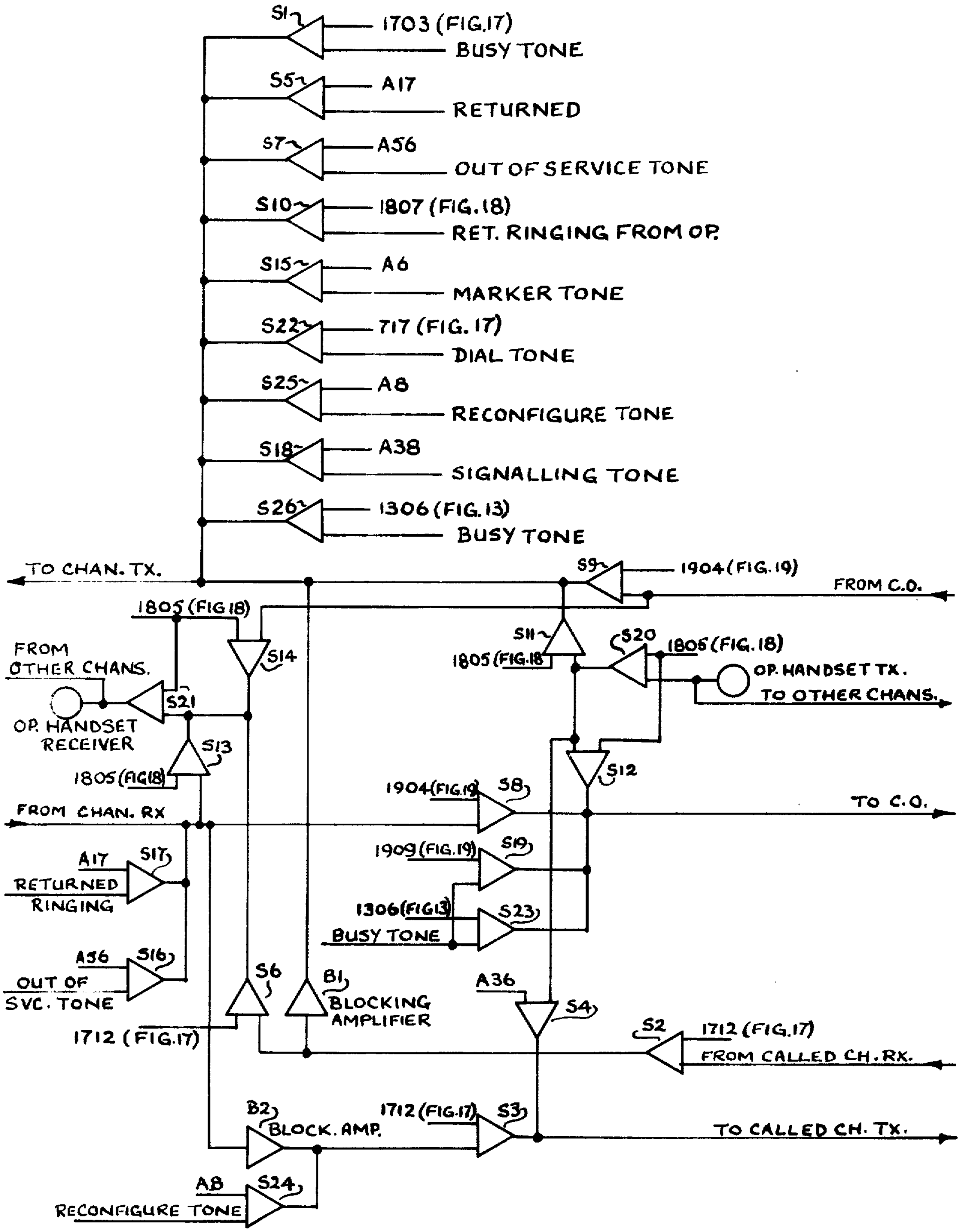
FIG. 20 is a functional diagram of the channel interconnection switching logic utilized in the present invention.
Figure 22:
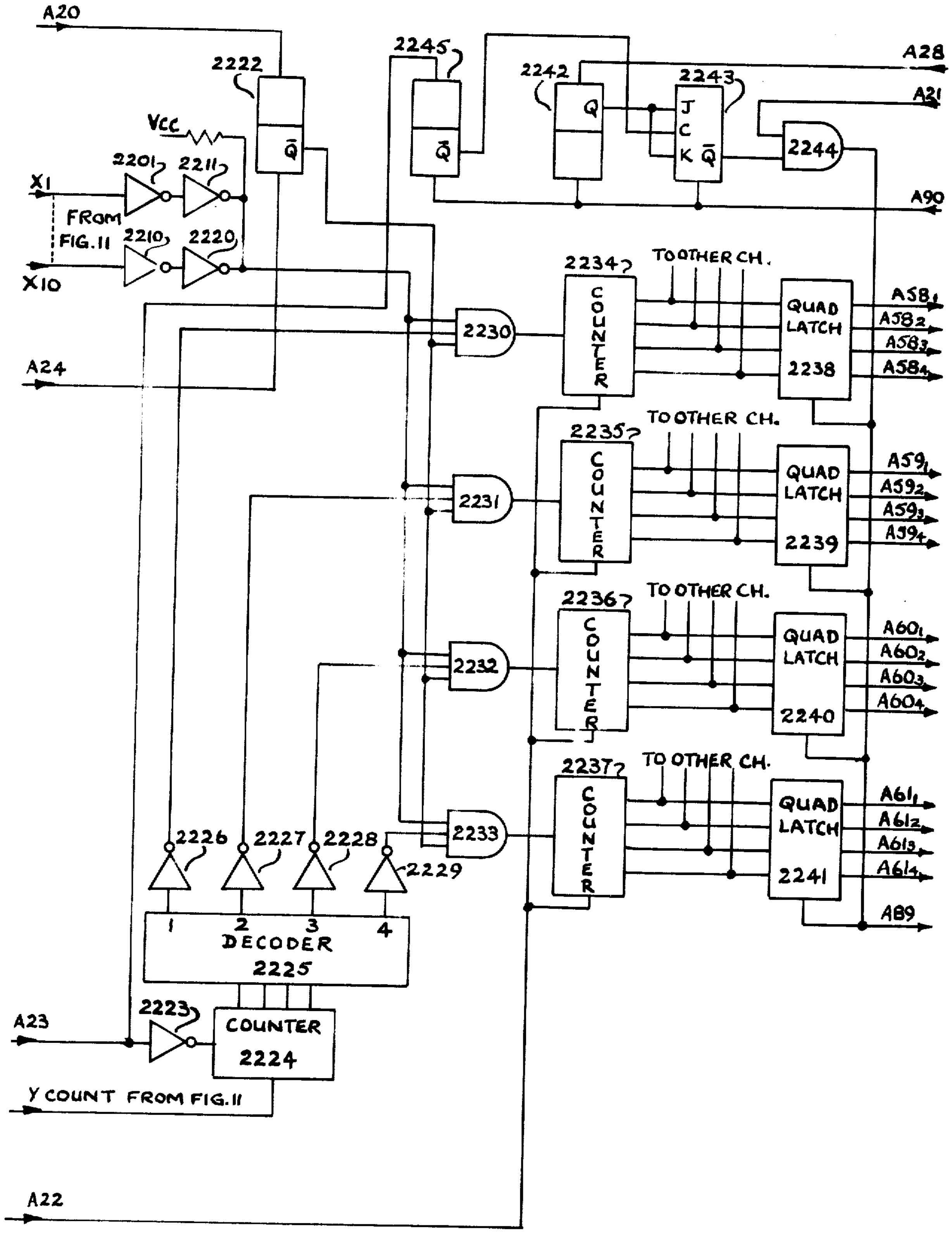
FIGS. 22, 23, 24, 25 and 26 are parts of a schematic diagram of the automatic ticketing print-out and magnetic tape storage circuit utilized in the present invention.
Figure 25:
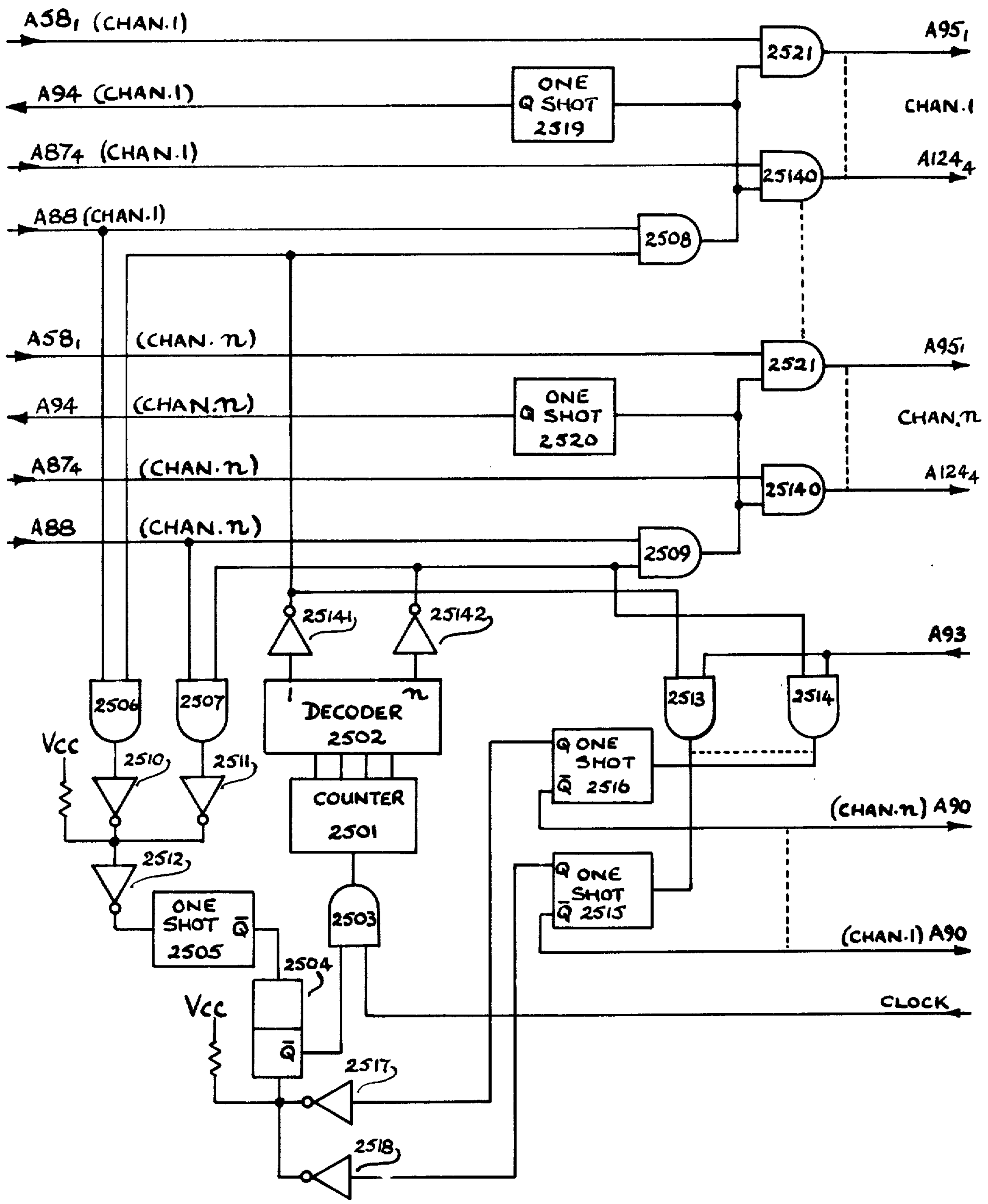
Figure 26:
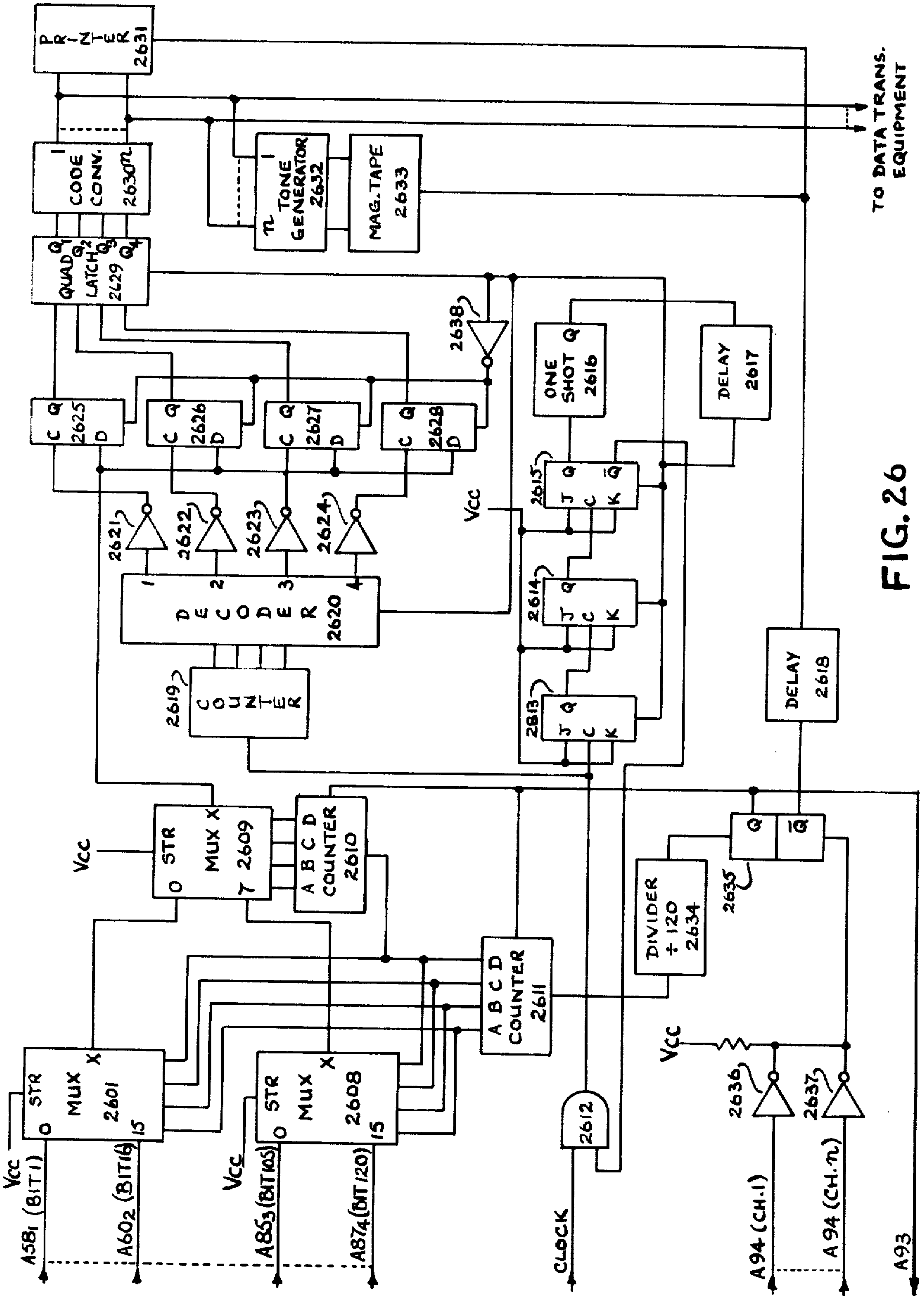

| SIGNAL DESIGNATION | SIGNAL DESCRIPTION | SIGNAL DERIVATION | SIGNAL DESTINATION |
|---|---|---|---|
| A44 | Dial Tone Control | FIG. 16 (1610) | FIG. 7 (720) |
| A45 | Release From Matrix | FIG. 17 (1712) | FIG. 7 (721) |
| A46 | Channel Seized by Matrix | FIG. 17 (1727) | FIG. 7 (709) |
| A47 | Output of Mobile Busy Memory | FIG. 12 (1201) | FIG. 13 (1301) |
| A48 | Digit Input-Mobile Busy Memory | FIG. 13 (1320) | FIG. 12 (1272) |
| A49 | Mobile Busy Memory Input Blanking | FIG. 13 (1312) | FIG. 12 (1251) |
| A50 | Count Enable-Mobile Busy Memory | FIG. 13 (1322) | FIG. 12 (1284) |
| A51 | Reset Impulse Counter | FIG. 13 (1322) | FIG. 12 (1272) |
| A52 | Comparator Enable | FIG. 12 (1284) | FIG. 13 (1302) |
| A53 | Comparator Inhibit | FIG. 12 (1275) | FIG. 13 (1302) |
| A54 | Call in Progress (1) | FIG. 8 (817) | FIG. 13 (1346) (1347) |
| A55 | Busy and Out of Service Inhibit | FIG. 8 (817) | FIG. 13 (1306) |
| A56 | Our of Service Tone Control | FIG. 13 (1308) | FIG. 20 (S7) FIG. 18 (S16) |
| A57 | Operator in Circuit | FIG. 18 (1805) | FIG. 22 |
| A58 | Mobile ID Digits | FIG. 22 (2238) | FIG. 26 (2601) |
| A59 | | FIG. 22 (2439) | FIG. 26 (2601) |
| A60 | | FIG. 22 (2240) | FIG. 26 (2601) |
| A61 | | FIG. 22 (2241) | FIG. 26 (2601) |
| A62 . A63 | BCD Timer Signal Digits | FIG. 23 (2304) | FIG. 26 |
| A64 . . A73 | BCD Date-Time Clock Output | FIG. 23 (2317) | FIG. 26 |
| A74 | BDC Operator Revert Signal | FIG. 23 (2320) | FIG. 26 |
| A75 | BCD Operator Assist Signal | FIG. 23 (2321) | FIG. 26 |
| A76 | BDC Dial "7" Signal | FIG. 23 (2321) | FIG. 26 |
| A77 | BCD Dial "9" Signal | FIG. 23 (2315) | FIG. 26 |
| A78 . . . A87 | Dialed Number in BCD | FIG. 24 (2431–2440) | FIG. 26 |
| A88 | Printout Ready | FIG. 23 (2354) | FIG. 25 (2507–2509) |
| A89 | Reversed Battery for Enabled Channel | FIG. 26 (2644) | FIG. 23 (2353) |
| A90 | End of Readout | FIG. 25 (2515) | FIG. 24 (2426) FIG. 23 (2309) FIG. 22 (2243) |
| A92 | Dial Impulse from C.O. | FIG. 19 (1911) | FIG. 13 (1334) |
| A93 | Printer Enable | FIG. 26 (2635) | FIG. 25 (2513) |
| A94 | Completed Call Data Ready | FIG. 25 (2519) | FIG. 26 (2636) |
| X1–X10 | X Drivers for Memory | FIG. 12 (1231) | FIG. 9 (961) |
| Y1–Y4 | Y Drivers for Memory | FIG. 9 (903) | FIG. 10 (1001) |
| Y'1–Y'4 | Y Synchronization for Meters | FIG. 10 (1015) | FIG. 14 (1411) |

DTMF Decoder

Referring to FIG. 6 of the accompanying drawings there is illustrated a dual tone multi-frequency decoder which is present in each channel circuit at the base station. The matrix is simply a four-by-three NAND gate matrix which is operated by pulses derived upon detection of any of the standard touch tone frequencies. The NAND gates each normally provide a binary 1 output signal. If the tone detector for the channel circuit simultaneously detects receipt of the 697 Hz and 1209 Hz tones, corresponding pulses are applied to the NAND gate in the upper left hand corner of the matrix to switch its output signal from binary 1 to binary 0. In this manner any of the ten output digit signals, which are applied to circuitry illustrated in FIG. 9 and described below, may be rendered binary 0 upon receipt of the appropriate combination of tones by the channel receiver. In addition, signal A1 is provided by gate 601 of the matrix in response to receipt of the 941 + 1477 Hz tone combination on the channel. This signal represents the decode complete signal transmitted by a mobile station to the base station when that mobile station has been called and has recognized and decoded its call identification signal. Similarly a received tone combination of 1209 + 941 Hz actuates gate 602 to provide signal A2, which is a control pulse utilized in conjunction with the circuitry of FIG. 7.

Control Pulse Detector

Figure 4:
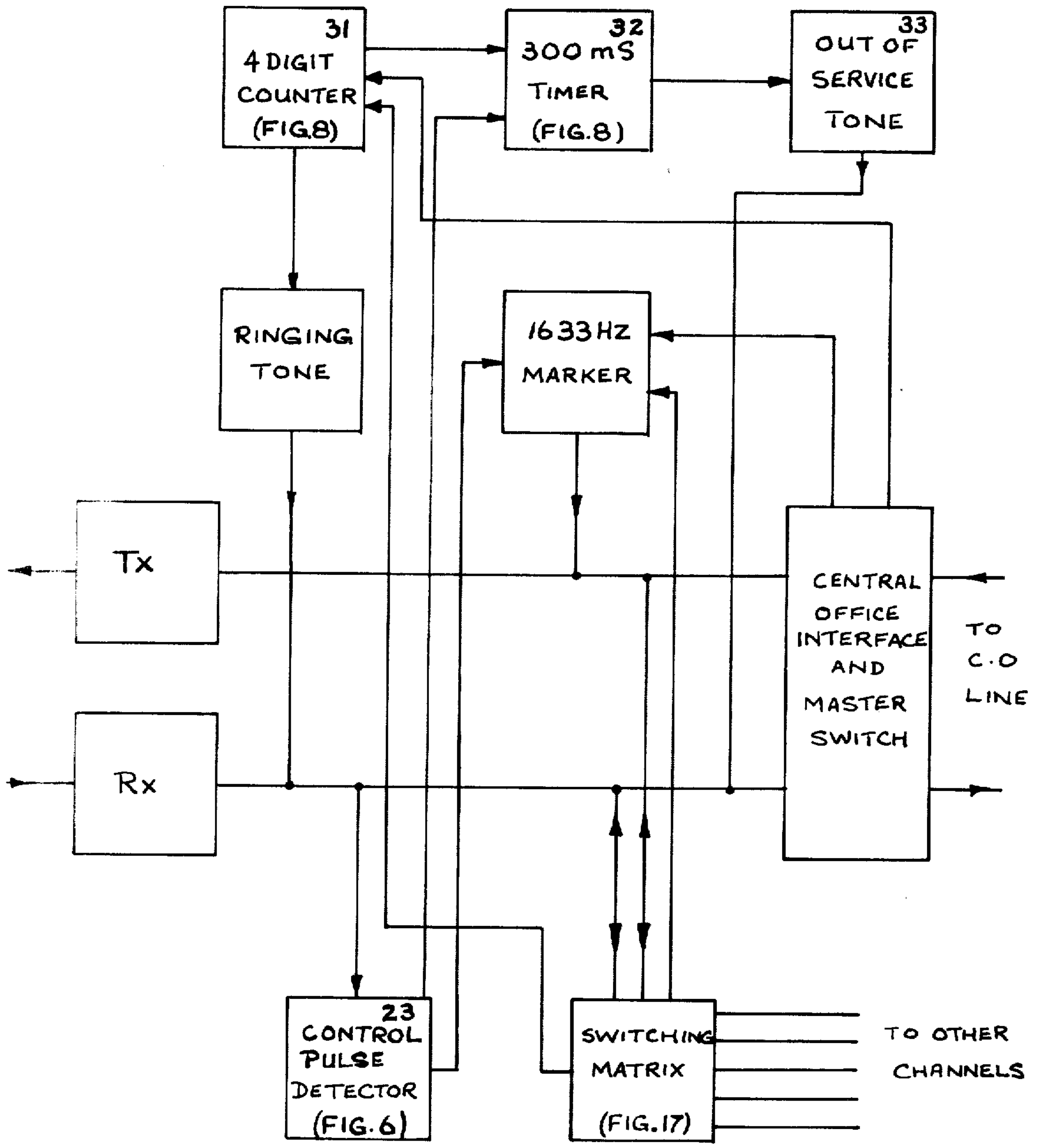
FIG. 4 is a block diagram illustrating the operation of a single channel in response to the decode complete feature of the present invention.

The control pulse detector circuit 23 of FIG. 4 is illustrated in detail in FIG. 7 of the accompanying drawings. The primary function of the control pulse detector is to detect the control pulse (1209 + 941 Hz), appearing as the start and stop pulses in the I.D. sequence, and the end-of-call pulse, all illustrated graphically in FIG. 29. The control pulse is applied to inverter 701 which feeds one-shot multivibrators 702 and 703 connected in parallel. One-shot 702, in turn, feeds one-shot 704, and the output signals from one shot 703 and 704 are applied to a two-input NAND gate 705. The three one-shots and NAND gate 705 serve to distinguish the 100 millisecond end-of-call pulse from the 70 millisecond start and stop pulses in the I.D. sequence and from the 120 millisecond clear down pulse. Specifically, one-shot 702 responds to positive-going signals to provide a negative-going pulse of 90 milliseconds duration. One-shot 703 responds to a negative-going transition to provide a 5 millisecond positive-going pulse. One-shot 704 responds to a positive-going transition to provide a positive-going 20 millisecond pulse. Thus a binary 1 control pulse appearing at the output terminal of inverter 701 causes a binary 0 90 millisecond pulse to be generated by one-shot 702 wherein the leading edge of the 90 millisecond pulse is in time coincidence with the leading edge of the control pulse. On the other hand one-shot 703 produces its 5 millisecond output pulse commencing at the trailing edge of the control pulse provided at its A input terminal. One-shot 704 on the other hand provides its 20 millisecond binary 1 pulse commencing at the trailing edge of the binary 0 pulse produced by one-shot 702.

Assume that the control pulse appearing at the output terminal of inverter 701 is of 100 milliseconds duration. The 90 millisecond binary 0 pulse provided by one shot 702 terminates before completion of the 100 millisecond control pulse and initiates the binary 1 20 millisecond pulse from one shot 704. This 20 millisecond period spans the time at which the control pulse terminates and produces the 5 millisecond pulse from one shot 703. One shots 703 and 704 therefore provide binary 1 pulses in partial time coincidence to pulsatively inhibit NAND gate 704 and provide a clear pulse at the binary 0 level from that gate. This corresponds to the presence of a 100 millisecond clear down pulse received on the channel. On the other hand, the 70 millisecond start and stop pulses in the I.D. sequence terminate before the 90 millisecond pulse produced by one-shot 702 can trigger one-shot 704; therefore the 5 millisecond pulse produced at the termination of the 70 millisecond control pulse by one-shot 703 terminates before the 20 millisecond pulse is produced by one-shot 704. The output pulses from one-shot 703 and 704 are therefore not in time coincidence and the output signal from NAND gate 704 remains at the binary 1 level. Likewise, when a 120 millisecond clear down pulse occurs, the 20 millisecond binary 1 pulse produced by one-shot 704 (upon termination of the binary 0 pulse produced by one-shot 702) has time to terminate before the 5 millisecond pulse from one-shot 703 (produced at the trailing edge of the 120 millisecond control pulse) is generated. Thus the output pulses from one-shots 703 and 704 are not in time coincidence in response to the 120 millisecond control pulse and consequently the output signal from NAND gate 705 remains at the binary one level.

The clear pulse generated at the binary 0 level by NAND gate 704 in response to an end-of-call pulse is applied as one input signal to four-input AND gate 716. The other three input signals to AND gate 716 become binary 0 when a party on the central office side of the conversation replaces its hand set on hook; or the called mobile party replaces the mobile hand set on hook; or the operator replaces the operator's hand set on hook to end an 0 call. AND gate 716 therefore provides a binary 0 signal, designated FIRST PARTY RELEASE, which is utilized to reset various circuits in the base station circuit for the particular channel.

The output signal from NAND gate 705 is also applied as a reset signal to clocked J-K flip-flops 706, 707 and 708, and to preset-reset flip-flops 709, 710 and 720 via AND gate 716. Flip-flops 706, 707 and 708 constitute a divide-by-four circuit which is utilized to detect the start and stop pulses in an I.D. sequence. Specifically, a control pulse provided at the binary 1 level by inverter 701, which is not an end-of-call pulse such as to activate NAND gate 705, clocks flip-flop 706 in the divide by four circuit. Flip-flop 706 switches on the trailing edge of the start pulse in an I.D. sequence and provides a binary 0 output signal, via inverter 711, to preset the channel seizure control flip-flop 709. Upon being preset flip-flop 709 provides a binary 0 A6 signal which deactivates the 1633 Hz marker oscillator control circuit to remove the idle channel marker from the channel. This effectively permits tha calling mobile station to seize the channel. Simultaneously the binary 1 Q output signal of flip-flop 709, designated A5 in the drawing, provides an indication in the channel interconnection matrix circuit that the channel has been seized. In addition this signal triggers one-shot multivibrator 712 which, in turn, presets the present-reset flip-flop 713. The latter responds by providing a binary 0 $\bar{Q}$ signal designated A15 which indicates that the I.D. sequence has started and is utilized in the circuitry of FIG. 9.

When the I.D. sequence stop pulse is received, after the four I.D. digits have been received, flip-flop 706 changes state again and in so doing clocks flip-flop 707. The latter provides a binary 0 $\bar{Q}$ output signal which resets flip-flop 713 and returns signal A15 to binary 1. Flip-flop 713 does not operate again until the system has been cleared down at the end of a call.

The I.D. stop pulse, by switching flip-flop 707, also presets flip-flop 710 which in turn triggers one-shot multivibrator 714. The latter gives a positive-going pulse (signal A10) which clears the three-digit register which is illustrated in detail in FIG. 16. This clearing of the three-digit register erases any impulses which may have been counted as a result of random noise in the circuit since the last time the three-digit register had been operated.

Flip-flop 708 comes into play only when one mobile station calls another mobile station and in so doing seizes the home channel of the called mobile station. As described above, this operation, referred to herein as the reconfigure mode, requires that a 70 millisecond 411 Hz tone pulse be generated to cause the mobile stations to reconfigure. Flip-flop 708 is utilized to trigger a reconfigure pulse. Specifically, when the called mobile subscriber answers the mobile-to-mobile call, the I.D. sequence of the called mobile station is automatically transmitted on the channel. This then is the second I.D. sequence received by the channel during this call, the first being the I.D. sequence of the calling mobile station. The start pulse of the called mobile station I.D. sequence triggers flip-flop 706 so that now both of flip-flops 706 and 707 provide binary 1 Q output signals. Upon receipt of the stop pulse in the called mobile station I.D. sequence, all three of flip-flops 706, 707 and 708 are switched, leaving only flip-flop 708 to provide a binary 1 Q output signal. This signal, designated A7 in the drawing, is supplied to the channel interconnection matrix circuitry in FIG. 17 to indicate that the I.D. sequence has been completed in the called channel. In addition, the binary 0 $\overline{Q}$ signal provided by flip-flop 708 is fed to pulse generator 715 which in turn provides an output pulse, designated A8, to gate-on the 411 Hz oscillator for 70 milliseconds.

The four input AND gate 717 receives a binary 1 from the central office interface, in respect of an unseized central office line, and a second binary 1 from flip-flop 720, which is unoperated. The third input is at binary 0 from the Q output of flip-flop 709 when the latter is unoperated, and the fourth input is binary 1 from A18 (FIG. 17). As soon as flip-flop 709 operates, binary 1 is provided from the Q output to the third input of gate 717. The resulting binary 1 output of gate 717 operates the dial tone switch (S22, FIG. 20) and returns dial tone to the calling mobile subscriber.

When the calling mobile subscriber dials the first digit, binary 0 is provided from the three-digit register (FIG. 16) output line A44 to the preset input of flip-flop 720 which is rendered operative.

The output $\overline{Q}$ of flip-flop 720 provides binary 0 to gate 717 which changes its output signal to binary 0, thus removing the dial tone which had been returned to the calling mobile subscriber.

When a mobile-to-mobile call is made the output line A18 from FIG. 17 becomes binary 0, thus disabling gate 717 and preventing dial tone from being transmitted in the called channel when the called mobile subscriber comes off hook.

The two inverters 718 and 719 form a wired OR output for the first party release circuit.

It should be noted that AND gate 721 is a multiple-input AND gate having N-1 inputs equal to the number of all local switching matrices corresponding to this particular channel but located in other channel circuits.

Out-of-Service and Ringing Return Circuit

When a mobile station initiates a call and a ringing signal is applied to the called station, whether that station is a public telephone system station or another mobile station, a ringing return signal is returned to the calling subscriber. In addition if a called mobile subscriber is either busy or out-of-service, an out-of-service or busy tone is returned to the calling mobile station. The circuit for controlling the transmission of the busy/out-of-service and ringing tones to the calling mobile station is illustrated in detail in FIG. 8.

As previously described, after the four identification digits of the called mobile station have been transmitted, the base station awaits the 70 millisecond decode complete pulse which is automatically transmitted by the called mobile station to indicate that the coding has been completed. On receipt of this pulse, designated A1 in FIG. 8, ringing signal is returned to the calling mobile station.

A divide by four circuit includes three clocked JK flip-flops 801, 802, and 803 and is driven by a transistor delay circuit 804. Delay circuit 804 has a time constant in excess of 65 milliseconds and responds to dial impulse trains received either on the channel or from the operator. Each train of impulses representing a digit produces a single pulse from the delay circuit 804. Each pulse produced by the delay circuit 804 is counted by flip-flops 801, 802 and 803 so that after the fourth digit impulse train a binary 1 is provided at the Q output terminal of flip-flop 803. This binary 1 signal triggers a pulse generating circuit (one-shot) 805 to provide a pulse having a width of 300 milliseconds. Circuit 805 corresponds to the 300 millisecond timer 32 in FIG. 4. When the Q output of flip-flop 803 becomes binary 1, the output signal from circuit 805 immediately becomes binary 0, which does not affect D-type flip-flop 806. 300 milliseconds after the Q output signal of flip-flop 803 becomes binary 1, a positive-going output transition is provided by circuit 805 and operates flip-flop 806. The latter provides the busy/out-of-service tone control signal A16 which switches on either the busy or out-of-service tones (as subsequently described) and transmits same to the calling subscriber. If, however, the called mobile station properly decodes the identification signal transmitter thereto, flip-flop 806 is prevented from being preset in the manner described below and signal A16 is inhibited.

One-shot multivibrators 807, 808 and 809 are employed to detect a decode complete signal appearing as signal A1. Specifically, these one-shots operate in conjunction with NAND gate 811 in the same manner described above for the detection of the end-of-call pulse by one-shots 702, 703 and 704 and NAND gate 705. In this case, the decode complete pulse is of 70 milliseconds duration so that the pulse widths produced by one-shots 807, 808 and 809 are modified accordingly. When a 70 millisecond decode complete tone pulse (1477 + 941 Hz) is received, the output signal from NAND gate 811 switches to binary 0 and presets the preset-reset flip-flop 812. The resulting binary 1 Q output signal from flip-flop 812 is applied to the circuit of FIGS. 17 and 18 to indicate that the ring signal has been decoded at the called mobile station. In addition the binary 0 $\overline{Q}$ output signal from flip-flop 812 is applied to AND gate 813 which then switches to its binary 0 state to reset flip-flops 801, 802, 803 and 806. If flip-flops 801, 802, 803 and 806 are reset before the 300 millisecond period of pulse generator circuit 805, the out-of-service tone control signal A16 is not activated. The binary 0 $\overline{Q}$ signal from flip-flop 812 also presets flip-flop 817; this renders signal A54 binary 1, to indicate that a call is in progress in the channel, and render signal A54 binary 0, to inhibit transmission of busy/out-of-service tone.

The first party release signal generated in the circuit of FIG. 7 is active at the binary 0 level to reset each of flip-flops 801, 802, 803 and 812 so that each of these flip-flops is reset at the end of a call. The first party release signal is applied to the flip-flops via three-input AND gate 814. Another signal applied to gate 814 is signal A9 derived from FIG. 7 and which is present at the binary 0 level to reset the flip-flops whenever the called mobile station identification signal has been transmitted to the base station in the reconfigure mode. The output signal from gate 814 resets flip-flop 817 to render A54 binary 0 (indicating that no call is in progress on the channel) and A55 binary 1 (to uninhibit busy/out-of-service tone). Thus it will be noted that the flip-flops in FIG. 8 are all reset by either the first party release signal or by the completion of the I.D. sequence for the called mobile station during the reconfigure mode of operation. A further input signal to gate 814 is derived from NAND gate 816 and signals A3 and A18 applied thereto; operation of gate 816 is described subsequently.

I.D. Memory Circuit

Figure 9:
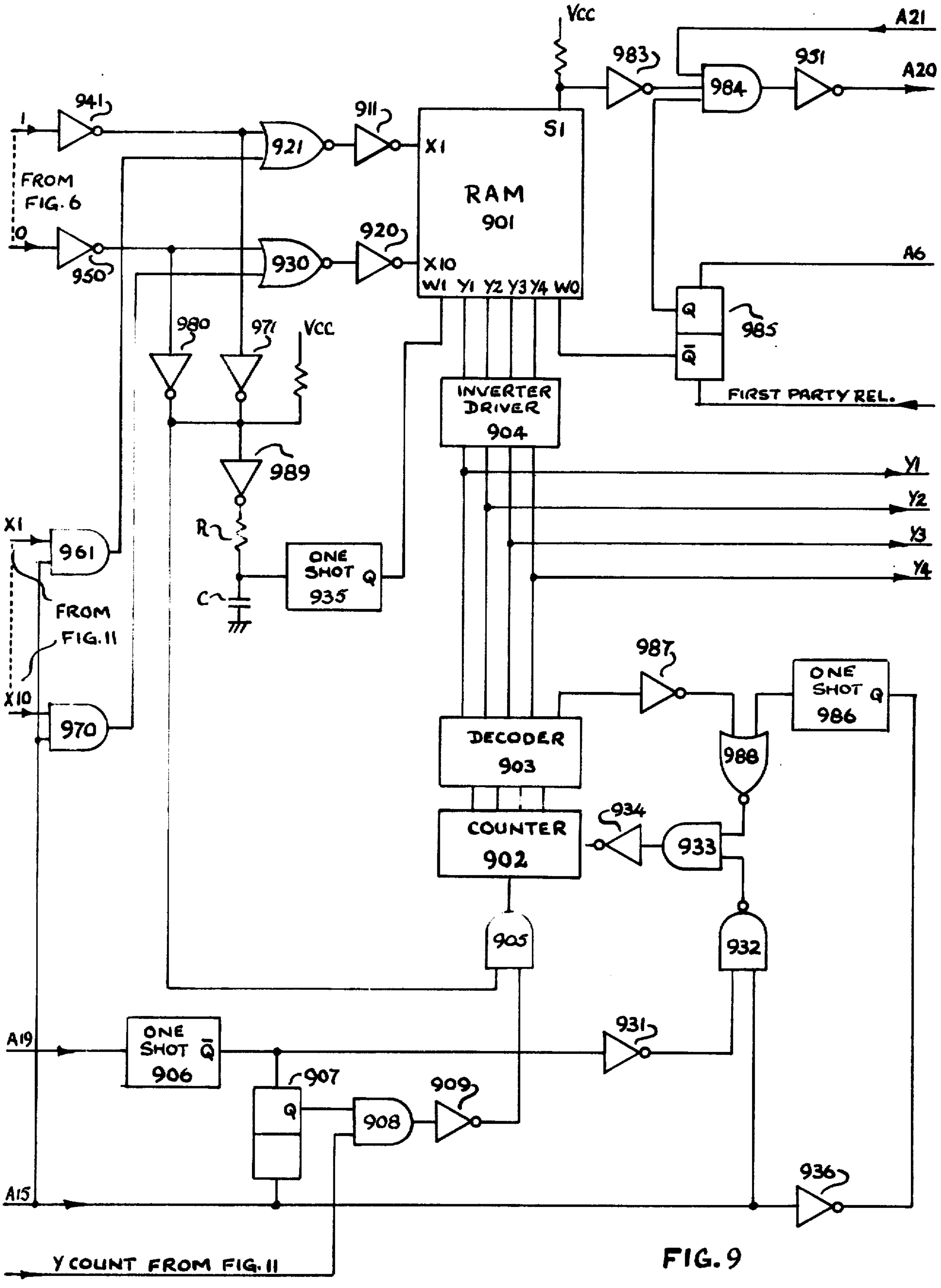
FIG. 9 is a schematic diagram of the ID memory circuit utilized in the present invention.

The channel memory circuit is illustrated in FIG. 9 of the accompanying drawings. The basic memory element 901 is a 12 × 4 bit matrix random access memory (RAM). In one practical embodiment the memory unit 901 consists of three 16-bit scratch pad memories of the type manufactured by Motorola Corporation as part No. MC4005. Each of the three individual scratch pad memories is arranged as a 4 × 4 bit matrix; the Y select lines of each are connected in series thus forming the required 12 × 4 bit random access memory. Only 10 of the 12 X select input lines are utilized, one for each of the 10 possible digits to be stored. When the write enable input terminal W1 is at a binary 1 level, those X select input lines on which a binary 1 appears cause a binary 1 to be written into the memory at the corresponding X location of the Y column whose Y select line is enabled by a binary 1 signal. Thus, a binary 1 is written into the X3, Y1 matrix location if the X3 select input line, the Y1 select input line and the W1 input terminal all receive binary 1 signals simultaneously.

The Y select input lines are driven by a circuit including a binary counter 902, the count from which is decoded and comutated onto five sequentially actuated output lines by binary count decoder 903. The output signals from decoder 903 are the four Y driver signals, Y1 through Y4, which are applied to a set of inverting amplifiers to drive the corresponding Y select lines of memory 901. In addition the output signals from decoder 903 are applied to a Y enable circuit described subsequently in reference to FIG. 10.

The X select input lines X1 through X10 are driven by respective logic inverter elements 911 through 920 respectively. These inverters are in turn driven by respective two-input NOR gates 921 through 930. One input to each of NOR gates 921 through 930 is derived from a respective logic inverter 941 to 950 which in turn is driven by a corresponding digit pulse from the DTMF decoder of FIG. 6. Thus the signal representing output digit 1 from FIG. 6 is applied to inverter 941 which in turn applies its signal to NOR gate 921 to feed inverter 911 and the corresponding X1 select line.

The second input signal to each of NOR gates 921 to 930 is derived from a two-input AND gate 961 through 970. One input signal to each AND gate 961 through 970 is a corresponding X driver signal, X1 through X10, derived as described below in reference to FIG. 11. The second input signal to each of AND gates 961 through 970 is the I.D. Sequence Start Signal (A15) derived from the $\overline{Q}$ output terminal of flip-flop 713 in FIG. 7. This signal is binary 0 during the interval between the start and stop pulses in an identification sequence transmitted to the channel circuit at the base station from a calling mobile station.

The digit input signals 1 through 10 received from FIG. 6 are also applied to a wired NOR circuit, including inverters 971 through 980, respectively, which in turn feeds the count input terminal for the Y select binary counter 902 via two-input AND gate 905. A binary zero appearing on any one of the signal lines 1 through 10 from the DTMF converter increments the count at counter 902. Alternatively, counts may be applied through gate 905 to the count input terminal of counter 902 from a two-input AND gate 908. Specifically, AND gate 908 receives the Q output signal from flip-flop 907 and the Y count signal (from FIG. 11) as its input signals. A15 resets flip-flop 907 which provides a Q signal at binary zero during an I.D. sequence to disable gate 908. The Y-count signal is generated in a manner described below in relation to FIG. 11.

Memory unit 901 may be read at any matrix location by activating the appropriate X and Y select input lines when the write input terminals WO and W1 are at the binary 0 level. The read output terminal S1 of memory unit 901 remains at binary 1 unless the location being read contains a stored bit (binary 1) at which time the signal at terminal S1 changes to binary 0. This binary 0 is inverted by logic inverter 983 and applied to three-input AND gate 984. A second input signal to AND gate 984 is the channel enable signal A21. The third input signal for AND gate 984 is the output enable signal which is derived from the Q output of flip-flop 985. The output signal from AND gate 984 is inverted by inverter 951 which has an open-collector type of output connected in common to inverters 951 in all other channels. This output signal, designated A20, constitutes the commutated memory output signal and is utilized in FIG. 11 to identify the appropiate meter circuit to be enabled.

A preset-reset flip-flop 985 is preset by the marker control signal A6 generated by flip-flop 709 in FIG. 7. Flip-flop 985 is reset by the first party release signal. A one shot multivibrator 986 is triggered by the I.D. sequence start signal A15 and provides binary 1 to two-input NOR gate 988 which in turn provides logic 0 to one input of the two input AND gate 933. The output of 933 goes to binary 0 and is inverted by inverter 934 to reset counter 902. Also applied to gate 988 is the decoded five count output signal from decoder 903.

Operation of the circuit of FIG. 9 proceeds in the following manner. As previously described, signal A15 becomes binary 0 at the start of an I.D. sequence. This binary 0 signal is applied to flip-flop 907 which is reset and provide binary 0 from its Q output to AND gate 908 to inhibit passage of the Y control pulses through that gate via inverter 909 and gate 905 to the count input of counter 902. In addition, the binary 0 A15 signal triggers one-shot multivibrator 986 via inverter 936 to provide a reset signal to the counter via NOR gate 988, AND gate 933, and inverter 934. The first DTMF digit pulse decoded in the DTMF decoder of FIG. 6 produces a corresponding binary 0 pulse on one of the 10 digit input lines in FIG. 9. This pulse is also applied via the inverter wired-NOR gate and gate 905 to the count input terminal of counter 902 which steps on the leading edge of this pulse to position 1. The output signals from decoder 903 are normally binary 1 but become binary 0 in response to the appropriate count being registered in counter 902. The 1 output signal of decoder 903 is thus binary 0 at this time and is inverted in inverter 904 to apply a binary 1 signal to the Y1 select line of memory 901.

The input digit pulse is inverted by its corresponding inverter, 941 through 950, to apply a binary 1 to the appropriate NOR gate 921 through 930. The output signal from that gate is rendered at the binary 0 level and is inverted by the corresponding inverter 911 through 920 to apply a binary 1 to the corresponding X select input line. By the same token, each binary 0 digit pulse is inverted by inverter 989 to apply a binary 1 pulse to one-shot multivibrator 935 via an RC delay circuit. The RC delay is just long enough to be greater than the total time constant of all components in the loop between the input to inverter 989 and the input of the Y line to the memory. One-shot 935 generates a short duration pulse after the appropriate Y line in the memory has risen to logic 1. The appropriate digit is therefore written into the corresponding X location of the Y1 column of the memory unit. The pulse generated by one-shot 935 is shorter than the 40 MS duration of the I.D. pulse, and is repeated for each pulse received at the input lines 1 through 10 from the I.D. decoder.

The second, third and fourth identification digits are written into appropriate locations in the Y2, Y3 and Y4 columns of the memory unit in the same manner, counter 902 being stepped upon receipt of each digit pulse. After the fourth digit pulse is received, signal A15 is returned to its binary 1 state by the I.D. stop pulse processed in FIG. 7. When signal A15 is binary 1, AND gate 908 is enabled to permit the Y control pulses to pass therethrough and sequentially increment counter 902. Counting does not take place until the timing circuit causes counter 902 to reset by means of a logic 1 signal (A19) applied to one-shot multivibrator 906. One-shot 906 operates flip-flop 907 and also causes counter 902 to reset via inverter 931 and two input NAND gate 932. The binary 1 signal from A15 also enables gate 905 to permit recommencement of counting.

The memory unit 901 of each channel circuit may be read during the portion of the system interrogation cycle (reference FIG. 11) dedicated to that channel. Specifically, during the stated portion of the system interrogation cycle, the channel enable signal A21 is at binary 1 level and thereby primes AND gate 984. An input signal to each of AND gates 961 through 970 (A15) has already been described as having returned to the binary 1 level. Consequently the signals X1 through X10, received from FIG. 11, determine the states of AND gates 961 through 970. Each gate provides a binary 0 output signal unless its corresponding X input signal is in the binary 1 state. As described below in reference to FIG. 11, these X1 through X10 input signals are sequentially rendered binary 1 so that each of gates 961 through 970 is switched to its binary 1 state in sequence. The binary 1 condition of these gates is applied to corresponding NOR gates 921 through 930. The activated NOR gate applies a binary 0 signal to a corresponding inverter 911 through 920 so that each X select line of memory unit 901 is activated in sequence as each X1 through X10 input signal is activated. The stepping from signals X1 through X10 proceeds at a faster rate than the pulse repetition rate of the Y control pulses applied to counter 902, the rate being synchronized such that the entire column of X select lines is sequentially activated before the count in counter 902 can be incremented.

The output terminal S1 remains at binary 1 until a stored bit is found at an interrogated matrix location, at which time terminal S1 switches to the binary 0 state. The corresponding output signal from AND gate 984 also switches to binary 1 at this time, assuming that signal A21 is at the binary 1 level. Derivation of signal A21 is described in relation to FIG. 11.

As each Y column is scanned, each X location in that column in which a bit is stored produces a binary 0 pulse at terminal S1 in time synchromism with a unique combination of one X driver pulse and one Y driver pulse. It is this time synchronization which, as subsequently described, enables the binary 1 output pulse from AND gate 984 to be properly utilized.

When the interrogate sequence is completed the Y decoder 903 steps to position five and resets counter 902. At the termination of a call, the first party release signal resets flip-flop 985 to provide a binary 1 $\overline{Q}$ signal to the Wo terminal of memory unit 901 and a binary 0 Q to disable AND gate 984. The X and Y driver signals continue to step in the same sequence described; but with the Wo input terminal at binary 1, a zero is written into all memory locations in the matrix, thus clearing the memory.

Importantly, the binary 0 pulses appearing on signal line A20, and which represent stored digits in memory unit 901, are applied through a wired NOR gate consisting of inverter 951 and other similar inverters in other four digit memories in other channels, to a common line for all channels. Thus the circuit of FIG. 9 for channel 1 has its A20 signal connected to the A20 signal provided by the FIG. 9 circuit present in each channel. A binary 0 A20 signal from any channel renders the NOR gate output signal binary 0. These combined signals cannot be confused as between channels since only one channel at a time can have its AND gate 984 enabled.

Y Enable Circuit

In order to properly decode the commutated memory output signal, A20, for use by the meters as described below relative to FIG. 14, it is necessary to utilize signals Y1 through Y4 which are derived from decoder 903 of FIG. 9. Further, since the A20 signals of all channels are connected to a common gate, it is necessary to commutate the Y1 through Y4 signals for each channel. The need for this will be understood more fully with reference to FIG. 14 as described subsequently; however for present purposes reference is made to FIG. 10 of the accompanying drawings wherein the Y enable circuit is illustrated and has for its purpose the commutation of the Y1 through Y4 signals of all channels onto a common set of four lines.

Figure 10:
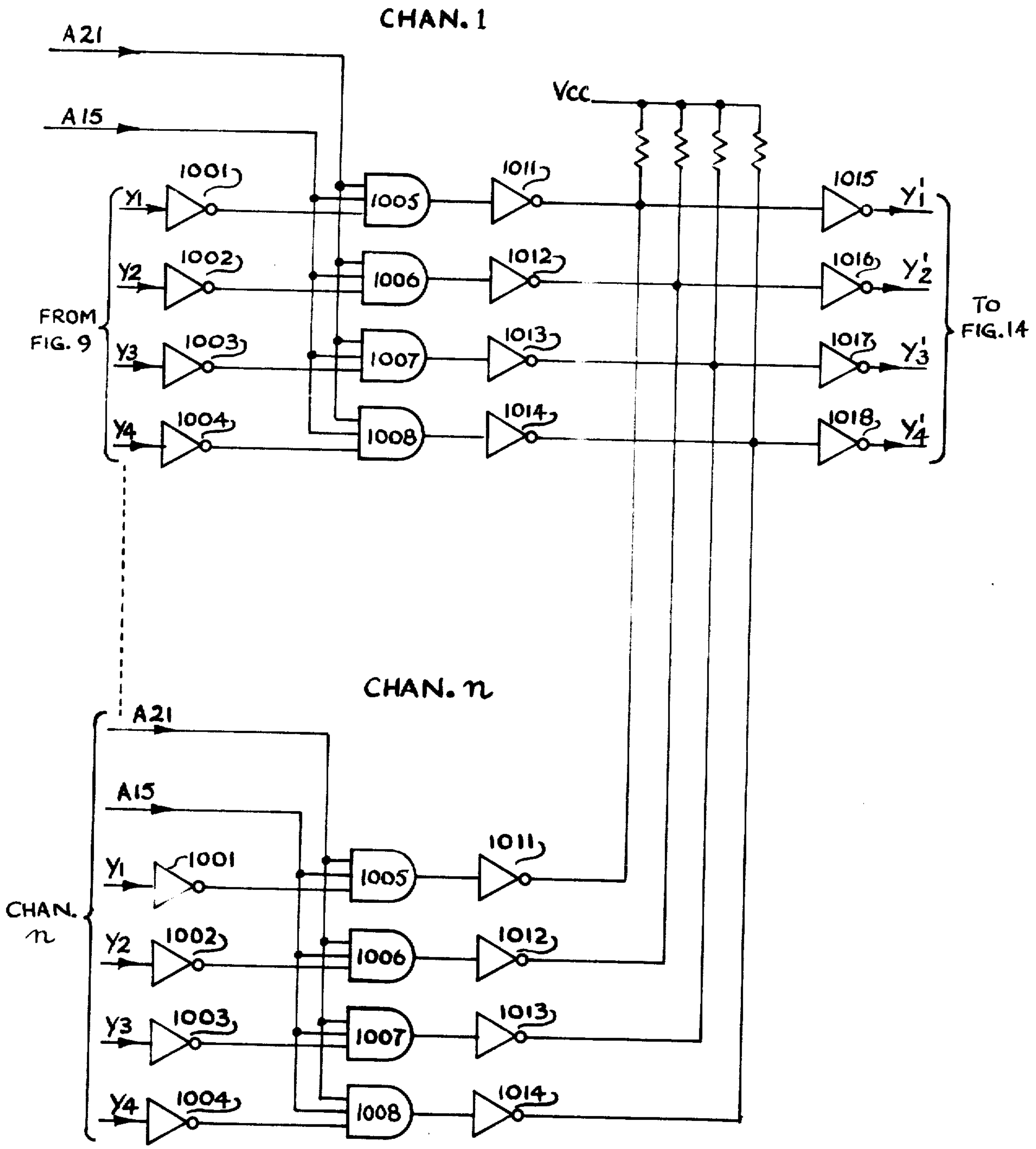
FIG. 10 is a schematic diagram of the Y-enable circuit utilized in the present invention.

As illustrated in FIG. 10, the four output signals Y1 through Y4 from decoder 903 in FIG. 9 are applied to respective logic inverters 1001 through 1004. The output signal from the inverters are applied to respective three-input AND gates 1005 through 1008. A second input signal to each of AND gates 1005 through 1008 is derived from signal A15, the I.D. sequence start signal from the control pulse detector circiut in FIG. 7. The third input signal to each of AND gates 1005 through 1008 is the channel enable signal A21 which is active whenever the channel 1 memory unit 901 is being interrogated.

The output signals from AND gates 1005 through 1008 are applied to respective logic inverters 1011 through 1014. The circuitry thus far described in FIG. 10 is repeated for every channel and the output signals from inverters 1011 through 1014 are tied together with respective inverters in other channels. The combined or commutated signals are applied to another set of four respective inverters 1015 through 1018 to derive the commutated output signals Y'1 through Y'4. These signals are applied to and utilized by all of the system meter circuits (FIG. 14) in the manner to be described subsequently.

The circuit of FIG. 10 is a combining circuit for all channels so that unlike the circuits of FIGS. 6 through 9, which are repeated for every channel, the circuit of FIG. 10 appears only once and serves the entire base station.

Timing Circuit

Figure 11:
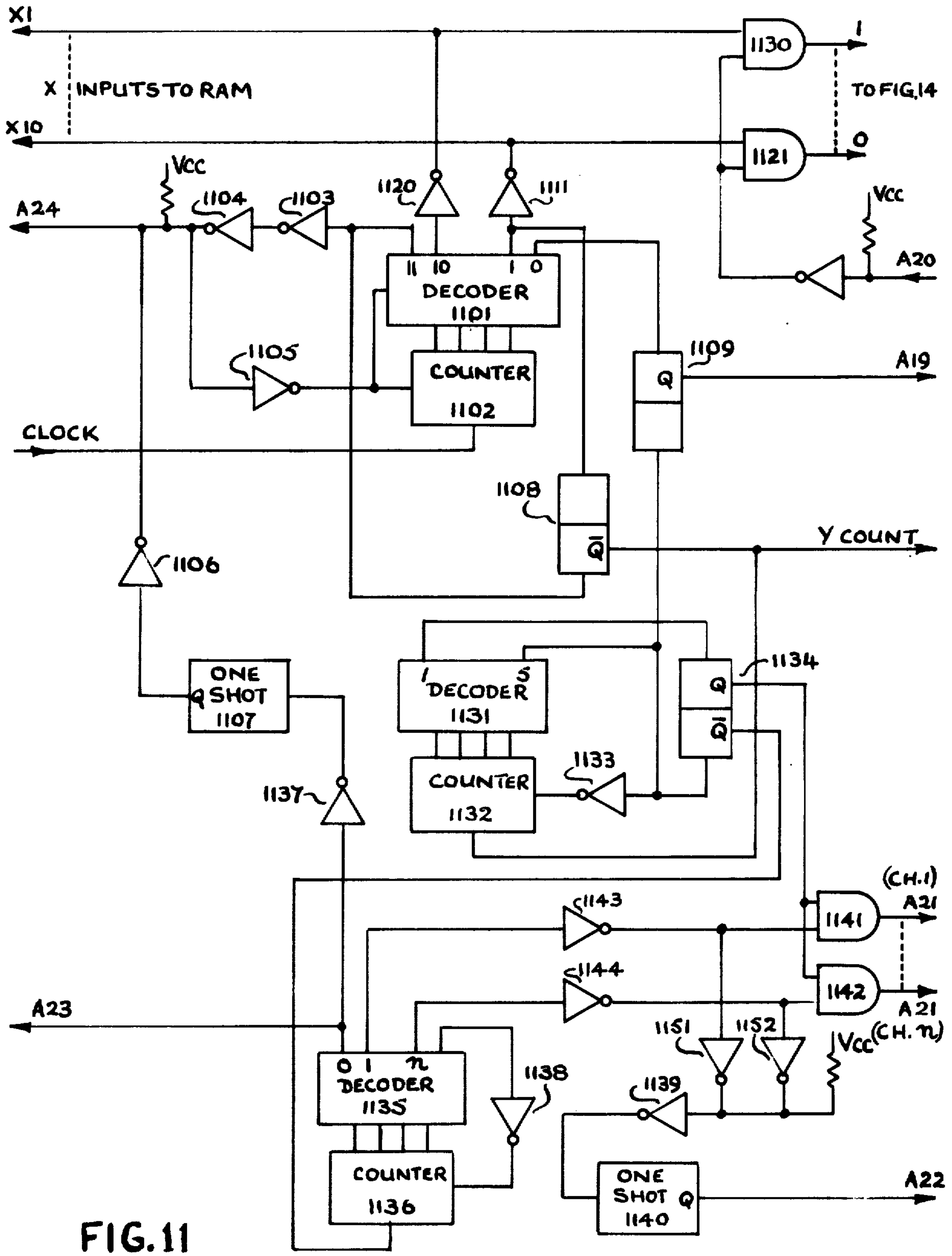
FIG. 11 is a schematic diagram of the master timing circuit utilized in the present invention.

The signal timing circuit illustrated in FIG. 11 is common to all channels of the system. This circuit serves the following functions: generation of primary timing signals for the system; sequential interrogation of the memories in each channel so that metering of the various mobile stations can be effected without ambiguity; prevention of erroneous data from being fed to the meter circuits; generation of the X driver signals utilized in FIG. 9; and commutation of the memory data appearing on signal line A20 into 10 discrete digit signals.

Clock pulses from a basic system clock oscillator (not shown) are applied to the count input terminal of counter 1102 which is initially assumed to be reset at zero count. Flip-flop 1109 is set at this time and provides a binary 1 Q output signal (A19) which enables counting in the memory circuit of FIG. 9. At the trailing edge of a clock pulse the count in counter 1102 changes to 1 and decoder 1101 provides a corresponding output signal. Flip-flop 1108 is operated thereby and a binary 0 is provided from the $\bar{Q}$ output terminal of that flip-flop to the memory circuit of FIG. 9, thereby forcing the Y decoder in the memory circuit to address Y position 1 in the memory.

Decoder 1101 is arranged to provide a binary 0 signal only on the output line corresponding to the current count in binary counter 1102. Consequently, when the count in counter 1102 is 1, a binary 1 appears at the output terminal of inverter 1111 and is applied to signal line X1 of the memory circuit (FIG. 9) in all channels.

The binary 0 $\bar{Q}$ output from flip-flop 1108 ia also causes counter 1132 to increment, forcing decoder 1131 to position 1. Flip-flop 1134 operates in response to this count and provides a binary 1 from its Q output terminal to two-input AND gates 1141 and 1142. The $\bar{Q}$ output signal from flip-flop 1134 becomes binary 0, causing counter 1136 to increment and forcing decoder 1135 to step to position 1. The resulting binary 1 output signal from inverter 1143, combined with the binary 1 Q output signal from flip-flop 1134, result in the actuation of AND gate 1141, providing a binary 1 channel enable signal (A21) for channel 1.

Inverters 1151 and 1152 form a wired-NOR gate (along with corresponding inverters from all other outputs from decoder 1135) which provide a binary 0 to the input terminal of inverter 1139. This inverter provides a binary 1 input signal to one shot multivibrator 1140 which in turn provides a pulse on output line A22. This pulse is a release pulse which is applied to the subscriber metering circuits in FIG. 14.

Counter 1102 continues to be incremented by the clock pulses, thereby acting through decoder 1101 and inverters 1111 through 1120 to successively activate the individual X input lines to the memory circuit of FIG. 9. In addition AND gates 1121 through 1130 are successively activated to provide signals utilized in the meter memory circuit described below in relation to FIG. 14.

When counter 1102 reaches a count of 11, decoder 1101 provides a binary 0 signal to inverter 1103. The latter applies a binary 1 signal to inverter 1104 which forms part of a wired-NOR gate with inverter 1106. The output signal from the wired-NOR gate is derived from inverter 1105 and becomes binary 1 at this time to reset counter 1102 and decoder 1101.

The binary 0 output signal from decoder 1101, occurring during count 11 in counter 1102, causes flip-flop 1108 to reset. Thus as counter 1102 is stepped to position 1 by the next clock pulse, the cycle described above repeats itself. Flip-flop 1108 is again set at count 1, causing the Y counter of the selected memory circuit to step to the next Y position. Counter 1132 is incremented by each setting of flip-flop 1108. When four complete cycles of eleven X counts have been completed, counter 1132 is incremented to a count of five, causing the position five output signal from decoder 1131 to reset flip-flop 1134. Counter 1132 and decoder 1131 are also reset at this time. The Q output signal from flip-flop 1134 disables AND gates 1141 and 1142. The transition to binary 0 at the $\bar{Q}$ output signal from flip-flop 1134 increments counter 1136, forcing decoder 1135 to address the next channel when counter 1102 steps to position 1; also AND gates 1141, 1142, etc., receive binary 1 signals so that the AND gate corresponding to the addressed channel is enabled.

After each of the N channels has been enabled in turn by counter 1136 and decoder 1135, the N+1 position of decoder 1135 applies a binary 0 channel sync pulse (A23) to indicate that all channels have been enabled in turn and a new channel enable cycle is about to begin. This binary 0 pulse is applied to inverter 1137, causing one-shot multivibrator 1107 to provide a corresponding pulse to the wired-NOR gate described above via inverter 1106. Counter 1102 and decoder 1101 are reset thereby and operation proceeds as described above.

From the foregoing description it is noted that the channel whose memory circuit is currently being scanned is determined by the count in counter 1136. In the memory being scanned, the current Y position is determined by the count in counter 1132, and the current X position is determined by the count in counter 1102. Counter 1102 thus recycles from counts 1 thorugh 11 for each count increment in counter 1132. Counter 1132 likewise recycles its five counts during each channel enable interval as determined by a corresponding count interval in counter 1136.

Mobile Busy Memory

The Mobile Busy Memory Circuit is illustrated in FIG. 12. The object of this circuit is to return a busy tone to the calling subscriber when the mobile being called has originated and is in the midst of another call on any channel other than its assigned home channel. A busy tone is returned by other means, described herein, if the called mobile is engaged in a call on its assigned home channel.

The mobile busy memory circuit is basically similar to the four-digit I.D. memory of FIG. 9. The random access memory (RAM) 1201 comprises three 4 × 4 bit scratch-pad memories wired with their Y inputs, write 1 (W1), write 0 (W0) and read 1 (S1) terminals connected in common to form a 4 × 12 bit memory. Only 10 of the available 12 X inputs are used.

A binary 1 is entered into the memory by raising the X, Y and W1 terminals to binary 1 level simultaneously. The bit is then stored in the memory at the intersection of the X line and Y line which are raised to binary 1. In order to read from the memory the first Y line is raised to binary 1 and each of the X lines is raised to binary 1 in turn during this period; where a bit is stored in the memory the read output terminal S1 goes to binary 0.

The final four digits of the called mobile's number are fed into counter 1272 from input A48. Decoder 1271 responds by changing the respective output line, between 1 and 10, to binary 0. The binary 0 is then taken to the input of one of inverters 1261 through 1270, respectively, to apply binary 1 to one input of corresponding two-input AND gates 1251 through 1260. The second input of the gates 1251 through 1260 is taken from line A49, which is at binary 0 during the counting and decoding and returns to binary 1 upon completion of each specific digit count and decode. This input provides blanking for the memory input to prevent spurious counts being entered into the memory.

When the A49 blanking input returns to binary 1 the output of the particular gate in the group 1251 through 1260 goes to binary 1. Binary 1 is then applied to one input of a two-input OR gate in the group 1221 through 1230, to which it corresponds. The output of the NOR gate then goes to binary 0 and is inverted to binary 1 by one of inverters 1211 through 1220; the resulting output binary 1 is applied to the correct X input terminal of memory 1201.

The output of two-input AND gate in the group 1251 through 1260 which was switched as a result of input A48 applies binary 1 to its corresponding inverter in the group 1231 through 1240. The outputs of inverters 1231 through 1240 are connected in common with a common pull-down resistor to form a wired-NOR gate.

The binary 0 output of the wired-NOR gate is fed to one input of two-input AND gate 1205. The second input of gate 1205 is at binary 1, assuming set-reset flip-flop 1209 to be in the reset condition.

The output of gate 1205 becomes binary 0 and causes counter 1204 to operate. Decoder 1203 steps to output position 1 and provides binary 0 to the corresponding inverter driver 1202. The Y1 memory input is then raised to binary 1.

The output of inverters 1231 through 1240, forming a wired-NOR gate, are fed to the input of inverter 1273 which provides binary 1 to the input of the one-shot multivibrator 1274 via an RC delay circuit. The delay of this circuit is longer than the operational delay in the combined components forming the loop from the output of wired-NOR 1231 through 1240 via the gate 1205, counter 1204, decoder 1203 and inverter divider 1202 to the input Y1 and RAM 1201. The output of one-shot 1274 provides a positive pulse to the W1 input of RAM 1201. The pulse is delayed by the RC delay; thus the X and Y inputs of the RAM 1201 are at binary 1 prior to W1 changing to binary 1. The duration of the pulse given by the one-shot 1274 is short in comparison to the period of time the X input to RAM 1201 is at binary 1, even when the X inputs are deiven by the timer circuit as described hereafter. The W1 input to RAM 1201, therefore, changes back to binary 0 before either the X or the Y inputs change again.

All four digits are stored in RAM 1201 in this manner. When storage of the four final digits of the mobile is complete, input A50 which is normally at binary 1 is pulsed to binary 0 for a short duration and preset-reset flip-flop 1284 is reset.

The $\overline{Q}$ output of flip-flop 1284 applies binary 1 to two-input NAND gate 1281. The second input of gate 1281 is at binary 0 until a positive pulse is received on input A19 from the timer circuit. One-shot multivibrator 1210 provides a binary 0 pulse to the input of inverter 1208 which in turn applies a binary 1 impulse to the second input of gate 1281. The resulting binary 0 impulse from the output of gate 1281 is applied to one input of two-input AND gate 1279, the second input of which is in the binary 1 state. The output of gate 1279 changes to binary 0 and is inverted to binary 1 by inverter 1280. The binary 1 impulse from inverter 1280 causes counter 1204 and decoder 1203 to reset to the zero count position.

The binary 1 from $\overline{Q}$ output of flip-flop 1284 also enables the four-input AND gates 1241 through 1250. The binary 1 Q output of flip-flop 1284 also activates signal A52 to the mobile busy memory control circuit in FIG. 13.

The binary 0 $\overline{Q}$ output pulse of one-shot 1210 causes preset-reset flip-flop 1209 to be preset. The Q output of flip-flop 1209 applies binary 1 to the second inputs of gates 1241 through 1250. Binary 1 from the Q output of flip-flop 1209 is applied to one input of two-input AND gate 1207. The second input of gate 1207 is derived from the Y count output of the timer circuit in FIG. 11. When the Y count output of the timer is active as previously described, the second input to gate 1207 becomes binary 1. The output of gate 1207 goes to binary 1 which is fed to inverter 1206 which in turn provides a binary 0 input to one-input of two-input AND gate 1205. The second input of gate 1205 is at binary 1 and the output goes to binary 0 causing counter 1204 to operate and decoder 1203 to step to position 1.

Provided that neither 0 or 9 have been dialed as an access digit by a mobile subscriber, the output of two-input NOR gate 1285 is at binary 1; thus when the commutating binary 1 impulses are applied to the fourth input of gates 1241 through 1250 in turn, these gates each operate, applying binary 1 to gates 1221 through 1230 in turn. The binary 0 outputs of gates 1221 through 1230 are inverted by inverters 1211 through 1220 and applied as binary 1 to each of the RAM X input terminals in turn. As each pair of X and Y lines are raised to binary 1, RAM 1201 is read and when a binary 1 is stored in the addressed location, the S1 output terminal goes to binary 0, causing a binary 0 to be signalled on output line A47.

At the end of a call the first party release input goes to binary 0 and preset-reset flip-flop 1275 is reset. The $\overline{Q}$ output of flip-flop 1274 supplies binary 1 to the Wo input of the RAM 1201. The output-signal line A53 also goes to binary 0.

The commutating X and Y inputs to the RAM continue to operate as described above, being driven by the timer circuit (FIG. 11). Binary 0 is written into all memory calls of the RAM, which is cleared thereby.

Mobile Busy Memory Control

The mobile busy memory control circuit is shown in FIG. 13. The purpose of this circuit is to control the specific digits which are to be stored in the mobile busy memory circuit shown in FIG. 12.

When a mobile subscriber is called via the public telephone system the central office equipment repeats only the final four digits of the called number. These digits are stored directly in the base station mobile busy memory (FIG. 12). However, when a mobile subscriber calls another mobile subscriber, seven digits are handled by the base station equipment. As it is necessary to store only the final four digits in the mobile busy memory, digit absorbing circuitry is employed. The circuit also discriminates between an out-of-service mobile and a mobile temporarily engaged in other communication, and transmits either the out-of-service tone or busy tone accordingly. When either a mobile subscriber calls another mobile subscriber or the operator calls a mobile subscriber, the operation sequence is the same.

If a mobile subscriber calls another mobile or the operator originates the call, the dial impulses from the mobile signalling decoder or from the operator dial are fed into inverters 1333 or 1335, respectively. The three inverters 1333, 1334 and 1335 are of the open collector output variety and use a common resistor to form a wired-NOR gate. The dialed impulses cause the output of inverter 1333 or inverter 1335 to pulse to binary 0. The output of inverter 1332 pulses to binary 1 and causes the relay 1311 to respond. The relay wiper contact grounds one input of two-input NAND gates 1309 and 1310 alternately. Gates 1309 and 1310 from an anti-bounce circuit which prevents any contact noise from the pulse forming relay 1311 from being further transmitted in the logic circuitry.

The integrator circuit 1312 has a time constant of less than 150 ms and greater than 125 ms so that each series of dial impulses constituting a digit appears as a single pulse at the output of integrator circuit 1312. At the start of each impulse train the output of the integrator circuit 1312 becomes binary 0. This binary 0 is supplied via output A49 to the mobile busy memory (FIG. 12) at one input of the gates 1251 through 1260 and forms the blanking signal. The binary 0 signal is also applied to the clock input of clocked flip-flop 1315 which thereby operates. Two clocked flip-flops 1315 and 1316, along with the two input AND gate 1317, form a divide-by-three circuit. As stated above, flip-flop 1315 is operated and sets, applying binary 1 to the clock input terminal of flip-flop 1316 which does not operate. The J and K input terminals of both flip-flops 1315 and 1316 are at supply voltage equivalent to binary 1.

On the next binary 0 impulse from gate 1313, flip-flop 1315 operates again and the Q output supplies binary 0 to the clock input of flip-flop 1316. Flip-flops 1315 and 1316 operate on the falling edge of a pulse going from the binary 1 state to the binary 0 state.

The binary 0 input to the clock input of flip-flop 1316 causes it to operate, supplying binary 1 from its Q output to one input of gate 1317. The second input of gate 1317 is presently at binary 0.

On the third digit impulse train the gate 1313 output again becomes binary 0, for the duration of the impulse train, and causes flip-flop 1315 to operate once more. The Q output of flip-flop 1315 now supplies binary 0 to the second input of gate 1317 which then operates. The binary 1 output of gate 1317 is applied to the input of inverter 1314 which applies binary 0 to one input of gate 1313 and disables it. Thus no further digits are counted by the divide-by-three circuit comprising flip-flops 1315, 1316 and gate 1317 until the flip-flops 1315 and 1316 are reset by the first party release at the end of the call.

The binary 0 output of gate 1317 is applied via inverter 1314 to one input of two-input AND gate 1318 which had remained at binary 0 during the dialing of the first three digit impulse trains. On commencement of the impulse train corresponding to the fourth dialed digit, the second input to gate 1318 receives binary 1 impulses as per previous digits dialed. However, gate 1318 now operates and provides binary 1 impulses to one input of two-input NOR gate 1320. The binary 0 impulses are relayed via output line A48 to counter 1272 in FIG. 12 which operates and causes decoder 1271 to step accordingly.

The binary 0 impulses from the output of gate 1320 are applied to the input clock terminal of clocked flip-flop 1326. The three clocked flip-flops 1326, 1327 and 1328 form a divide-by-four circuit. Assuming the three flip-flops 1326, 1327 and 1328 are all in the reset condition, the initial binary 0 pulse from the output of gate 1320 causes flip-flop 1326 to operate. The binary 1 from the Q output of flip-flop 1326 is applied to the clock input of flip-flop 1327 which remains unoperated. On the second binary 0 impulse from gate 1320 the flip-flop 1326 again operates, causing the output of its Q terminal to go to binary 0. Flip-flop 1327 now operates and its Q output supplies binary 1 to the clock input of flip-flop 1328 which remains unoperated. The third binary 0 impulse to the clock input of flip-flop 1326 causes it to operate, providing binary 1 to the clock input of flip-flop 1327 which does not operate. The fourth binary 0 impulse to the clock input of flip-flop 1326 causes it to operate, providing binary 0 from its Q output to the clock input of flip-flop 1327 which operates, causing its Q output to go to binary 0. The binary 0 from the Q output of flip-flop 1327 causes flip-flop 1328 to operate and supply binary 1 to one input of two-input NOR gate 1324. The output of gate 1324 changes to binary 0 which is inverted by inverter 1323, and binary 1 is applied to the one-shot multivibrator 1322.

The binary 1 Q output of one-shot 1322 is applied to the output line A51 which in turn resets counter 1272 and decoder 1271 to zero position in FIG. 12. The $\bar{Q}$ output of the one-shot 1322 is applied via signal line A50 to flip-flop 1284 (FIG. 12) which is reset by the binary 0 pulse. The binary 1 output of inverter 1323 is applied to one input of four-input AND gate 1302. Binary 1 is applied to the second input of gate 1302 from input A52 from the mobile busy memory circuit FIG. 12. The third input to gate 1302 is 1 from input A53 from the mobile busy memory FIG. 12.

The fourth input to gate 1302 is derived as follows: The input signal line A47 from the output S1 of RAM 1201 (FIG. 12) is inverted by inverter 1301. When no stored binary 1 bit is present in the memory cell being interrogated, the signal input line A47 is at binary 1; thus the output of inverter 1301 is at binary 0. Regardless of the binary condition of input line A20, the output of two-input NAND gate 1336 is binary 1. The signal input A20 is derived from the commoned outputs of all channel I.D. memories; thus when a binary 1 bit is present in the memory cell of the memory being interrogated, input A20 goes to binary 0. The output of inverter 1337 then becomes binary 1. Thus if a binary 1 bit is stored in any I.D. memory in the same X-Y location as a similar binary 1 bit is stored in the mobile busy memory, both inputs to gate 1336 go to binary 1. Gate 1336 operates giving binary 0 to the fourth input to gate 1302 which switches to provide an output of binary 0.

The clocked flip-flops 1303, 1304 and 1305 form a divide-by-four circuit and operate in the same manner as the divide-by-four circuit comprising clocked flip-flops 1326, 1327 and 1328. The binary 0 input to the clock terminal of flip-flop 1303 causes it to operate. A series of four transitions from binary 1 to binary 0 at the output of gate 1302 cause flip-flop 1305 to operate and give binary 1 from its Q output to one input of three-input AND gate 1306. The second input to gate 1306 is at binary 1 from binary 0 on A55. The third input to gate 1306 is from the Q output of preset-reset flip-flop 1342 and is derived in the following manner.

Assuming flip-flop 1342 to be in the reset condition, one input of each of two-input AND gates 1346 and 1347 is enabled, one at a time, by binary 1 on output line A21 from the timing circuit of FIG. 11. As channels 1 through N are commutated, if a decode complete signal has been returned by the called mobile to any channel, the A54 input line is at binary 1. Thus, if the second input of gate 1346 or 1347 goes to binary 1 these gates operate accordingly, providing binary 1 to one or other input of two-input NOR gate 1343 which in turn provides binary 0 to the preset-reset flip-flop 1342. The flip-flop 1342 operates and output Q applies binary 1 to one input of gate 1306. Gate 1306 operates and applies binary 1 to the busy tone switch which turns on and transmits busy tone to the calling subscriber.

Assuming that the channel being described is channel 1, then A54 inputs to gates 1346 and 1347 are taken from channels 2 through N; Input A53 comes from channel 1 only.

If on commutating channels 2 through N gates 1346 or 1347 are not operated to give binary 1 to one or other input of gate 1343, it can be said that the called mobile is out-of-service. Approximately 300 ms after dialing the called mobile, A16 input goes to binary 1 and enables gate 1308, provided that a decode complete signal has not been received on channel 1. Input line A55 and the inhibiting inverter 1307 provide second and third binary 1 inputs to gate 1308. The fourth input to gate 1308 is from the $\overline{Q}$ output of flip-flop 1342 which is at binary 1 in the reset condition. Gate 1308 is operated and provides binary 1 to the out-of-service tone switch which turns on and transmits out-of-service tone to the calling subscriber.

When the called mobile returns a decode complete signal on channel 1, input signal line A55 goes to binary 0 condition and inhibits both gates 1306 and 1308 so that busy tone and out-of-service tone are disabled.

One-shot multivibrator 1331 and clocked flip-flop 1330 form a timed release circuit. The purpose of this circuit is to release the calling channel after a predetermined interval, twenty seconds for example, after either the busy or out-of-service tones have been received. The operation of the circuit is as follows.

When either gate 1306 or 1308 operates, providing either busy tone or out-of-service tone, respectively, one or other input of two input NOR gate 1338 goes to binary 1. The output of gate 1338 goes to binary 0 which is applied to the input of inverter 1339. The output binary 1 of inverter 1339 is applied to the input of one-shot 1331. A binary 1 pulse of long duration (e.g. 20 seconds) is produced by one-shot 1331 and applied to the clock input of flip-flop 1330. The J and K input terminals are wired to the supply voltage equivalent to binary 1. At the termination of the pulse, as the signal changes from binary 1 to binary 0, flip-flop 1330 operates. The binary 1 Q output causes the output of inverter 1329 to go to binary 0, causing the first party release to operate. Flip-flop 1330 is reset by the first party release and the channel is released. Inverter 1329 is of open collector output type and thus becomes part of the wired-NOR input for the first party release circuit of the channel.

When a mobile is called by a subscriber via the central office line, the central office interface sends binary 0 input to inverter 1321 and one input of gate 1313 which becomes disabled. The output of inverter 1321 goes to binary 1 and is applied to one input of two-input AND gate 1319, thus enabling it for passage of dial impulses. It will be seen that by inhibiting gate 1313, the first three digits dialed will not be absorbed but operate gate 1320 directly. The remaining operation for use by a central office subscriber is identical with the sequence described above.

The divide-by-four circuit (flip-flops 1303, 1304, 1305) is reset, via a diode OR gate by either the first party release signal or signal A22 as inverted by inverter 1351. The latter signal occurs each time counter 1136 (in FIG. 11) recycles, and is used here to prevent undesired compilation at the four digit receiver.

The Subscriber Metering Circuit

Figure 14:
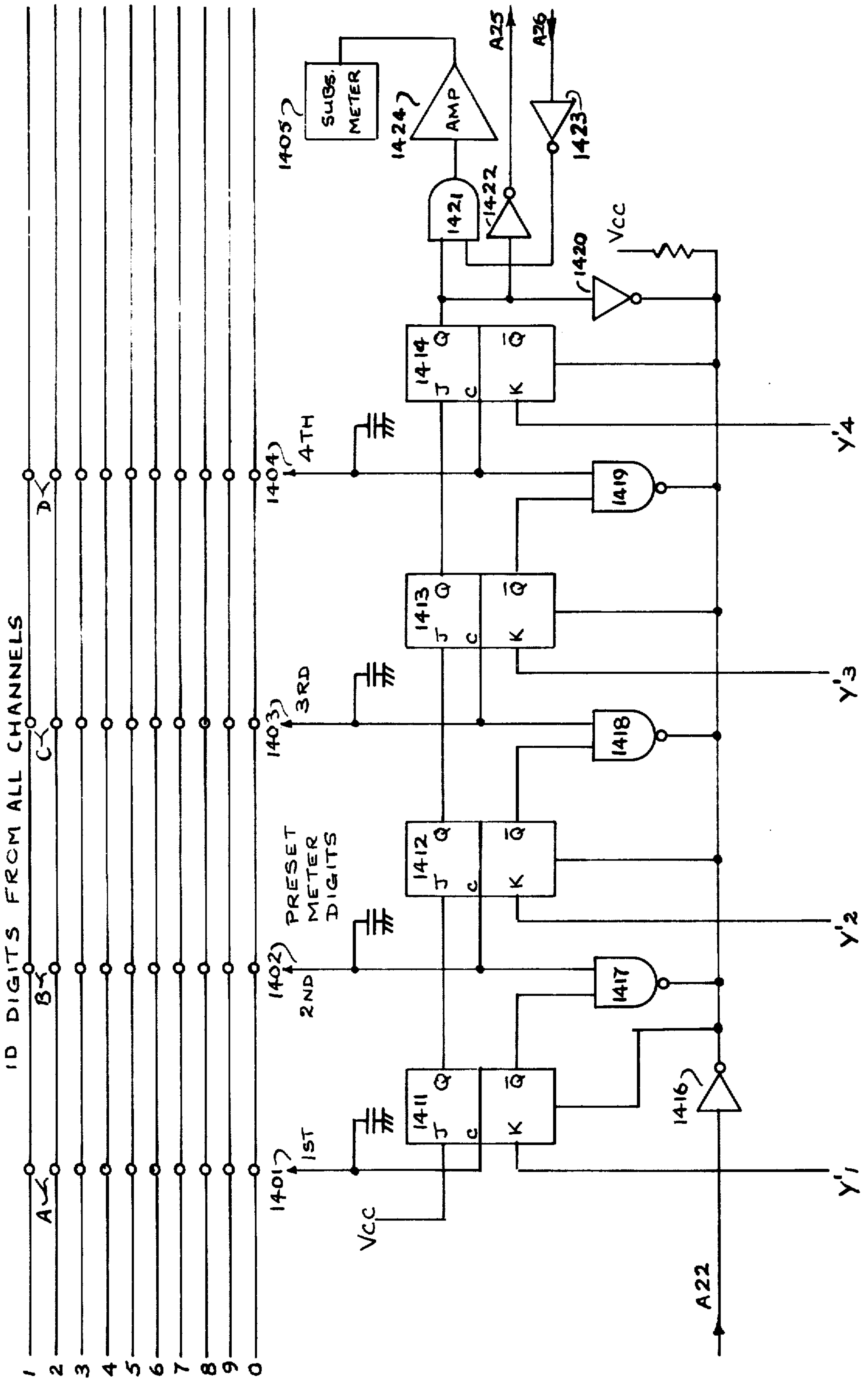
FIG. 14 is a schematic diagram of the subscriber meter circuit utilized in the present invention.

The subscriber metering circuit illustrated in FIG. 14 represents a circuit for only one of the many subscriber meters. In other words, the circuit of FIG. 14 is repeated for each subscriber to the system.

The ten digit lines are derived as described in FIG. 11. Thus the ten digit lines illustrated in FIG. 14 represents the commutated digit output signals from all of the N channels.

Considering specifically the single metering circuit of FIG. 14, the various digit lines are provided with four sets A, B, C and D of 10 jacks each, each digit line having a jack in each set so that 40 jacks in all are provided. Four plugs 1401 through 1404 are provided to correspond to the four digits identifying the subscriber whose meter 1405 is to be controlled. Plug 1401 is adapted to fit into any of jacks A in each of the ten signal lines and in fact is connected to the jack in set A in the signal line which corresponds to the first digit in the subscriber identification number. Likewise plug 1402 fits into the jack in set B corresponding to the second digit of the subscriber telephone number, plug 1403 fits into the jack in set C corresponding to the third digit in the subscriber telephone number, and plug 1404 fits into the jack in set D corresponding to the fourth digit in the subscriber telephone number. Plugs 1401 through 1404 are connected to the clock input terminals of respective clocked J-K flip-flops 1411 through 1414. Flip-flop 1411 receives a source of positive voltage at its J input terminal and the Y'1 synchronization signal from FIG. 10 at its K input terminal. The Q output signal from flip-flop 1411 is applied to the J input terminal of flip-flop 1412, and the K input terminal of flip-flop 1412 receives the Y'2 synchronization signal from FIG. 10. Flip-flops 1413 and 1414 are likewise connected to receive the Q output signal from the previous flip-flop stage at their J input terminals; the K terminals are driven by the corresponding synchronization signals Y'3 and Y'4.

The reset input terminal for each of flip-flops 1411 through 1414 is driven by a logic inverter 1416 which in turn is driven by the release signal A22 derived from one-shot multivibrator 1140 in FIG. 11. Specifically signal A22 provides a reset pulse for each of flip-flops 1411 through 1414 as the channel counter decoder 1135 steps to each channel position. The reset input terminals of the four flip-flops are also driven by NAND gates 1417, 1418 and 1419. NAND gate 1417 is driven by the $\bar{Q}$ output signal of flip-flop 1411 and the signal appearing on plug 1402. NAND gate 1418 is driven by the $\bar{Q}$ output signal of flip-flop 1412 and the signal appearing on plug 1403. NAND gate 1419 is driven by the $\bar{Q}$ output signal of flip-flop 1413 and the signal appearing on plug 1404.

The Q output signal from flip-flop 1414 is also applied to two input AND gate 1421 and to inverter 1422. Inverter 1422 provides the meter decode signal, designated A25, which is applied to the circuit of FIG. 15 for purposes to be described subsequently. The second input signal to AND gate 1421 is derived from inverter 1423 which is fed by signal A26. Signal A26 is the metering pulse derived in FIG. 15 in a manner to be described subsequently. The output signal from AND gate 1421 drives meter amplifier 1424 to in turn drive the subscriber meter 1405.

Assume flip-flops 1411 through 1414 to be initially reset. The binary 0 Q output signal from flip-flop 1414 inhibits AND gate 1421 to prevent actuation of subscriber meter 1405. If the four digit number corresponding to the identity of subscriber meter 1405 is returned as part of the automatic identification sequence on any channel, that number is stored in the memory unit 901 in FIG. 9. As that number is interrogated by the X and Y select drivers and is read from the memory unit during the channel enable interval for that memory unit, the jacks in sets A, B, C and D which are mated with plugs 1401, 1402, 1403 and 1404 successively receive binary 1 pulses. It is understood of course that the digit lines are normally at the binary 0 state except when a digit corresponding to that line is read out from one of the memory units in the various channels. When plug 1401 receives a binary 1 pulse, flip-flop 1411 will be set by the voltage applied to its J input terminal as the trailing edge of the binary 1 pulse changes again from logic 1 to logic 0. The resulting binary 1 Q output signal from flip-flop 1411 is applied to the J input terminal of flip-flop 1412 so that when plug 1402 receives its binary 1 pulse the trailing edge of that pulse will cause flip-flop 1412 to be set. In a similar manner flip-flops 1413 and 1414 are set by the trailing edges of binary 1 pulses appearing on their respective plugs 1403 and 1404. The flip-flops thus recognize their identification number and a binary 1 signal is applied to AND gate 1421. In addition the Q output signal from flip-flop 1414 is applied through inverter 1422 as a binary 0 meter decode signal A25. Signals A25 from each metering circuit (that is, from all subscriber meters) are tied together and applied to the circuit of FIG. 15 in each channel. The resulting common A25 signal line is therefore maintained at binary 1 unless one of the meter circuits has decoded its identification number at which time the common A25 signal becomes binary 0. The logic 1 of output Q of flip-flop 1414 is applied to inverter 1420 which immediately cause the flip-flops 1401, 1402, 1403 and 1404 to reset.

As will be described subsequently in relation to FIG. 15, signal A26 is normally binary 1 but becomes binary 0 momentarily when a call has been completed (that is to say, the called party has answered) in the channel which is currently enabled. Thus, on completion of the call AND gate 1421 receives a binary 1 pulse on its second input terminal and increments subscriber meter 1405.

It should be noted that flip-flops 1411 through 1414 assure that the proper sequence of identification numbers must be present before the subscriber meter is decoded. Specifically, if flip-flop 1412 has not been previously set by a corresponding digit pulse on its clock input terminal, subsequent appearance of a clock pulse on plug 1403 for flip-flop 1413 cannot set flip-flop 1413 because the Q output signal from flip-flop 1412 is still binary 0. Likewise flip-flop 1414 cannot be set and AND gate 1421 is not primed. When the binary 1 pulse on plug 1403 does occur without flip-flop 1412 having first been set, the leading edge of the binary 1 pulse on plug 1403 actuates NAND gate 1418 to reset all of flip-flops 1411 through 1414. Specifically, since flip-flop 1412 is reset and provides a binary 1 $\bar{Q}$ output signal, the transition from binary 0 to binary 1 at the commencement of the binary 1 pulse on plug 1403 produces a negative-going transition at the output of 1418 which resets the flip-flops.

The release pulse appearing on signal line A22, generated in a manner described above in relation to FIG. 11, serves to reset flip-flops 1411 through 1414 in all subscriber meter circuits as each channel is enabled. This minimizes the possibility of registering spurious counts at the meter circuits.

Channel Metering Control

Figure 15:
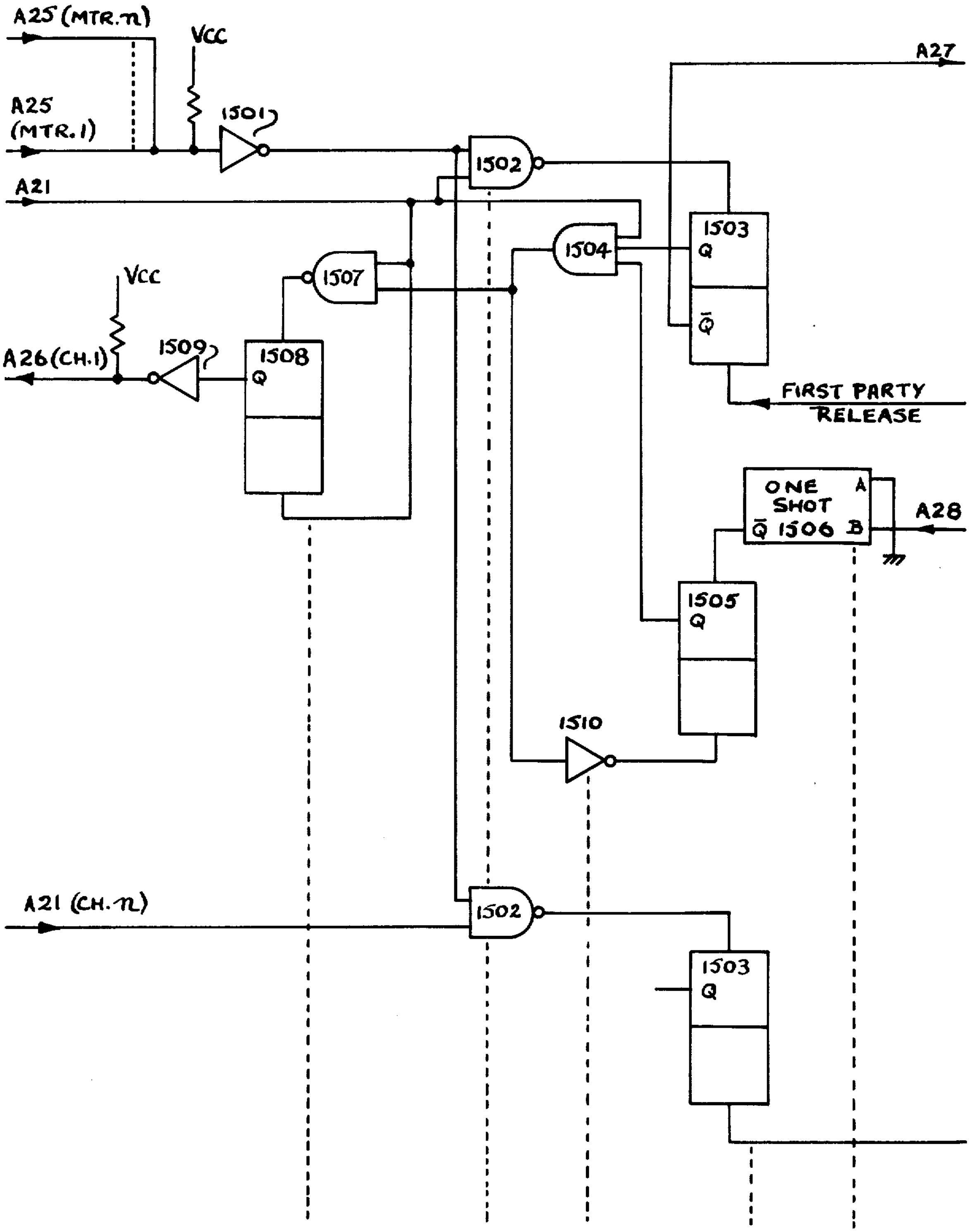
FIG. 15 is a schematic diagram of the subscriber meter control circuit utilized in the present invention.

Referring to FIG. 15 there is illustrated a channel metering control circuit which is repeated for each channel. The function of this circuit is to channelize the meter decoding sequence to assure that identification recognition by one metering circuit (FIG. 14) does not initiate tolling of that meter erroneously by virtue of the fact that a call is completed in a channel other than that being utilized by the mobile station corresponding to the activated meter.

The A25 signals from all meters are connected together in FIG. 15 and are applied to inverter 1501. If any signal line A25 from any meter circuit is binary 0, the output signal from inverter 1501 becomes binary 1 and is applied to two-input NAND gate 1502. The second input signal to NAND gate 1502 is the channel enable signal A21 for the particular channel. It will be appreciated, therefore, that both input signals to NAND gate 1502 can be binary 1 simultaneously only when the meter circuit providing the binary 0 A25 signal corresponds to the mobile station making a call on the currently enabled channel. Specifically, the meter circuits (FIG. 14) receive binary 1 pulses on the digit lines applied thereto only from the memory unit in the channel which is presently enabled. Therefore a meter can properly decode its associated identification number only during the channel enable interval for the channel in question. When both input signals to NAND gate 1502 are binary 1, the NAND gate provides a binary 0 signal which presets the preset-reset flip-flop 1503. This flip-flop provides a binary 1 Q signal to three-input AND gate 1504. A second input signal to AND gate 1504 is derived from the channel enable signal A21. The third input signal to AND gate 1504 is derived from the preset-reset flip-flop 1505.

Flip-flop 1505 receives a momentary binary 0 pulse from one-shot multivibrator 1506 whenever signal A28, derived in FIG. 17 in a manner to be described below, switches to the binary 0 state. As will be subsequently described, signal A28 switches to the binary 0 state whenever a call is completed (i.e. the called party answers) on the channel under consideration. Thus when a call connection is completed flip-flop 1505 is preset and supplies the third binary 1 signal to AND gate 1504. AND gate 1504 is actuated and in turn provides a binary 1 signal to two input NAND gate 1507. The second input signal to NAND gate 1507 is the channel enable signal A21.

When AND gate 1504 is actuated during the channel enable interval, NAND gate 1507 presets flip-flop 1508 which provides a binary 1 Q output signal to inverter 1509. The output signals from inverter 1509 in each channel are connected together to provide a common output signal designated A26. A26 provides the metering pulse to actuate AND gate 1424 in FIG. 14 and energize the subscriber meter. In this regard signal A26 is applied to every meter circuit (FIG. 14).

At the end of the channel enable interval, signal A21 becomes binary 0 and flip-flop 1508 is reset, thereby assuring that signal A26 does not remain active during interrogation of the next channel unless independently activated by means of recognition and decoding of another mobile station number on that next channel.

It will be appreciated at this point that upon initiation of a call by a particular mobile station on channel 1, the identification number for that mobile station is stored in the memory unit 901 for channel 1. As previously described, that memory unit is not cleared until the first party release signal is received, indicating that the call has terminated. Thus, during each enable interval for channel 1 occuring during the call, the metering circuit for the calling subscriber continues to detect the presence of its identification number in the channel 1 memory unit.

The flip-flop 1505 may be preset at any time regardless of whether the channel is enabled or not, and will give logic 1 to the input of gate 1504 until flip-flop 1505 is reset (via inverter 1510) on arrival of the next channel enable logic 1 on input A21. The flip-flop 1508 is operated during that one enable period only and will not reoperate unless further input pulses are given to 1506.

Three Digit Register

The three digit register 24 of FIG. 2 illustrated in detail in FIG. 16 of the accompanying drawings. It is to be understood that the three digit register is repeated for each channel. FIG. 16 illustrates circuitry for processing and registering only the first digit of a called telephone number; the second and third digits are processed and registered by identical circuitry which is omitted for the sake of clarity and understanding.

A two-input NOR gate 1601 is actuated by binary 1 digit impulses received on the channel with which the circuit is associated via AND gate 1622; or from the operator circuit (signal A29). Gate 1622 is disabled by signal A35 in an operator override mode as subsequently described. The channel digit impulse signal is derived from the channel 1500 Hz tone detector. In either case the input signal to NOR gate 1601 constitutes positive-going impulses at a rate of between 8 and 12 impulses per second.

The dial impulses are reflected as binary 0 pulses which drive a repeat relay 1602 which in turn operates a transistor integrator circuit 1603. The relay circuit 1602 is utilized to assure correct wave shaping prior to application of the impulses to the counter circuits.

NAND gates 1604 and 1605 are interconnected to provide an anti-bounce noise circuit to prevent any noise spikes generated by the relay contacts from entering the counting circuits. The individual impulses are passed through this anti-bounce circuit and are inverted by inverter 1608 to provide a digit impulse train utilized within the three digit register processing circuitry and other circuits to be described.

The binary 0 input pulses produced by relay 1602 are applied to integrator circuit 1603 which inverts the impulses to the binary 1 level and applies them to an inverter 1606. The purpose of the integrator circuit 1603 is to provide an output pulse, in this case binary 1, for each digit; therefore an output pulse at binary 0 level is provided on line 1607 continuously during receipt of an impulse stream representing any single digit. This binary 0 output pulse is also applied to the digit position counter 1609. The function of the digit position counter is to register a count for each dialed digit. In this regard, the discharge time constant 1605 is sufficiently short, relative to the inter-digit delay of 150 milliseconds, to permit each digit to be counted discretely. The digit position counter 1609 feeds a decoder 1610 which provides signals on three output lines indicating that 1, 2 or 3 digits have been received by the circuit. The digit position counter is arranged to operate on the falling edge of any binary 0 input pulse; therefore decoder 1610 steps on the leading edge of each digit count.

Output line "1" from decoder 1610 is connected to control the processing circuitry for the first received digit; likewise output lines "2" and "3" of decoder 1610 are connected to the circuitry (not shown) for processing the second and third digits respectively. As decoder 1610 steps to position 1, logic zero is applied to the present input terminal of preset-reset flip-flop 1611. The Q output signal from flip-flop 1611 becomes binary 1 and is applied to a two input NAND gate 1613. The other input signal to NAND gate 1613 is the signal on line 1607 which is binary 0 during receipt of a digit impulse train. At the end of the first digit impulse train, the binary 0 pulse on line 1607 returns to binary 1 to switch NAND gate_1613 and preset the preset-reset flip-flop 1614. The $\bar{Q}$ output signal from flip-flop 1614 becomes binary 0 and is applied to one input terminal of three-input NAND gate 1615 which is disabled thereby. The combination of flip-flops 1611 and 1614 and NAND gate 1613 serves a shut-down switch which is actuated after the digit impulse train has been counted. NAND gate 1615 cannot be actuated again until the entire three-digit register circuit is reset.

Flip-flop 1612, of the preset-reset type, is also preset by the binary 0 signal appearing on the 1 line of decoder 1610. The resulting binary 1 Q output signal of flip-flip 1612 enables NAND gate 1615, it being assumed that the binary 0 pulse is still present on line 1607 and that flip-flop 1614 has not yet been preset.

NAND gate 1615 remains enabled to pass the digit impulses applied to the third input terminal of that gate. Since NAND gate 1615 is immediately enabled at the commencement of the digit impulse train for the first digit, positive-going impulses on the third input terminal to gate 1615 are reproduced in inverted form at the output terminal of this gate. These binary 0 pulses are inverted again by inverter 1616 and counted by the first digit counter 1617. Capacitor 1618 in the input count line is provided as a noise prevention measure.

Upon completion of the impulse train representing the first digit, NAND gate 1615 is disabled as described above by flip-flop 1614. The first digit impulse count thus remains stored in counter 1617 and is reflected at one of the individual output lines of decoder 1619.

The individual output lines from decoder 1619 are activated in response to the appropriate count being stored in counter 1617. Thus, if the first dialed digit is 7, the "7" line from decoder 1619 is activated, providing a binary 0 A31 signal which is utilized in the circuits of FIGS. 17 and 18. Likewise if 9 is the first dialed digit decoder 16 provides a binary 0 an its "9" line which corresponds to signal A40 utilized in FIGS. 18 and 19. Likewise if the first digit dialed is zero, signal A39 becomes binary 0 and is utilized in FIG. 18.

Although the processing circuits for the second and third digits are not illustrated in detail, these circuits are substantially identical to the processing circuit for the first digit.

On receipt of the impulse train for the second digit, a flip-flop analogous to flip-flop 1612 is enabled to enable a three-input NAND gate for the second digit, which gate is analogous to NAND gate 1615 utilized for the first digit. The processing continues until all three digits have been counted and decoded.

A three-input NOR gate 1620 is utilized for purposes of resetting the various flip-flops and digit position counter 1609. One input signal to NOR gate 1620 is the first party release signal for the channel. A second input signal is signal A10 which is derived from one-shot multivibrator 714 in FIG. 7. This signal clears the three-digit register in the reconfigure mode under circumstances described above in relation to FIG. 7. The third input signal for NOR gate 1620 is derived from signal A41 which is inverted by inverter 1621. Singla A41 is a clear signal generated at the operator circuitry in FIG. 16 to be described subsequently. This latter reset signal is utilized to reset the three-digit register only when a call is being established by the operator on behalf of the mobile station.

When flip-flop 1612 and is counterparts for the second and third digits are reset, they provide binary 1 at their $\bar{Q}$ output terminals to reset the digit counters and decoders. These counters and decoders remain reset until counting is initiated once again in response to a digit impulse train. This reset circuit insures that false counts due to noise, in thet absence of a bonafide signal, are not registered.

When the first digit is dialed and the decoder 1610 steps to output line 1, the signal A44 will go to binary 0. THe preset-reset flip-flop 720 (FIG. 7) is preset giving binary 0 ($\bar{Q}$) to gate 717 which is disabled, thus removing the dial-tone.

Channel Interconnection Matrix

The circuit illustrated in FIG. 17 is one portion of the channel interconnection circuit matrix 15 illustrated in FIG. 1. For an N-channel system, $N^2$ circuits like that of FIG. 17 are present at the base station. In each channel there are N such circuits, each serving to connect the resident channel with a respective channel. Thus, the circuit of FIG. 17, if present in channel 1, is dedicated solely to interconnecting channel 1 with a specific one of the other channels or to itself in the semi-duplex mode. In this regard, assume the circuit of FIG. 17 is dedicated to connecting channel 1 with channel N. When these two channels are to be interconnected, as to permit a telephone call between two mobile subscribers on these channels, the circuit of FIG. 17 and a like circuit in channel N, which is dedicated to connecting channel N to channel 1, are activated to provide the appropriate communication and control logic. In the case of the reconfigure mode, a single circuit like that of FIG. 17 is activated to provide the appropriate connections and control for semi-duplex operation over the single channel.

The switching line selection portion of the circuit of FIG. 17 includes AND gates 1701, 1702 and 1703, and NAND gate 1704. When a mobile to mobile call is made, the first digit dialed by the calling mobile station is a 7 which is registered in the first digit counter 1617 of FIG. 16. The corresponding output line, A31, from decoder 1619 is rendered binary 0. This binary 0 signal is inverted and applied to AND gate 1701 at the binary 1 level. Thus, AND gate 1701 is only activated when a mobile to mobile call is being initiated on the channel.

Signals A33 and A34 represent specific output lines from the second and third decoders, respectively, in the three-digit register of FIG. 16; the specific decoder lines represented by A33 and A34 depend upon which channel is to be connected to channel 1 by the circuit of FIG. 17. For example, if the circuit of FIG. 17 is in channel 1 and is intended to connect channel 1 to channel N, signals A33 and A34 represent channel N. When these lines are active they are at binanry 0, which level is inverted by respective inverters 1706 and 1707 to provide corresponding binary 1 signals to two of the input terminals of AND gate 1702. The third input signal to AND gate 1702 is signal A30, the blanking signal appearing on line 1607 in FIG. 16. Signal A30 is normally binary 1 except during the interval when a digit impulse series is being received by FIG. 16. Therefore, after three digits have been dialed, wherein the second and third digits correspond to those represented by signals A33 and A34, AND gate 1702 is actuated and provides a binary one input signal to AND gate 1703.

Signals A27 and A35, applied to the two-input NAND gate 1704, are quiescently at the binary 1 level. Signal A27 derived from flip-flop 1503 in FIG. 15 and is binary 0 only when the meter circuit for the calling mobile station has been decoded by the data stored in the channel memory unit 901. The A35 signal, operator override, becomes binary 0 only when the operator places a call on behalf of a mobile station. In either case, NAND gate 1704 provides a binary 1 signal which actuated AND gate 1703 which in turn actuates AND gate 1701.

A single-pole double-throw switch 1708 has its wiper arm connected to one input of two-input NAND gate 1711. In one position of switch 1708 its wiper arm connects to a positive voltage source corresponding to the binary 1 level. The other switch position connects the wiper arm to the output of inverter 1709 which is driven by signal A5. If the FIG. 17 circuit services the reconfigure mode, wherein the single channel is operated semi-duplex, switch 1708 is connected to the source of positive voltage so that this voltage is applied directly to NAND gate 1711. If the circuit of FIG. 17 serves to connect one channel to another, inverter signal A5 from the channel being called is applied to NAND gate 1711. More specifically, signal A5 is the signal from that channel (assumed here to be channel N) which is to be connected to channel 1 by the circuit of FIG. 17. As described in relation to FIG. 7, signal A5 becomes binary 1 upon removal of the idle marker tone from the channel when the channel is seized. Thus if the called channel is busy, signal A5 is inverted and applied to NAND gate 1711 at the binary 0 level. The other input signal to NAND gate 1711 is the output signal from AND gate 1701 which is binary 1 under the conditions described above. However NAND gate 1711 is maintained off when the called channel is busy, and it prevents the preset-reset flip-flop 1712 from being preset. Consequently the $\bar{Q}$ output signal of flip-flop 1712 is at the binary 1 level and is applied to AND gate 1713. The other input signal to AND gate 1713 is derived from AND gate 1701, and when this is also at the binary 1 level AND gate 1713 is actuated. Actuation of AND gates 1713 renders transistor switch S1 conductive to connect busy tone signal to the transmitter of the calling channel. In this manner, if a call is attempted on channel 1 to a mobile having channel N as its home channel, and if channel N is busy, busy tone is returned to the calling mobile on channel 1.

If the called channel happens to be the same channel on which the call was initiated, the binary 1 voltage applied directly to NAND gate 1711 via switch 1708 maintains the output signal of NAND gate 1711 at the binary 1 level. Alternatively, for the more usual case where switch 1708 is connected to inverter 1709, when the called channel is not busy (as indicated by a binary 0 level on signal A5) NAND gate 1711 is at the binary 1 level. Under such circumstances and upon appropriate second and third digits being registered at the second and third digit register, binary 1 signals are applied to both inputs of NAND gate 1711. NAND gate 1711 responds by switching to a binary 0 state, causing flip-flop 1712 to be preset. In addition a binary 0 is applied to signal A32 line to indicate to the called channel that the two channels are to be interconnected for purposes of a mobile to mobile call. Specifically, if the circuit of FIG. 17 is intended to connect channel 1 to channel N, signal A32 is connected to the FIG. 17 circuit of channel N which is dedicated to channel 1. This is illustrated by noting that signal A32 appears as an input signal in the lower left hand corner of FIG. 17, indicating where in the channel N selection matrix circuit signal A32 is received. Of course the input A32 signal illustrated in FIG. 17 is only activated when the channel in which the circuit is located is being called; likewise the output A32 signal is activated only when the channel in which the circuit is located is the calling channel.

When flip-flop 1712 has been preset, indicating that a channel-to-channel connection is to be made, the binary 0 $\bar{Q}$ output signal from flip-flop 1712 inhibits AND gate 1713 and prevents busy tone from being transmitted to the calling mobile station. The binary 1 Q output signal from flip-flop 1712 renders transistor switches S2, S3, S4 and S6 conductive. Transistor switch S2 connects the receiver of the called channel to the transmitter of the calling channel. Thus, if the circuit of FIG. 17 resides in channel 1 and is intended to connect channel 1 to channel N, the signal capacitively coupled to transistor switch S2 is derived from the receiver in channel N; likewise the signal capacitively coupled from the emitter of switch S2 is applied to the transmitter of channel 1. In a similar manner transistor switch S3 connects the receiver of channel 1 (i.e. the calling channel receiver) to the transmitter of channel N (i.e. the called channel transmitter).

Transistor switches S4 and S6 connect the operator's voice circuit to the appropriate channel. The operator's hand set is only connected to the channel if the operator is called or places a call for a mobile station. This function is more fully described in relation to FIG. 18.

The $\bar{Q}$ output signal of flip-flop 1712, which is assumed to be binary 0 at this time, is also applied to NAND gate 1714. The other input signal from NAND gate 1714 is singal A4 which is derived from the central office switching circuit of FIG. 19. For present purposes it is sufficient to understand that signal A4 is binary 0 only when the channel has been seized by the central office line. Since we are assuming a mobile-to-mobile call in the present description, signal A4 is assumed to be in the binary 1 state. When flip-flop 1712 switches to render its $\bar{Q}$ output signal at binary 0 level, a binary 1 signal is derived from NAND gate 1714 to trigger one-shot multivibrator 1715. One-shot 1715 acts through inverter 1716 to provide a pulse of 120 milliseconds duration which, as described in relation to FIG. 19, actuates the 2805 Hz signalling tone for that time duration. This pulsed signalling tone acts as a clear down pulse for the mobile decoders prior to their receiving dialing impulses. A similar 120 millisecond clear down pulse is generated by one-shot 1715 in the case where the channel is seized by the central office. In such situation signal A4 becomes binary 0 to actuate NAND gate 1714.

The binary 1 Q output signal from flip-flop 1712 is also applied to a two-input AND gate 1717. The second input signal to gate 1717 is the digit impulse train generated in the manner described previously in relation to the three-digit register of FIG. 16. At this point in time the circuitry of FIG. 17 has ascertained that a mobile-to-mobile call has been initiated and has made the appropriate connection between the appropriate channel interconnection matrix portions of the two channels to be connected. As the calling mobile station continues to dial the four digits of the calling mobile station, inverter 1728 at the outpu of AND gate 1717 provides the gated digit impulse signal on line A38 to pulsatively operate the 2805 Hz tone by means of circuitry to be described in relation to FIG. 19. In addition, gate 1717 provides the gated digit impulses which are applied to the input of transistor integrator circuit 804 in FIG. 8.

After the final four dialed digits are decoded at the called mobile station, that mobile station return a 70 millisecond decode complete pulse which is decoded as described in relation to FIG. 8. Once decoded at FIG. 8, flip-flop 812 in that circuit provides the binary 1 A17 signal which is received to actuate switch S5 in FIG. 17. When switch S5 is actuated, returned ring tone is connected to the calling channel transmitter to indicate to the calling mobile station that ringing has begun.

The I.D. stop pulse at the end of the called mobile station I.D. sequence causes flip-flop 707 (FIG. 7) in the called channel to become set in which state a binary 1 Q ouput signal is provided by that flip-flop. This binary 1 signal appears on line A3 which switches NAND gate 816 in FIG. 8 to its binary 0 state. This acts to reset flip-flop 812 in FIG. 8, changing signal A17 to its binary 0 state and deactuating switch S5 in FIG. 17. Return ringing tone is now blocked from transmission to the calling transmitter. Thus, upon completion of decoding of the called mobile station when it answers, returned ringing to the calling mobile station ceases.

Signal A18, which serves only the reconfigure mode, is derived from the $\bar{Q}$ output signal of flip-flop 1712. It is connected to gate 816 of FIG. 8 in the same channel in which the circuit of FIG. 17 resides. Thus, if the circuit of FIG. 17 is intended to connect channel 1 to channel 1 (i.e. - reconfigure), signal A18 is applied to gate 816 in channel 1. When a mobile-to-mobile call is made on the same channel (i.e. in the reconfigure mode), the preset flip-flop 1712 of FIG. 17 applies a binary 0 signal A18 to NAND gate 816 in the same channel. Gate 816 is thus disabled from providing a binary 0 reset pulse, and flip-flop 812 can reset only after an I.D. stop pulse is received from the second I.D. pulse train (i.e. the I.D. pulse train received from the called mobile station in the reconfigure mode). This requires that flip-flop 708 of FIG. 7 be operated to initiate signal A9 which, when applied to the circuit of FIG. 8, resets flip-flop 812 and renders signal A17 binary 0.

When dialed impulses are not decoded by a called mobile station, the out-of-service circuit of FIG. 8 operates after a 300 millisecond delay. The out-of-service control signal A16 is generated by flip-flop 806 in FIG. 8 and applied to one input of four-input AND gate 1308 (FIG. 13) and the out-of-service tone will be connected directly to the transmitter of the calling channel, provided that the called mobile is not engaged in communication on another channel, thereby indicating to the calling mobile station that the called mobile station is out-of-service.

Like all other calls, a mobile-to-mobile call is terminated by the first party release circuits. A first party release signal is applied to three-input AND gate 1718 along with the operator release signal and the first party release signal from the called channel. This latter signal of course is received from channel N if the circuit of FIG. 17 is intended to interconnect channels 1 and N. All three input signals to AND gate 1718 are normally in the binary 1 state so that the output signal from AND gate 1718 is binary 1 under normal conditions. Upon first party release in either the called or calling channel, or upon operator release, a binary 0 pulse is applied to AND gate 1718 to pulsatively change the state of the gate output signal to binary 0. This resets flip-flop 1712 to effectively clear the circuit.

In the case of a mobile-to-mobile call between two channels, the cicuitry at the lower left hand corner of FIG. 17 comes into play. As described previously signal A32 from the calling channel interconnection matrix is applied to this portion of the circuit of the called channel interconnection matrix. Where the calling channel and called channel are the same (i.e. in the reconfigure mode) output signal A32 and input signal A32 are wired together.

Assume flip-flop 1712 is preset in the manner previously described and that a mobile-to-mobile call between two channels is being initiated. The binary 1 Q output signal from flip-flop 1712 is applied to each of AND gates 1721 and 1723. Signal A7 is the other input signal applied to AND gate 1723 and remains at the binary 0 level unless a call is made in the reconfigure mode. AND gate 1723 therefore is maintained in its binary 0 state. Signal A11, which is applied to AND gates 1721 and 1722, is derived from the FIG. 7 circuit of the called channel and remains at binary 0 until the stop pulse of the I.D. sequence in the called channel has been received. AND gate 1721 therefore switches to its binary 1 state after the called chanel I.D. sequence has been completed which occurs after the hand set at the called mobile station has been removed from the hook. AND gate 1721 activates inverter 1724 to provide binary 0 to the wired NOR gate feeding signal line A28. This signal is utilized, as previously described in relation to FIG. 15, to trigger one-shot 1506 and activate the subscriber meter circuit.

When a mobile-to-mobile call is made in the reconfigure mode, signal A11 is binary 1. When the called mobile station answers signal A7 also becomes binary 1, causing AND gate 1723 to be actuated. AND gate 1723 operates AND gate 1722 which in turn causes signal A28 to operate the meter circuits as described above.

Signal A37, which is the third input signal to the wired NOR circuit fed by inverters 1724, 1725 and 1726, is derived from the reverse battery connection from the central office interface. This signal is normally at binary 0 until a reverse battery indication is supplied by the central office in response to a completed call from a mobile subscriber to a public telephone system station. Thus a calling mobile subscriber's meter is properly actuated whether the call is a mobile-to-mobile call in the reconfigure mode, a mobile-to-mobile call on two channels, or a mobile to land base call utilizing the public telephone system.

Operator's Circuit

The operator's circuit illustrated in FIG. 18 represents that portion of the overall operator circuit which is dedicated to channel 1. For the entire system there are N such circuits, one for each channel. The circuit of FIG. 18 may be functionally subdivided into the following five basic circuits: The operator revert circuit; the operator matrix switch; the operator central office line bridge; the operator release circuit; and the operator display control circuit.

The operator revert circuit includes two two-input NAND gates 1801 and 1802, a four-input AND gate 1803, and two-input AND gate 1804. The six input signals utilized in this circuit include signals A27, A30, A31, A35, A39 and A40.

When a mobile station initiates a call on channel 1 with either 7 or 9 as the first dialed digit, signal A31 or signal A40, respectively, becomes binary 0. NAND gate 1801 responds to either condition by providing a binary 1 output signal. Assuming flip-flop 1813 to be in the reset condition, the Q̄ output signal from flip-flop 1813 (signal A35) is also binary 1. Signal A30, the blanking signal from the three digit register, is at binary 1 upon completion of the impulse train representing either the 7 or 9 dialed digit. If the calling mobile station does not have a meter in the circuit, signal A27, derived from the Q̄ output terminal of flip-flop 1503 in FIG. 15, is at the binary 1 level also. With all four input signals to AND gate 1803 at the binary 1 level, this gate provides a binary 1 input signal to NAND gate 1802. The other input signal to NAND gate 1802 is also at the binary 1 level unless the first digit dialed at the calling mobile station is 0. NAND gate 1802 thus provides a binary 0 signal to AND gate 1804 which in turn provides a binary 0 signal to preset flip-flop 1806.

When flip-flop 1806 is preset it supplies a binary 1 Q output signal to the operator's channel lamp and ring circuit, thereby ringing the operator station and lighting the lamp corresponding to channel 1 at the operator location. The operator's channel lamp is lit from logic 1 at the Q output of flip-flop 1806 via inverters 1818 and 1808. The operator's bell circuit consists of two-input AND gate 1807 and inverter 1809. The reset-preset flip-flop 1813 is assumed to be unoperated; thus the Q̄ output is at logic 1 at one input to gate 1807. The flip-flop 1806, having operated, gives logic 1 to the other input of gate 1807, which in turn gives logic 1 to inverter 1809 which acts as one input to a wired-NOR gate. Other inputs to the NOR gate are from inverter 1809 in other channels. The output of 1809 is inverted by inverter 1824 and operates the bell circuit. Flip-flop 1806 provides a binary 1 signal to a two-input AND gate 1807 which also receives the binary 1 Q̄ output signal from flip-flop 1813. AND gate 1807 thus provides a binary 1 output signal which renders transistor switch S10 conductive to return ringing tone to the calling mobile subscriber. In addition, the output signal from AND gate 1803 actuates the operator revert lamp at the operator station to indicate that a call is being made by a subscriber having no meter at the base station. If the originating call was from a mobile station for which a meter is present in the base station, the foregoing sequence is inhibited by a binary 0 signal on line A27 which disables AND gate 1803; this results in a binary 1 output signal from AND gate 1804, thereby preventing flip-flop 1806 from being preset.

The operator station may be rung in other than an automatic revert mode when a mobile subscriber dials 0. Under such circumstances input signal line A39 switches to the binary 0 level to provide the negative-going pulse from AND gate 1804 to preset flip-flop 1806. The operator channel lamp and ring circuit are actuated as described above and the ring tone switch S10 is actuated by AND gate 1807 to return ring tone to the calling mobile station. The operator revert lamp is not actuated for this condition since neither signal A31 nor A40 are at the binary 0 level; therefore, NAND gate 1801 inhibits AND gate 1803 from providing the revert lamp actuation signal.

The operator answers a call by removing the hand set off-hook and momentarily depressing the contact switch CS-1 for channel 1. The operator knows to depress S-1 because the channel lamp for channel 1 has been lit. Hook switches HS-1 and HS-2 automatically change over upon removal of the operator's hand set to provide binary 0 at the wiper arm of switch HS1 and binary 1 at the wiper arm of switch HS2. Assuming for the moment that N channels are utilized in the system, the signals designated CS-2 through CS-N, respectively, represent output signals from corresponding channel switches in the other operator circuit sections dedicated to the indicated channels. Three signals all remain at binary 1 since it is assumed herein that only the channel 1 switch is operated. Consequently, AND gate 1810 is actuated to provide binary 1 signals. Since hook switch HS2 has also been switched to its binary 1 sate, AND gate 1810 is enabled to provide a binary 1 to the reset innput terminal of flip-flop 1805. This permits the momentary closure of channel switch CS-1 to preset flip-flop 1805 while resetting 1806 via two-input AND gate 1817 which receives a second input of logic 1 from the first party release circuit. When flip-flop 1806 is reset, ringing at the operator station is terminated and returned ringing tone to the calling mobile station is terminated by virtue of the binary 0 signal appearing at the Q output terminal of flip-flop 1806. The channel lamp is also extinguished at this time; however, the revert lamp, in the case of a revert mode call, remains actuated until termination of the call.

When flip-flop 1805 is preset, logic 1 is applied to one input of the two-input NAND gate 1812, the other input of which is pulsed to logic 1 on depressing the channel switch CS-1. Gate 1812 responds by providing a binary 0 pulse on signal line A41 to clear the three-digit register in FIG. 16. The binary 0 appearing at the Q̄ output terminal of theh preset flip-flop 1805 operates the preset-reset flip-flop 1813. The logic 0 appearing at the Q̄ output of 1813 becomes the operator override signal A35 which is applied to the circuits of FIGS. 17 and 19. In addition this signal disables AND gate 1803. Flip-flop 1813 also provides a binary 1 Q-output signal to one input of three-input AND gate 1814. Assuming the calling subscriber does not have a meter at the base station, signal A25, applied to preset-reset flip-flop 1826 is also at the binary 1 level. The Q̄ output of flip-flop 1826 applie binary 1 to AND gate 1814. Consequently, when the reverse battery signal A28 from the circuit of FIG. 17 is switched to binary 1, indicating answering of the call, the output signal of AND gate 1814 becomes binary 1 to operate the operator's meter for channel 1. At the termination of a call the first party release signal resets flip-flop 1813 to deactivate the operator meter.

The binary 1 Q output signal from flip-flop 1805 is applied to two-input AND gate 1815 and two-input NAND gate 1816. The second input signal for AND gate 1815 receives dialed impulses initiated by the operator which are passed by gate 1815 on signal line A29 for connection to the input gate in the three-digit register of FIG. 16. NAND gate 1816 controls the operator's display. When the channel is enabled, signal line A21 becomes binary 1 to provide a binary 0 pulse on the operator display control line A43. Signal lines A43 for each channel are tied in common in a wired NAND configuration so that binary 0 appearing on any A43 signal line actuates the operator's display.

Transistor switches S11 through S17 and S20 and S21 are also illustrated in FIG. 18. Switches S11 through S14, and S20 and S21 are rendered conductive by the binary 1 Q output signal from flip-flop 1805 when that flip-flop has been preset. The functions performed by these switches when rendered conductive are described subsequently in relation to FIG. 20; the present discussion is intended to indicate only how these switches are in fact rendered conductive. Switch S17 is rendered conductive by signal A17 which is actuated when a ring signal has been decoded at a called mobile. Switch S16 is rendered conductive by signal line A56 which is activated when a called mobile station is out-of-service. Switch S15 is rendered conductive by signal A6 which is binary 1 when the channel has not been seized; therefore S15 is conductive whenever the channel is idle.

The operator sets up a call on behalf of a mobile station by utilizing the three digit register for the channel to which the calling mobile station is locked. As previously described, the three digit register is cleared by a pulse from NAND gate 1812 when the operator answers the call. The binary 0 $\bar{Q}$ output signal of flip-flop 1813 disables AND gate 1803 so that the revert initiation sequence does not take place or repeat. The operator then dials the correct access digit 7 or 9 and continues dialing the complete number desired by the calling mobile station. The call is thus set up via the channel interconnection matrix or via the central office access switch described subsequently in relation to FIG. 19. Also inverter 1811 and gate 1812 operate in conjunction with a push button switch CS-1 to enable the operator to clear the three digit register in the event a number has been incorrectly dialed.

The operator first party release is provided by preset-reset flip-flop 1822 in conjunction with two-input AND gate 1823, one-shot multivibrator 1825 and inverters 1820 and 1821. For satisfactory operation of the system it is necessary for the operator to be able to provide first party release when ending a call from a mobile where a number has not been dialed by the operator on behalf of the mobile. Further it is necessary for the operator to be able to replace the hand set on-hook without operating the first party release when a call has been dialed by the operator on behalf of a mobile.

Assuming that the operator's hand set is off-hook and flip-flop 1805 is preset, if dial pulses are not passed by gate 1815 logic 0 is given to the input of inverter 1820 which in turn gives logic 1 to the preset terminal of flip-flop 1822 which remains in the reset condition. The Q output of flip-flop 1822 provides binary 1 to one input of the two-input AND gate 1823. The wiper of the hook switch HS2 provides a logic 1 input to the inverter 1821 which in turn sends logic 0 to the second input of gate 1823.

On replacing the hand set on-hook, switch HS2 wiper applies logic 0 to inverter 1821 which sends logic 1 to the second input of gate 1823. Gate 1823 operates and provides logic 1 to the input of the one-shot multivibrator 1825. One shot 1825 provides a logic 0 pulse to the release circuit in FIG. 7 (gate 716). First party release is thereby operated and resets flip-flop 1822.

Assuming that the operator's hand set is off-hook and flip-flop 1805 is preset, one input to gate 1815 is at logic 1 and, until dial pulses are transmitted from the operator's dial, the other input remains at logic 0. The output of gate 1815 is at logic 0 but goes to logic 1 in repetition of the dial impulses. If the operator dials a number on behalf of a calling mobile the first logic 1 pulse representing a dial impulse at the output of gate 1815 presets flip-flop 1822 via inveter 1820. The $\bar{Q}$ output of flip-flop 1822 applies logic 0 to gate 1823 which is disabled. When the operator's hand set is replaced, logic 1 is sent to the other input of gate 1823 which remains unoperated.

Central Office Line Switch

The central office line switch circuit is illustrated in FIG. 19 of the accompanying drawings. The circuit of FIG. 19 represents the central office switch for one channel, it being understood that this circuit is repeated for each channel in the system. The purpose of the circuit is to connect the channel to the central office line during a mobile station to public telephone system station call, and to connect the central office ine to the channel during a call to a mobile station from a public telephone system station.

A channel is connected to the central office line when either a mobile station dials 9, or the operator dials the call. When a mobile station dials 9 and has a meter in circuit, signal A40 is binary 0 (i.e. — the first digit is 9 at the three digit register) and signal A27 is binary 0 (i.e. representing a meter in operation). These two binary 0 signals are inverted by logic inverters 1901 and 1902 respectively to apply two binary 1 signals to NAND gate 1903. The latter responds by providing a binary 0 output signal to one input of NAND gate 1904. The same result ensues if the operator is initiating the call and dials 9, whereupon the operator override signal A35 becomes binary 0 along with signal A40.

Assuming for a moment that flip-flop 1905 is in its reset condition, the second input signal to NAND gate 1904 is binary 1, this signal being designated as signal A4 and, when binary 1, being indicative that the channel has not yet been seized by the central office. The output signal from gate 1904 is therefore at the binary 1 level and renders each of transistor swtiches S8 and S9 conductive. Switch S8 connects the receiver of the calling channel to the channel central office line; switch S9 connects the channel central office line to the calling channel transmitter. The voice channel circuit to the central office is therefore completed at this time. NAND gate 1904 also enables AND gate 1906 which supplies dialing impulses representing the called station to the central office equipment.

The central office may seize the channel by providing a binary 0 on the input line to logic inverter 1907. The inverter responds by providing a binary 1 clock signal to the clock input terminal of D-type flip-flop 1908. The D input terminal of flip-flop 1908 receives signal A6 which is at the binary 1 level if the 1633 Hz idle marker tone is present on the channel. Thus a binary 0 seizure command from the central office, applied to inverter 1907, sets flip-flop 1908 to provide a binary 0 $\bar{Q}$ output signal from that flip-flop which in turn sets flip-flop 1905. The $\bar{Q}$ output signal from flip-flop 1905 becomes binary 0 which switches NAND gate 1904 to its binary 1 state. Switches S8 and S9 are rendered conductive to complete the central office-channel circuit.

Two-input NAND gate 1909 receives the binary 1 input signal from inverter 1907 along with the binary 1 input signal from flip-flop 1905 once the channel has been seized from the central office. The resulting binary 0 output signal from NAND gate 1909 inhibits transistor switch S19 to prevent application of busy tone to the central office line.

The binary 0 $\bar{Q}$ output signal of flip-flop 1905 indicates that the channel has been seized by the central office. This signal is designated A4 and when received at the circuit of FIG. 17 causes one-shot multivibrator 1715 to provide a 120 millisecond clear down pulse which is received as signal A38 in FIG. 19. As previously described, this clear down pulse is transmitted via the channel transmitter to all mobile stations locked onto the channel and serves to clear the coding circuits from counts which may have been registered by spurious noise.

The dialing impulses from the central office interface are applied to two-input NAND gate 1910 along with the binary 1 Q output signal from flip-flop 1905. The dialing impulses pulsatively actuate transistor switch S18 to apply pulses of 2805 Hz signalling tone to the channel transmitter. The pulses of signalling tone represent the digit impulses dialed by the calling pulbic telephone system station.

A call is terminated by the first party release signal which rests flip-flop 1905 and flip-flop 1908. If release is by the central office, one-shot 1912 receives a transition from binary 0 to binary 1 and responds with a binary 0 pulse to activate the first party release circuit.

Channel Interconnection Logic

Referring specifically to FIG. 20 of the accompanying drawings there is illustrated a switching diagram indicating the manner in which one channel is connected to the operator circuit, another channel, or the central office. In addition application of the various control tones to the channel is illustrated. The switches illustrated in FIG. 20 correspond to switches previously described in relation to FIGS. 7, 13, 17, 18 and 19. FIG. 20 is intended to indicate switched signal flow only and not the manner in which each switch is actuated; switch actuation logic ahs been described in relation to FIGS. 7, 13, 17, 18 and 19.

As illustrated, switches S1, S5, S7, S10 and S15 apply the busy tone, returned ringing tone, the out-of-service tone, returned ringing tone from the operator circuit, and marker tone, respectively, to the channel transmitter for the purpose of transmitting these tones to mobile stations on the channel. Likewise, switch S16 supplies out-of-service tone to the central office line and called channel transmit line, S17 supplies return ringing tone to the central office line and S19 supplies busy tone to the central office line and called channel tarnsmit line. 2805 Hz signalling tone is applied to the called channel transmitter via switch S18 of the called channel in a mobile-to-mobile call situation by the channel interconnection matrix in the calling channel.

In the case of a mobile-to-mobile call, the calling channel receiver circuit is connected to the called channel transmitter circuit via switch S3; the called channel receiver circuit is connected to the calling channel transmitter circuit via switch S2. For a call between the central office and the channel, the channel transmitter is connected to the central office line via switch S9; the channel receiver is connected to the central office line via switch S8.

In the case where an operator is involved in placing the call, switch S20 is actuated for the channel in question and the operator's circuit in order to enable the transmitter in the operator's hand set. Likewise switch S21 for the channel in the operator's circuit is actuated to enable the receiver in the operator's hand set. The operator connection in the channel transmitter is from S20 through S11; the connection from the channel receivers is through S13 and S21. Where the operator is handling a call to the central office, S12 is actuated to provide connection between the operator hand set transmitter and the central office line; S14 is actuated to provide connection between the office line and the operator hand set receiver. When the operator handles a call to another mobile station, S4 provides the connection to the called channel transmitter; S6 provides the connection from the called channel receiver. When a mobile subscriber originates a call, dial tone is returned to the calling subscriber by means of switch S22 to the channel transmitter. When a mobile-to-mobile call is set up on a single channel in the semi-duplex mode, switches S24 and S25 switch the reconfigure control tone to the called channel transmitter and the calling channel transmitter, respectively, in the case of a called mobile being busy on another channel.

Operator Display

Figure 21:
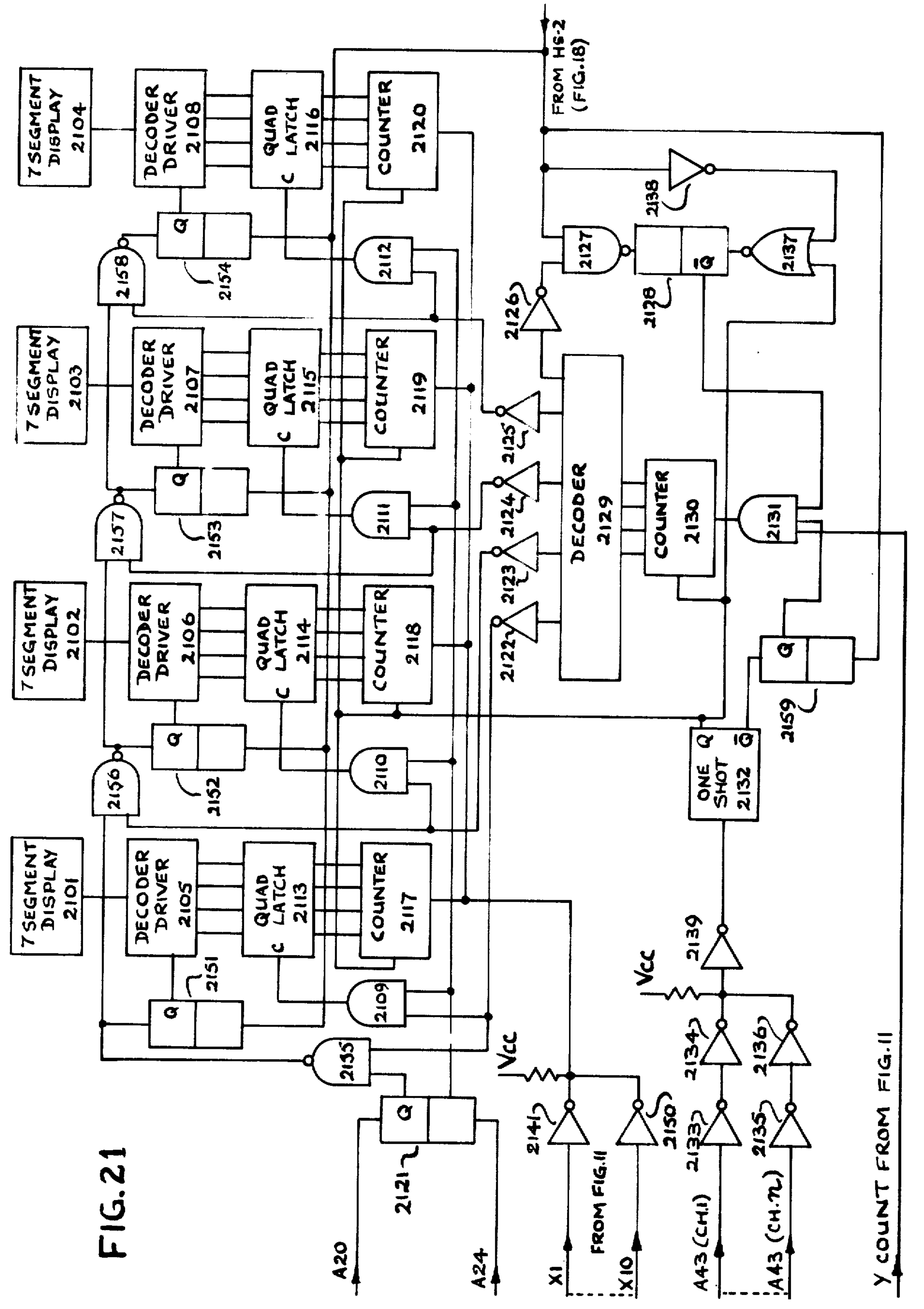
FIG. 21 is a schematic diagram of the operator display circuit utilized in the present invention.

FIG. 21 of the accompanying drawings illustrates the operator display circuit. The function of this circuit is to display the mobile identification number for the operator of a mobile which calls the operator or a mobile which is automatically reverted to the operator because of the absence of a meter for that mobile station at the base station.

The operator display shown in FIG. 21 operates as follows. When either an operator 0 call or a reverted call is received by the operator and the operator responds by coming off hook and momentarily depressing the associated channel switch, control signal input A43 goes to binary 0. The binary 0 input to inverter 2133 applies binary 1 to the input of inverter 2134. The output terminals of inverters 2134 and 2136 are of the open collector type and are connected in common as a wired-NOR gate. The output binary 0 of inverter 2134 is applied to inverter 2139 which sends binary 1 to one-shot multivibrator 2132. One-shot 2132 resets counter 2130 and decoder 2129 to zero count output by means of a binary 1 pulse. The binary 1 pulse from one-shot 2132 is also applied to one input of two-input NOR gate 2137. The output binary 0 from gate 2137 resets preset-reset flip-flop 2128.

The Q output of flip-flop 2128 applies binary 1 to one input of the three-input AND gate 2131. The $\overline{Q}$ output of one-shot 2132 gives binary 0 to the preset-reset flip-flop 2159 which operates. The Q output of flip-flop 2159 gives binary 1 to the second input of gate 2131 and enables it. Counter 2130 now counts each time the signal input from the Y count from the timer (FIG. 11) goes to binary 0. The decoder steps first to output position 1 and binary 0 is applied to the input of inverter 2122. The output binary 1 from inverter 2122 is applied to one input of two-input AND gate 2109. The second input to gate 2109 is obtained from the $\overline{Q}$ output of preset-reset flip-flop 2121.

Assume that the flip-flop 2121 is in the reset condition and the output $\overline{Q}$ applies binary 1 to the second input of gate 2109. Gate 2109 operates and supplies binary 1 to the clock input of clocked quadruple latch 2113. When the clock input to latch 2113 is at binary 1 the output terminals repeat the data at the input terminals. When the clock input goes to binary 0 to data on the input terminals, at the time of transition of the clock input from binary 1 to binary 0, appear on the output terminals and remain there until the clock input again goes to binary 1. Latch 2113 is therefore operational and transfers data from its input terminals to its output terminals.

The X1 through X10 outputs of the timer circuit (FIG. 11) are applied to the inputs of inverters 2141 through 2150, the outputs of which are connected in common in a wired-NOR gate. As the timer circuit (FIG. 11) commutates, a binary 0 appears at the input of counter 2117 in response to each step. The counter 2117 operates and gives the output in binary decimal code (BCD) to the quad latch 2113 inputs. The BCD code from counter 2117 is transferred to the outputs of the latch 2113 and operates the driver decoder 2105.

Assuming the preset-reset flip-flop 2151 to be in the reset condition, the Q output will be at binary 0. Therefore the output of the driver decoder 2105 is inhibited and no digit is illuminated on the seven segment display 2101.

The driver decoder 2105 continues to step until signal input A20 to flip-flop 2121 goes to binary 0, thus indicating that a binary 1 bit is stored in the I.D. memory (FIG. 9). The binary 0 from input A20 presets flip-flop 2121 which sends binary 0 from its $\bar{Q}$ output to gate 2109. Gate 2109 operates and provides binary 0 to the clock input of latch 2113. Latch 2113 now is inhibited and holds the data preset at its outputs.

The flip-flop 2121 Q output provides binary 1 to one input of two-input NAND gate 2155. The second input to gate 2155 will be at binary 1 from the output of inverter 2122; thus the gate operates, giving binary 0 to the preset input of two preset-reset flip-flop 2151. The flip-flop 2151 operates and its Q output sends binary 1 to the blanking circuit input of the decoder driver 2105, thus enabling the outputs to the seven-segment display 2101. The initial number of the mobile I.D. is now displayed on the seven-segment display 2101.

At the end of the X count cycle by the timer circuit (FIG. 11), the Y count input to gate 2131 returns to binary 0 and the counter 2130 operates and causes the decoder 2129 to step to output 2. The sequence described in the foregoing is repeated and the second I.D. digit of the mobile is also played on the seven-segment display 2102. The sequence is repeated until all four mobile I.D. digits are displayed, after which the decoder 2130 operates once more in response to the Y count input from the timer (FIG. 11) and steps to output position 5. Binary 0 from the output position 5 is applied to the input of inverter 2126. The output binary 1 from inverter 2126 is applied to one input of two-input NAND gate 2127. The second input of gate 2127 is at binary 1 from the hook switch. Gate 2127 operates and provides binary 0 to the preset input of flip-flop 2128 and presets it. The $\bar{Q}$ output of flip-flop 2128 applies binary 0 to one input of gate 2131 and inhibits the Y count input to the counter 2130.

The circuit now remains in this condition until the operator replaces the hand set on hook, at which time binary 0 is applied from the hook switch to inverter 2138. The latter provides a binary 1 to one input of gate 2137 which operate and sends binary 0 to the reset input of flip-flop 2128 and resets it. The preset-reset flip-flop 2159 is also reset by binary 0 from the hook switch HS-2 (FIG. 18) and inhibits gate 2131 by application of binary 0 from the output $\bar{Q}$.

As the operator comes off hook again binary 1 is applied to one input of gate 2127 which operates to give binary 0 to preset flip-flop 2128. The $\bar{Q}$ output of flip-flop 2128 sends binary 1 to one input of gate 2131. When the A43 input signal goes to binary 0 in response to the channel enable signal applied to gate 1816 (FIG. 18), flip-flop 2159 is preset by one-shot 2132 and enables gate 2131 with binary 1 signal from its Q output.

It will be seen that only I.D. memory in the specific channel being used by the operator can be interrogated and the contents displayed as a result of the A43 input control.

Automatic Ticketing Print-out and Mag-Tape

The circuits concerned in performing automatic ticketing print-out and magnetic tape data recording for use with a computer for automatic subscriber billing are shown in FIGS. 22, 23, 24, 25 and 26.

The circuitry compiles data concerning both mobile subscriber calls which would normally be billed, such as mobile-to-mobile calls, and local or long distance calls utilizing the public telephone service. The information is compiled in such a way as to show additional information regarding operator assistance in the case of a reverted call or when the operator dials a call for the mobile subscriber in a non-reverted condition. Date and time of call are recorded along with the duration of a call. In the case of a long distance call (i.e. toll call) the number called is also recorded. The information is compiled first in BCD format consisting of 120 bits as follows:

| | |
|---|---|
| 4 Digit Calling Mobile I.D. | 16 bits |
| Duration of call in minutes — 2 digits | 8 bits |
| Date and time of call — 10 digits | 40 bits |
| Operator assistance — 1 digit | 4 bits |
| Operator revert assistance — 1 digit | 4 bits |
| "7" mobile-to-mobile call — 1 digit | 4 bits |
| "9" call via central office — 1 digit | 4 bits |
| Number called in case of toll call 10 digits | 40 bits |
| Total | 120 bits |

The BCD information is converted to any convenient machine code via a code conversion circuit shown in FIG. 26 and drives a print-out device locally at the terminal, records the data on magnetic tape, paper tape or other suitable medium and/or transmits the data direct to a central processing unit via a commonly accepted method.

With particular reference to FIG. 22, the input signal line A20 is at binary 1, denoting that a call is in progress, assuming that no mobile I.D. is stored in the I.D. memory FIG. 9. Assuming that the preset-reset flip-flop 2222 is in the reset condition, the I.D. memories are commutated and, where a channel is in use, a binary 0 is present on A20 as the memory is commutated past the position in the memory representing a digit of the mobile I.D. Assuming the Y count from the timing circuit (FIG. 11) to have stepped to position 1, the counter 2224 will operate and cause the decoder 2225 to step to output position 1 on which binary 0 will appear. The binary 0 from counter 2225 is inverted by the inverter 2226 and applied to one input of three-input AND gate 2230. A second input to gate 2230 is binary 1 from the Q output of flip-flop 2222 which is in the reset condition. As the X outputs of timer circuit (FIG. 11) commutate, logic 0 is applied to each input of inverters 2201 through 2210 in turn. The inverted output of inverters 2201 through 2210 are inverted once more by inverters 2211 through 2220 which form a wired-NOR gate. The binary 0 output of the wired-NOR gate is applied to one input of three-input AND gate 2230, 2231, 2232 and 2233. It will be seen that the output of gate 2230 is pulsed binary 0 and causes counter 2234 to operate on each pulse.

When a digit is present in the I.D. memory, input $\overline{A20}$ goes to binary 0, presetting flip-flop 2222. The $\overline{Q}$ binary 0 output of flip-flop 2222 inhibits gate 2230; thus the BCD output of counter 2234 corresponds to the digit in the I.D. memory (FIG. 9).

The Y count from the timer (FIG. 11) causes the counter 2224 to operate and decoder 2225 to step to position 2. The above sequence is repeated in connection with counter 2235. The following two operations of the Y count cause the final two digits of the mobile I.D. to be stored in counters 2236 and 2237, respectively.

At the beginning of the Y count cycle the channel enable input A21 goes to binary 1 and is applied to one input of the two-input AND gate 2244. The second input to gate 2244 is binary 1 from the $\overline{Q}$ output of the clocked flip-flop 2243 which is in the reset condition. The binary 1 output of gate 2244 is applied to the clock input terminal of quadruple latches 2238, 2239, 2240 and 2241. When the call is completed reversed battery input A28 goes to binary 0 and sets preset-reset flip-flop 2242. The Q output of flip-flop 2242 provides binary 1 to the J and K inputs of flip-flop 2243. The Y sync input A23 presets preset-reset flip-flop 2245 and the transition of the $\overline{Q}$ output to binary 0 operates flip-flop 2243. Binary 0 from the $\overline{Q}$ output of flip-flop 2243 inhibits gate 2244, the output of which applies binary 0 to the clock input of latches 2238, 2239, 2240 and 2241. The data present on the inputs of the latches is now held on their output lines $A58_1$ through $A61_4$. Until reversed battery binary 0 is obtained on input A28 the counters 2234, 2235, 2236 and 2237 compile the calling mobile I.D. number in each channel enable cycle. At the end of each cycle the counters 2234, 2235, 2236 and 2237 are all reset to zero count by the channel sync binary 1 input A22. The outputs of counters 2234, 2235, 2236 and 2237 are connected in common to the inputs of latches 2238, 2239, 2240 and 2241 in all channels. It will be seen therefore that when reversed battery binary 0 is present on A28 during any channel cycle, the four mobile I.D. digits will be held in the latches 2238, 2239, 2240 and 2241. Flip-flops 2242, 2243 and 2245 are reset after the automatic ticketing print-out is completed by binary 0 on input A90 which will be described subsequently.

Figure 23:
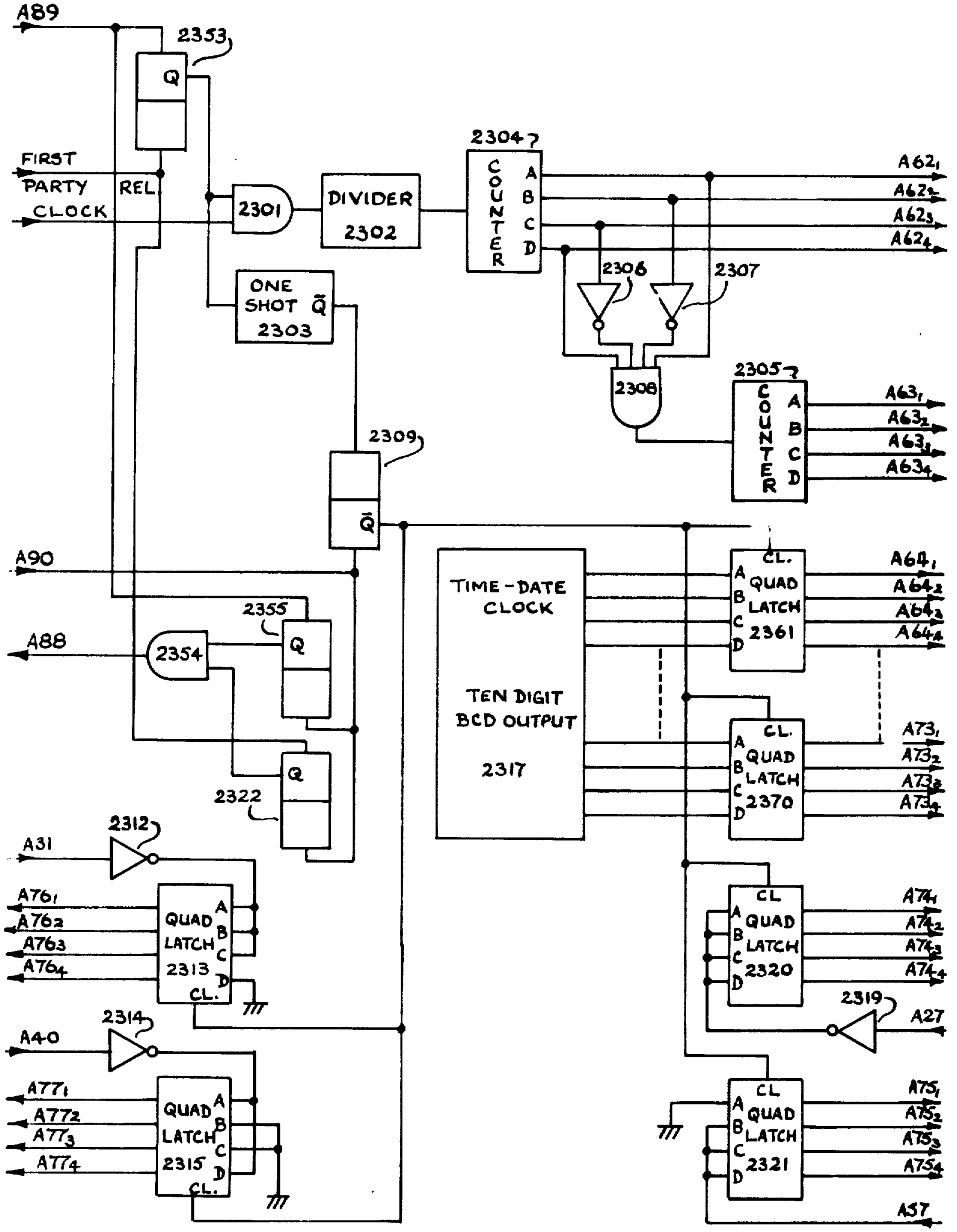

Referring specifically to FIG. 23, prior to reversed battery being received on input A28 the calling mobile must dial the called subscriber.

When the calling mobile subscriber dials the access digit 7, the input signal line A31 goes to binary 0. Inverter 2312 applies binary 1 to inputs A, B and C of latch 2313. The code thus compiled on the inputs A, B, C and D of latch 2313 is the BCD code for the decimal digit 7. Alternatively, when the calling mobile dials "9" the input A40 goes to binary 0 and is inverted by inverter 2314. Binary 1 is applied to inputs A and D of the latch 2315, and the decimal digit 9 is therefore compiled in BCD code on the input to latch 2315.

When the call is either a mobile-to-mobile call (7) on a central office call dialed directly by the subscriber, input lines A27 and A57 remain at binary 1 and binary 0 respectively. The operation of latches 2320 and 2321 is as follows. Where the calling mobile does not have an operative meter in circuit the call is reverted to the operator as previously explained. The input signal line A27 goes to binary 0 and is inverted by inverter 2319, giving binary 1 to inputs A, B, C and D of the quad latch 2320; this number is the BCD code equivalent to decimal number 15. By predesign, number 15 cna be printed out as any described sign or notation. Input A27 remains at binary 0 throughout the duration of the call.

Where the operator places the call for the calling mobile subscriber, whether it is a revert type call or not, inpt A57 goes to binary 1 and puts binary 1 on inputs B, D and C of quad latch 2321, compiling the BCD code for decimal number 14.

When reversed battery makes input A28 go to binary 0, output A89 (FIG. 22) goes to binary 0. Binary 0 from input A89 (FIG. 23) sets the preset-reset flip-flop 2353. Binary 1 from the Q output of flip-flop 2353 is applied to one input of twoinput AND gate 2301 thus enabling it. The clock frequency is applied to the second input to gate 2301. The output of gate 2301 is fed to divider circuit 2302 which applies 1 pulse per minute to counter 2304 Counter 2304 operates once per minute and produces a BCD output $A62_1$, $A62_2$, $A62_3$ and $A62_4$. When the BCD output of counter 2304 is 1001, outputs B and C will be inverted by inverters 2306 and 2307, respectively, giving binary 1 to two inputs of two four-input AND gate 2308. Binary 1 from outputs A and D of counter 2304 are applied to the other two inputs of gate 2308. Gate 2308 operates and provides binary 1 to the input of counter 2305. Counter 2305 does not operate until counter 2304 again operates and causes the output of gate 2308 to go to binary 0. The BCD output of counter 2305 provides the tens digit of the call duration time. At the end of the call, flip-flop 2353 is reset by the channel first party release. The output binary 0 from the Q terminal of flip-flop 2353 inhibits gate 2301 and stops counting at counters 2304 and 2305. Thus the time duration of the call is registered and held on outputs $A62_1$ through $A63_4$ until the data print-out is completed.

When operated and set as described above flip-flop 2353 output Q provides binary 1 to one-shot multivibrator 2303. One-shot 2303 sends a binary 0 pulse to the preset input of preset-reset flip-flop 2309 which operates. The $\overline{Q}$ output of flip-flop 2309 applies binary 0 to the clock inputs of quad latches 2313, 2315, 2361, 2370, 2320 and 2321; hence the respective inputs at the time of transition of flip-flop 2309 are held.

The digital date time clock has a 10 digit output in BCD form (40 bits) as follows: Date-6 digits (i.e. day, month, year) and time 4 digits (24 hour clock, 2 digits - hours, 2 digits minutes).

The binary 0 output $\overline{Q}$ of flip-flop 2309 causes the inputs to quad latches 2361 through 2370 to be transferred and held on the outputs $A66_1$ through $A73_4$. When input A89 goes to binary 0 preset-reset flip-flop 2355 is set and the Q output sends binary 1 to one input of two-input AND gate 2354. The second input to gate 2354 is at binary 0 from the Q output of preset-reset flip-flop 2322 which is in the reset condition. At the end of the call the channel first partly release becomes binary 0 and causes flip-flop 2322 to preset. The output Q of flip-flop 2322 becomes binary 1 and is applied to the second input of gate 2354. Gate 2354 now operates and supplies binary 1 to the signal output A88, thus signifying that: the channel has been used, all data is now compiled, and the system is ready to commence printout. Flip-flops 2355 and 2332 are reset by binary 0 from A90 at the end of print-out.

Figure 24:
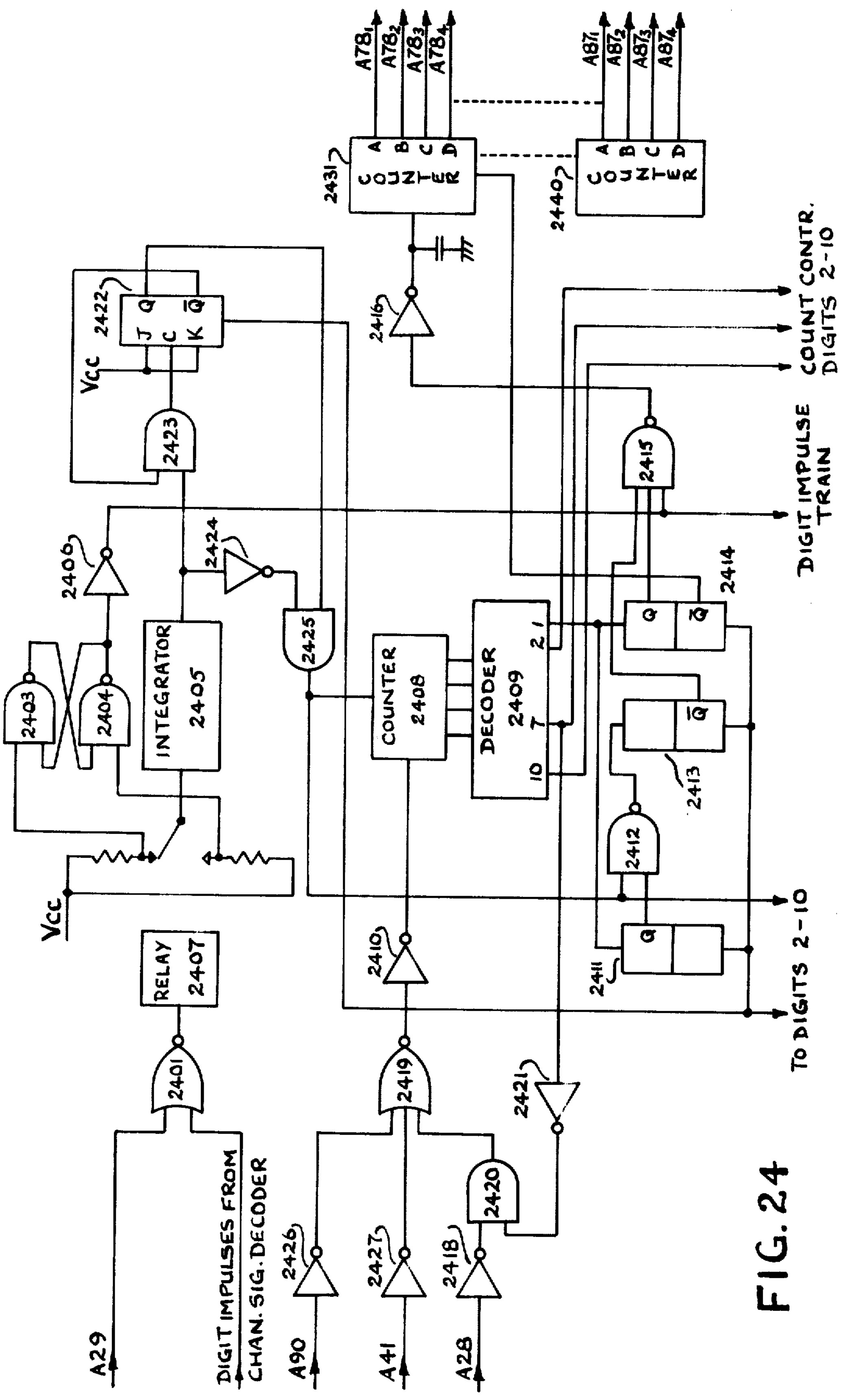

Specifically referring to FIG. 24, the illustrated circuit is a ten-digit register, similar in design the threedigit register (FIG. 16). The purpose of this circuit is to record the number called by the mobile subscriber when placing a toll call.

The two input NOR gate 2401 receives dial impulse inputs from either the operator (A29 input) or from the calling mobile signalling decoder. These dial impulses actuate the relay 2407 and are repeated by the relay wiper for the integrating circuit 2405. The two input NAND gates 2403 and 2404 form an anti-bounce circuit to preclude relay contact noise from the logic circuit.

On dailing the first digit (access digit) the output of the integrator 2405 goes first to binary 1 where it remains until the end of the digit impulse train, then drops again to binary 0. The output binary 1 of the integrator 2405 is applied to one input of the two input AND gate 2423, the other input of which is also at binary 1 from the $\overline{Q}$ output of the clocked flip-flop 2422 which is in its reset state. Gate 2423 operates and sends binary 1 to the clock input terminal of flip-flop 2422. The J and K input terminals of flip-flop 2422 are wired to a supply voltage equivalent to binary 1. Flip-flop 2422 operates and sets, the $\overline{Q}$ output providing binary 0 to one input of gate 2423 and inhibiting it. Binary 1 from the Q output of flip-flop 2422 is applied to one input of the two-input AND gate 2425 and enables it. All succeeding impulses from integrator 2405 are inverted by invertor 2424 and repeated by the enabled gate 2425.

It will be seen that the above-described circuit absorbes the initial access digit, precluding this digit from registration as part of the number called by the mobile subscriber or operator.

The counter 2405 and decoder 2409 control the digit count as earlier described in conjunction with similar circuitry in the three-digit register in FIG. 16. Preset-reset flip-flops 2411, 2413, 2414 and gates 2412 and 2415 with inverter 2416 control switching on and off of the impulse counters 2431 through 2440. The operation is similar to that described in conjunction with the three-digit register (FIG. 16). The outputs of counters 2431 through 2440 are not decoded but remain in BCD format. The capacitor 2417 is a noise prevention measure.

The ten-digit register may be reset either by a binary 0 input on A90 at the end of the data print-out cycle or by a binary 0 A41 input from the operator's clear circuit (FIG. 18). Input A90 is applied to inverter 2426 which provides binary 1 to one input of the three-input NOR gate 2419. The output binary 0 of gate 2419 resets flip-flops 2422, 2411, 2413, 2414 and impulse count control circuits for the successive nine digits. The output binary 0 of gate 2419 is also applied to inverter 2410 which gives binary 1 to counter 2408 and resets it. Decoder 2409 is also reset to output position zero. Input A41 is applied to inverter 2427 and binary 1 is applied to the second input of gate 2419 resetting the circuit as explained above.

The third input to gate 2419 which will reset the circuit is derived as follows. If the calling mobile subscriber, or the operator on behalf of the mobile subscriber, dials a local call via the central office (7 digits plus access digit) the digit count control counter 2409 provides binary 0 at output 7 and dialing is complete at this point. The binary 0 from output 7 is inverted by inverter 2421 and binary 1 is applied to one input of two-input AND gate 2420. When the call is completed (i.e. the dialed party answers) signal input A28 from the combined reversed battery circuit goes to binary 0 and is inverted by inverters 2418. Binary 1 output of inverter 2418 is applied to the second input of gate 2420. Output binary 1 from gate 2420 is applied to the third input of gate 2419 which operates and resets the ten digit register as previously described.

When a toll call is made by the mobile subscriber or operator, ten digits are stored by the circuit; hence output 7 of decoder 2409 is at binary 1 which is inverted by inverter 2421, resulting in a binary 0 to inhibit gate 2420.

FIG. 25 shows the print-out commutation circuit. The purpose of this circuit is to select each channel in turn and stop on a channel for which ticketing data is stored and completed, ready for print-out.

Assuming the preset-reset flip-flop 2504 to be in the reset condition, output $\overline{Q}$ gives binary 1 to one input of the two-input AND gate 2503. The clock frequency is repeated by gate 2503 and causes counter 2501 to operate. The decoder 2502 steps to position 1 and applies binary 0 to the input of inverter 25141. Binary 1 from the output of inverter 25141 is applied to one input of two-input AND gate 2503. The second input A88 to gate 2508 is binary 0 except when complete call data is stored in the system, ready for print-out, in which case A88 is binary 1.

If input A88 is at binary 0 the output of gate 2508 is at binary 0, thus inhibiting the 120 two-input AND gates 2521 through 25140. The print-out circuit, FIG. 26, is not activated. If however the A88 input is at binary 1, one input to two-input AND gate 2506 is at binary 1. The second input to gate 2506 is at binary 1 from the output of inverter 25141. Gate 2506 operates, giving binary 1 to inverter 2510 which is wired as a NOR gate with inverter 2511 in channel N. The binary 0 output of inverter 2510 is inverted by inverter 2512 and binary 1 is applied to the input of one-shot multivibrator 2505. The one-shot supplies a binary 0 pulse to the preset input of preset-reset flip-flop 2504 which is operated to the set condition. The output $\overline{Q}$ of flip-flop 2504 sends binary 0 to one input of gate 2503 and inhibits it, thus preventing counter 2501 from operating and stepping decoder 2502. Print-out now takes place in conjunction with the circuit of FIG. 26.

At the end of the print-out cycle input A93 appleis binary 1 to one input of the two-input AND gate 2513. The second input to gate 2513 receives binary 1 from inverter 25141 Gate 2513 operates and applies binary 1 to the input of one-shot multivibrator 2514 which applies a binary 0 pulse from its $\overline{Q}$ output to reset the data storage circuitry via control line A90. A binary 1 pulse is given by the Q output of the one-shot 2515 and inverted by inverter 2517 which forms a wired-NOR gate with inverter 2518. The output binary 0 from inverter 2517 is applied to the reset input terminal of flip-flop 2504 which resets. The binary 1 output $\overline{Q}$ of flip-flop 2504 is applied to one input of gate 2503 and enables it, thus permitting the clock pulses to operate counter 2501 and stop decoder 2502.

FIG. 26 shows the print-out data control circuit. Assuming the preset-reset flip-flop 2635 to be in the set condition, the $\overline{Q}$ output applies binary 0 to the magnetic tape recording apparatus 2633 and the printer 2631, both of which are disabled thereby. On receipt of a binary 1 pulse on input A94 from any channel, inverters 2636 and 2637 invert the input to binary 0. Inverters 2636 and 2637 form a wired-NOR gate. The output binary 0 pulse from either inverter 2636 or 2637 is applied to the reset input of flip-flop 2635 which switches to the reset condition. Binary 1 output $\bar{Q}$ starts the printer 2631 and magnetic tape apparatus 2633. Binary 1 on the reset inputs to counters 2610, 2611 are now removed and replaced by binary 0 thus enabling these circuits.

The data parallel-to-series multiplexers 2601 through 2608 are driven by the output of counter 2611. Assuming clocked flip-flops 2613, 2614 and 2615 to be in the reset condition, binary 1 from the output $\bar{Q}$ of flip-flop 2615 is applied to one input of two-input AND gate 2612 thus enabling it. The output of counter 2611, operating in response to the clock impulses via gate 2612, enables input A58 via multiplexer 2601. The output of multiplexer 2601 relays the binary status of input A58$_1$ to input 0 of multiplexer 2609. The multiplexer 2609 is clocked by the output of counter 2610 and on the first impulse enables input 0. Thus the first bit from A58$_1$ is transferred to output X of multiplexer 2609. The counter 2610 is driven from the D output of counter 2611 which performs a divide-by-sixteen function for the clock pulses. Therefore the inputs A58$_1$ through A60are transferred to input 0 of multiplexer 2609 as the clock causes the counter 2611 to step, and they appear at the X output of multiplexer 2609.

Counter 2619 is driven by the clock impules via gate 2612. Decoder 2620 steps first to output position 1 and supplies binary 0 to inverter 2621. The binary 1 output of inverter 2621 is applied to the clock input of clocked flip-flop 2625. The X output of multiplex 2609 is present on the D input of flip-flop 2625 prior to the binary 1 from inverter 2621 due to the operating delays of the circuit components. Therefore if the output X of multilexer 2609 is at binary 1 the Q output flip-flop 2625 goes to binary 1. If binary 0 is present the Q output of flip-flop 2625 remains at binary 0. The counter 2619 and decoder 2620 operate on receipt of the next clock impulse and go to output position 2. The binary 0 output of decoder 2620 is inverted by inverter 2622 and is applied as binary 1 to the clock input of flip-flop 2626. Prior to the transition to binary 1 on the clock input to flip-flop 2626, input A58$_2$ is transferred to the output of multiplexer 2609 and applied to the D input of flip-flop 2626. If the output X of multiplexer 2609 is at binary 1 flip-flop 2626 operates and provides binary 1 at output Q. The counter 2619 and decoder 2620 step four times in all, transferring data from the output of multiplexer 2609 to the outputs of flip-flops 2625, 2626, 2627 and 2628, respectively.

The clocked flip-flops 2613, 2614 and 2615 form a divideby-four circuit. The operation of similar circuitry has been previously described. On the fourth count, when output position 4 of the decoder 2620 goes to binary 0, the Q output of flip-flop 2615 goes to binary 1, which is applied to the input of one-shot multivibrator 2616. One-shot 2616 provides a binary 1 pulse to delay circuit 2617. The period of the delay circuit 2617 is sufficiently great to permit the output X of multiplexer 2609 to have been transferred by counter 2620 to the Q output of flip-flop 2628. The binary 1 output of delay 2617 is applied to the reset terminal of counter 2619 and the clock input of the latch 2629, and is inverted to give binary 0 to the reset terminals of flip-flops 2625, 2626, 2627 and 2628. As a function of component operating delays the latch 2629 operates first and transfers the data in the inputs 1, 2, 3 and 4 to the outputs $Q_1$, $Q_2$, $Q_3$ and $Q_4$. The binary 0 from the output of inverter 2638 resets the flip-flops 2625, 2626, 2627 and 2628. Finally the counter 2619 and decoder 2620 are reset to zero count. The flip-flops 2613, 2614 and 2615 are reset at the same time as latch 2629 is momentarily activated.

The outputs $Q_1$, $Q_2$, $Q_3$ and $Q_4$ provide the four bits of BCD data to the code counter 2630 which converts the BCD data into any convenient machine or other code of *n* bits. The output bits 1 through *n* of code converter 2630 are applied to printer 2631 which prints the corresponding digit to inputs A58$_1$, A58$_2$, A58$_3$ and A58$_4$. Simultaneously the outputs 1 through *n* of code converter 2630 are applied to tone generator 2632 which converts a binary outputs of the code converter 2630 for recording by the magnetic tape recording apparatus 2633.

The four-bit cycle described above will be repeated 30 times until all 120 bits from inputs A58$_1$ through A87$_4$ have been printed out and recorded.

The output of gate 2612 applies clock pulses to the divide-by-120 circuit 2634. The output of the divider 2634 remains at binary 1 during the division cycle and changes to binary 0 at the end of 120 pulses. Binary 0 is thus applied to the preset input of flip-flop 2635 and sets it. The output $\bar{Q}$ of flip-flop 2635 goes to binary 1 and reset counters 2610 and 2611; it also supplies binary 1 to the signal output A93 to reset other circuits in the system as previously described. The output Q oif flip-flop 2635 goes to binary 0 and is applied to delay circuit 2618. The period of the delay provided by delay circuit 2618 is sufficient to permit completion of printout of the final digit by the printer and recording on the magnetic tape apparatus prior to shutting them down.

The outputs 1 through *n* of the code counter 2630 also provide outputs for data transmission as required.

Mobile Station Circuitry

The foregoing description relates primarily to the circuitry at the base station of the radio telephone system of the present invention. In order to provide a full understanding of system operation, the following sections are provided in which a description of the circuitry at each mobile station is presented briefly insofar as that circuitry is important to an understanding of base station operation.

Home Channel Encoder

The home channel encoder for utilization in the mobile station is preferably an electromechanical device. For example, a synchronous motor may drive a disc having a number of rectangular holes punched in its surface proximate the disk periphery. While the disc is rotating a light source on one side of the disc positively flashes through the hole to impinge upon a photoelectric detection device on the other side of the disc. Two standard separations are provided between the holes; one corresponding to 40 millisecond spacing between light pulses at the particular motor speed, and the other corresponding to 70 milliseconds between light pulses.

The holes are arranged to provide the correct number of 40 millisecond dark period to the detector followed by a 70 millisecond dark period corresponding to the code sequence desired. Light and dark intervals are inverted by the detector circuit and utilized to key a 2900 Hz home channel tone oscillator.

Mobile Home Channel Decoder and Selector Circuit

Figure 27:
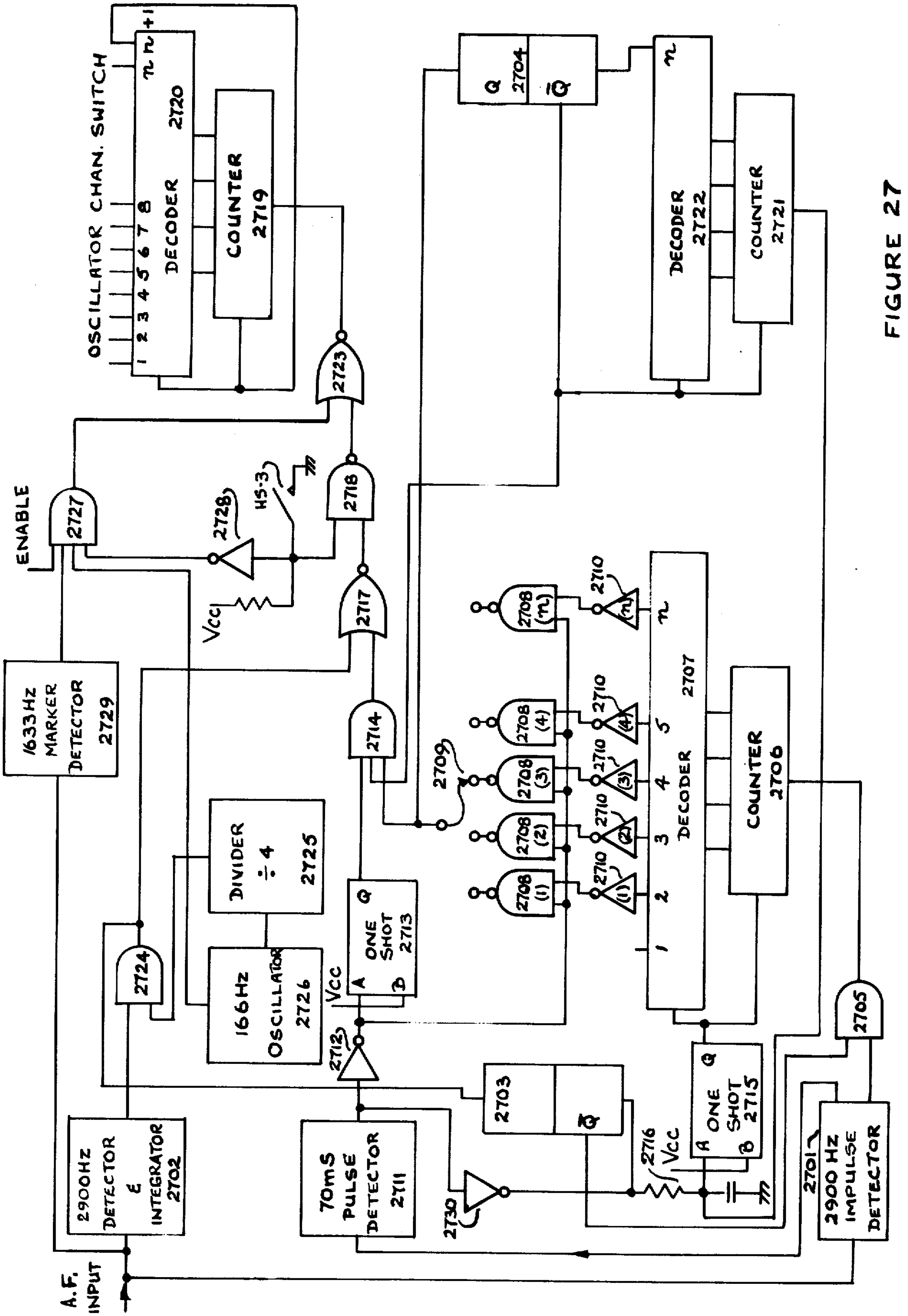
FIG. 27 is a schematic diagram of the home channel decoder and selector circuit in a mobile station utilized in the present invention.

The mobile station home channel decoder and selector circuit is illustrated in FIG. 27. The purpose of this circuit is to receive the encoded data from the base station home channel encoder and to set the mobile receiver and transmitter oscillators to the corresponding channel to receive incoming calls.

As previously mentioned, the mobile station may move from one base station area to another base station area in which a different number of RF channels are in operations. The original home channel of the mobile station may not be in operation in the new area, and therefore an alternative channel must be used. The mobile station is automatically switched to the new home channel upon receipt of the home channel coding signal from the new base station. The circuit of FIG. 27 operates on the coded tone principle wherein 40 millisecond tone pulses, spaced by 8 milliseconds, are provided in a pulse series. The number of pulses in a series represent the coded number. Successive series, representing successive coded numbers, are spaced by 70 millisecond pulses. Other approaches to home channel encoding may utilize binary coded frequency shift keying, binary coded poly-phase modulation, or functionally similar coding approaches.

The audio (A.F.) input signal illustrated in FIG. 27 is derived from the mobile station receiver and drives the 2900 Hz impulse detector 2701 and the 2900 Hz detector and integrator circuit 2702. Assuming flip-flops 2703 and 2704 to be reset, the output signal from the 2900 Hz impulse detector 2701 is repeated by AND gate 2705 and counted at binary counter 2706. The active output line from decoder 2707 is stepped in accordance with the count in counter 2706. The home channel number corresponding to the code is preset by the plug-in lead 2709 connected to one of the series of NAND gates 2708(1) through **2708(*n*). The NAND gates are driven by respective output lines from decoder 2707 via respective inverters 2710(1) through 2710(*n*).**

Upon receipt of the 70 millisecond pulse representing the forthcoming start of a digit pulse series, the 70 millisecond pulse detector 2711 provides a binary 0 output pulse which is inverted by inverter 2712 to trigger one-shot multivibrator 2713. In addition, the output signals from inverter 2712 is applied to all of NAND gates 2708(1) through **2708(*n*). Only one of these gates is actuated; specifically, only the NAND gate corresponding to the active output line from decoder 2707 is switched from its binary 1 to its binary 0 state. If the actuated gate corresponds to that to which plug-in lead 2709 is connected, binary 0 is applied to one input of the three-input AND gate 2714 at the same time a binary 1 pulse is provided by one-shot multivibrator 2713. The other input signal to AND gate 2714 is at the binary 1 level since flip-flop 2704 is assumed to be reset. The output pulse from one-shot multivibrator 2713 has a duration of between 20 and 40 nanoseconds; this is much shorter than the 70 millisecond pulse applied to AND gate 2714 through the selected NAND gate 2708. Also the output pulse from the selected NAND gate 2708 changes to binary 1 prior to the generation of the binary 1 pulse by one-shot multivibrator 2713 because of the pulse generation delay (on the order of 35 nanoseconds) in one-shot 2713.**

One-shot multivibrator 2715 also receives a pulse from 70 millisecond pulse detector 2711, via inverter 2730, which pulse is delayed by RC circuit 2716. One-shot 2715 therefore generates a pulse at a time much later than one-shot 2713, the later pulse resetting counter 2706 and decoder 2707. The trailing edge of the detected 70 millisecond pulse causes the counter 2706 to step to position 1 which is not connected to any NAND gate 2708; therefore, the code connections of gates 2708 are arranged to avoid false counts.

AND gate 2705 does not operate at this time so that binary 0 is provided to NOR gate 2717. This gate in turn provides a binary 1 to NAND gate 2718 which does not operate but remains in the binary 0 state. Counter 2719 and decoder 2720 therefore do not step and the mobile transmitter receiver remains on the same channel.

A binary 0 pulse from the selected NAND gate 2708 is operative to preset flip-flop 2704 so that the $\overline{Q}$ output signal form that flip-flop switches to binary 0. This condition disables AND gate 2714 and enables counter 2721 and decoder 2722.

When counter 2721 is enabled it steps in response to each detected 70 millisecond pulse to a predetermined number count corresponding to the maximum number of home channel codes utilizes in any one RF channel. The purpose of this circuit is to limit the time required by the mobile station, in the worst case, to assume a standby poistion in its home channel. When decoder 2722 steps to count *n*, flip-flop 2704 resets to provide a binary 1 to the counter 2721 and decoder 2722 for reset purposes and to once again enable AND gate 2714.

When the count in counter 2706 does not correspond to the home channel setting, the signal on plug-in lead 2709 is at the binary 1 level. AND gate 2714 is actuated to provide a binary 1 signal to NOR gate 2717 which is actuated thereby to provide a binary 0 signal to NAND gate 2719. NAND gate 2718 switches to provide a binary 1 signal at one input terminal of NOR gate 2723 which in turn provides a binary 0 signal to cause counter 2719 to step. If no RF channel corresponding to the new count position is found to be in operation from the base station, the 2900 Hz detector and integrator circuit 2702 provides a binary 1 signal to AND gate 2724 which is enabled thereby. The output signal from the divide-by-four circuit 2725, fed by the 166 Hz oscillator 2726, is applied to the other input terminal of AND gate 2724 and causes counter 2719 to step by pulsing gates 2717, 2718 and 2723. Stepping of counter 2719 continues until the output of the 2900 Hz integrator and detector circuit 2702 become binary 0, indicating that an RF channel is in operation.

The hook switch HS3 is normally open when the hand set at the nobile station is on hook. When the hand set is taken off hook the switch closes to provide a binary 0 signal to NAND gate 2718, causing the latter to switch, whereupon it provides a binary 1 output signal. In addition, a binary 1 signal is applied to AND gate 2727 via inverter 2728 permitting the 166 Hz oscillator 2726 to step counter 2719 when no 1660 Hz marker is detected by detector 2729. For this purpose it is assumed that when no marker is present, the output signal from the detector 2729 is at the binary 1 level.

Upon finding an idle channel, that is, a channel with a 1633 Hz marker present, the output signal of the 1633 Hz detector becomes binary 0 and disables AND gate 2727; consequently, counter 2719 no longer steps. When decoder 2720 reaches the *n* position it immediately resets both decoder 2720 and counter 2719 to permit stepping to continue until stopped by the presence of a 1633 Hz marker on a channel.

Mobile Decode Complete Circuit

Figure 28:
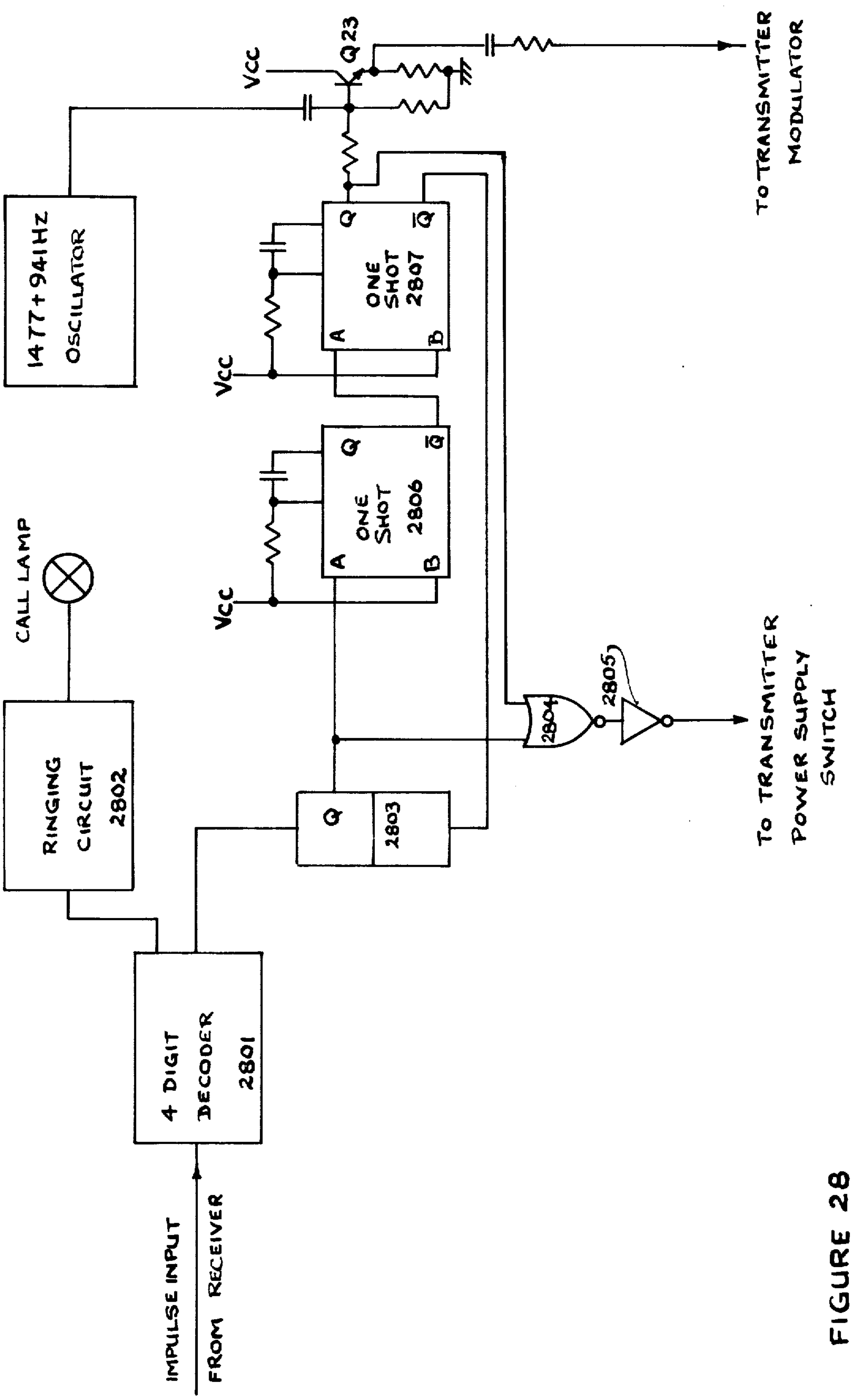
FIG. 28 is a schematic diagram of the decode complete circuit in a mobile station according to the present invention.

The mobile decode complete circuit is illustrated in FIG. 28 and provides the necessary 1477 + 941 Hz pulse of 70 millisecond duration which operates the returned ringing circuit controlled by flip-flop 812 in FIG. 8.

Four-digit decoder 2801 in FIG. 28 represents the entire mobile number decoding circuit. When decoding is complete, the mobile station provides an audible ringing tone via ringing circuit 2802 to alert the subscriber that the station is being called. In addition, a call lamp is lit to attract the subscriber's attention. Flip-flop 2803 is preset by a binary zero output signal from four-digit decoder 2801 and turns on the mobile station transmitter via NOR gate 2804 and inverter 2805. In addition one-shot multivibrator 2806 is triggered to provide a negative-going pulse of approximately 100 milliseconds (or longer if required). At the trailing edge of this negative-going pulse, one-shot 2807 is triggered to provide a 70 millisecond positive going pulse. Transistor switch Q23 is rendered conductive during the 70 millisecond pulse and provides a 1477 + 941 Hz tone to the modulator of the mobile transmitter.

The $\overline{Q}$ output signal from one-shot 2807 resets flip-flop 2803; however, the mobile transmitter remains on for the duration of the pulse due to the binary 1 supplied from the Q output signal of one-shot 2807 via NOR gate 2804 and inverter 2805.

The reason for one-shot 2806 is to provide a delay after switching on the transmitter and before transmitting the 70 millisecond pulse.

From the foregoing description it is seen how a mobile station according to the present invention automatically receives calls on a predetermined home channel when located on its own base station area. When the mobile station moves into another area where its home channel is not available, an alternative channel is coded specifically to permit adoption thereof by the mobile station as its home channel. The mobile stations therefore search for specific home channel codings as they move from area to area.

Conclusion

As described herein, the system of the present invention includes among its advantages the following features:

1. All idle channels are automatically marked with a distinctive marker tone, permitting a mobile station, when initiating a call, to seize any idle channel. Each mobile station receives a call on a specially designated home channel; alternative home channels are provided by means of special code signalling so that mobiles are operable with different base stations even though those base stations may not have the normal home channel of the mobile available.

2. If a mobile station, in calling a second mobile station, seizes the home channel of the second station, the call continues on the single channel in a semi-duplex communication mode, thereby conserving channel availability.

3. Automatic subscriber metering is provided in the system. Identification of each originating subscriber is made by means of the mobile I.D. code. A completed call, that is, a call wherein the called subscriber answers, is denoted either by metering pulses or reverse battery supervision from the central office. In the case of a mobile to public system call, reverse battery supervision is from the central office; in the case of a mobile-to-mobile call, reverse battery is provided when the called mobile lifts the hand set off hook to answer the call. This function is provided by the combination of the 70 millisecond start and stop pulses in the I.D. sequence of the called mobile.

4. A mobile station originating a call on the system but having no meter in the system is automatically reverted to the operator for handling. In such a case the operator may place the call for the mobile and metering is accomplished in the operator's metering circuit. When the subscriber is reverted to the operator the mobile identification number is displayed at the operator position.

While specific circuitry and coding techniques have been described and illustrated to achieve the foregoing advantageous features, it will be apparent that various other circuitry and coding approaches may be similarly utilized within the scope of the disclosed invention.

While I have described and illustrated specific embodiments of my invention, it will be clear that variations of the details of construction which are specifically illustrated and described may be resorted to without departing from the true spirit and scope of the invention as defined in the appended claims.

I claim:

1. A multi-channel mobile radio telephone system of the type wherein mobile stations are capable of initiating and receiving calls to and from other mobile stations and stations in a public telephone system, wherein a base station serves as a relay-link for all calls and is capable of transmitting and receiving signals via each of said channels, wherein a plurality of mobile stations are each individually tunable to respective channels for purposes of transmitting and receiving signals during calls, said system being characterized in that different channels are assigned as home channels to respective groups of mobile stations such that each mobile station can receive a call only on its assigned home channel but can initiate calls on any idle channel, said system comprising:

channel marker means at said base station for transmitting an idle marker signal on each channel on which no call is in progress;

automatic tuning means at each mobile station for automatically tuning that mobile station to its home channel when that mobile station is not party to a call in progress; and selectively actuable call-initiating means at each mobile station for automatically seizing an idle channel upon actuation, said call-initiating means comprising:

means for automatically scanning said channels to detect the presence of said idle marker signal;

channel seizing means responsive to actuation of said call-initiating means for automatically tuning the mobile station to one of the channels on which said idle marker signal is detected;

means at said base station for automatically removing said idle marker signal from a channel which is seized;

wherein each mobile station is assigned a unique identification number, and wherein each mobile station includes means responsive to seizure of a channel by that mobile station in initiating a call for automatically transmitting the identification of that channel in coded form to said base station in the seized channel;

wherein said mobile stations constitute subscribers for the system assigned to said base station, and wherein said base station includes ticketing means for each subscriber for monitoring the time duration of calls initiated by that subscriber; and wherein said base station further includes:

means responsive to reception of a coded mobile station identification on a channel seized by a calling mobile station for determining whether or not ticketing means is present at said base station for said calling mobile station; and means responsive to a determination that ticketing means is present at said base station for said calling mobile station for returning a dial tone signal to said calling mobile station via said seized channel.

2. The system according to claim 1 wherein said base station includes:

means for detecting calls intended for mobile station subscribers assigned to said base station; means responsive to a detected call for one of said mobile station subscribers for determining if the home channel for that mobile station is busy by detecting the presence of said idle marker signal on that channel; means responsive to a determination that the home channel of a called mobile station is busy for transmitting a busy signal to the calling station; and means responsive to a determination that the home channel of a called mobile station is idle for transmitting on that channel in coded form the identification number of the called subscriber; and wherein each mobile station includes: decoding means, operative when that mobile station is idle, for monitoring each coded identification number transmitted on its home channel and providing a decode complete signal when the monitored identification number corresponds to the identification number for that mobile station; and means for transmitting said decode complete signal, when provided, back to said base station via said home channel.

3. The system according to claim 2 further comprising timing means at said base station for restoring said idle marker signal to the home channel of a called mobile station if the decode complete signal is not received from the called mobile station at said base station within a predetermined time period after the coded identification signal for that mobile station is transmitted by said base station.

4. A multi-channel mobile radio telephone system of the type wherein mobile stations are capable of initiating and receiving calls to and from other mobile stations and stations in a public telephone system, wherein a base station serves as a relay-link for all calls and is capable of transmitting and receiving signals via each of said channels, wherein a plurality of mobile stations are each individually tunable to respective channels for purposes of transmitting and receiving signals during calls, said system being characterized by the absence of channel-switching at each mobile station when a call is not in progress at that station and in that each mobile station can initiate calls on any idle channel, said system comprising:

channel marker means at said base station for transmitting an idle marker signal on each channel on which no call is in progress; and selectively actuable call-initating means at each mobile station for automatically seizing any idle channel upon actuation, said call-initiating means comprising:

means for automatically scanning said channels to detect the presence of said idle marker signal; and channel seizing means responsive to actuation of said call-initiating means for automatically tuning the mobile station to one of the channels on which said idle marker signal is detected;

wherein said base station includes: a plurality of memory circuits, one for each mobile station; means responsive to seizure of a channel by a mobile station in initiating a call for providing an "in-use" indication in the memory circuit for that mobile station; and means for clearing said in-use indication from said memory circuit when that channel is released from the initiated call.

5. The system according to claim 4 wherein said base station includes:

means for detecting calls intended for mobile station subscribers assigned to said base station; means responsive to a detected call for one of said mobile station subscribers for determining if that mobile station is busy; means responsive to a determination that the called mobile station is busy for transmitting a busy signal to the calling station; and means responsive to a determination that the called mobile station is idle for transmitting to the called mobile station in coded form the identification number of the called mobile station; and wherein each mobile station includes: decoding means, operative when that mobile station is idle, for monitoring each coded identification number transmitted thereto, and providing a decode complete signal when the monitored identification number corresponds to the identification number for that mobile station; and means for transmitting said decode complete signal, when provided, back to said base station.

6. A multi-channel mobile radio telephone system of the type wherein mobile stations are capable of initiating and receiving calls to and from other mobile stations and stations in a public telephone system, wherein a base station serves as a relay-link for all calls and is capable of transmitting and receiving signals via each of said channels, wherein a plurality of mobile stations are each individually tunable to respective channels for purposes of transmitting and receiving signals during calls, said system being characterized in that different channels are assigned as home channels to respective groups of mobile stations such that each mobile station can receive a call only on its assigned home channel but can initiate calls on any idle channel, said system comprising:

channel marker means at said base station for transmitting an idle marker signal on each channel on which no call is in progress;

automatic tuning means at each mobile station for automatically tuning that mobile station to its home channel when that mobile station is not party to a call in progress; and selectively actuable call-initiating means at each mobile station for automatically seizing an idle channel upon actuation, said call-initiating means comprising:

means for automatically scanning said channels to detect the presence of said idle marker signal;

channel seizing means responsive to actuation of said call-initiating means for automatically tuning the mobile station to one of the channels on which said idle marker signal is detected;

means at said base station for automatically removing said idle marker signal from a channel which is seized;

wherein said base station includes:

means for detecting calls intended for mobile station subscribers assigned to said base station; means responsive to a detected call for one of said mobile station subscribers for determining if the home channel for the mobile station is busy by detecting the presence of said idle marker signal on that channel; means responsive to a determination that the home channel of a called mobile station is busy for transmitting a busy signal to the calling station; and means responsive to a determination that the home channel of a called mobile station is idle for transmitting on that channel in coded form the identification number of the called subscriber; and wherein each mobile station includes: decoding means, operative when that mobile station is idle, for monitoring each coded identification number transmitted on its home channel and providing a decode complete signal when the monitored identification number corresponds to the identification number for that mobile station; and means for transmitting said decode complete signal, when provided, back to said base station via said home channel.

7. The system according to claim 6 further comprising timing means at said base station for restoring said idle marker signal to the home channel of a called mobile station if the decode complete signal is not received from the called mobile station at said base station within a predetermined time period after the coded identification signal for that mobile station is transmitted by said base station.

8. The system according to claim 7 further comprising: means at said base station, responsive to nonreception of said decode complete signal from a called mobile station within said predetermined time period, for examining the memory circuit assigned to the called mobile station to detect if an in-use indication is present; means responsive to detection of an in-use indication in the memory circuit of the called mobile station for returning a busy signal to the calling party; and means responsive to the absence of an in-use indication in the examined memory circuit of a called mobile station for returning an out-of-service signal to the calling party.

9. A multi-channel mobile radio telephone system of the type wherein mobile stations are capable of initiating and receiving calls to and from other mobile stations and stations in a public telephone system, wherein a base station serves as a relay-link for all calls and is capable of transmitting and receiving signals via each of said channels, wherein a plurality of mobile stations are each individually tunable to respective channels for purposes of transmitting and receiving signals during calls, said system being characterized in that different channels are assigned as home channels to respective groups of mobile stations such that each mobile station can receive a call only on its assigned home channel but can initiate calls on any idle channel, said system comprising:

channel marker means at said base station for transmitting an idle marker signal on each channel on which no call is in progress;

automatic tuning means at each mobile station for automatically tuning that mobile station to its home channel when that mobile station is not party to a call in progress;

selectively actuable call-initiating means at each mobile station for automatically seizing an idle channel upon actuation, said call-initiating means comprising:

means for automatically scanning said channels to detect the presence of said idle marker signal; and channel seizing means responsive to actuation of said call-initiating means for automatically tuning the mobile station to one of the channels on which said idle marker signal is detected; and means for establishing a semi-duplex communication mode between a calling mobile station and a called mobile station when the calling mobile station seizes the home channel of the called mobile station.

10. A multi-channel mobile radio telephone system of the type wherein mobile stations are capable of initiating and receiving calls to and from other mobile stations and stations in a public telephone system, wherein a base station serves as a relay-link for all calls and is capable of transmitting and receiving signals via each of said channels, wherein a plurality of mobile stations are each individually tunable to respective channels for purposes of transmitting and receiving signals during calls, said system being characterized in that different channels are assigned as home channels to respective groups of mobile stations such that each mobile station can receive a call only on its assigned home channel but can initiate calls on any idle channel, said system comprising:

channel marker means at said base station for transmitting an idle marker signal on each channel on which no call is in progress;

automatic tuning means at each mobile station for automatically tuning that mobile station to its home channel when that mobile station is not party to a call in progress;

selectively actuable call-initiating means at each mobile station for automatically seizing an idle channel upon actuation, said call-initiating means comprising:

means for automatically scanning said channels to detect the presence of said idle marker signal; and channel seizing means responsive to actuation of said call-initiating means for automatically tuning the mobile station to one of the channels on which said idle marker signal is detected;

wherein said mobile stations each comprise:

tunable transmitter and receiver means capable of being tuned to each of said channels individually;

detector means responsive to signals received by said transmitter and receiver means for determining if the channel to which said transmitter and receiver is tuned is idle or is carrying a call in process;

means for automatically tuning said transmitter and receiver means to a predetermined home channel when said mobile station is not party to a call in process;

switch means actuable when a call is to be initiated from said mobile station;

control means responsive to actuation of said switch means for monitoring said detector means and, if the channel to which said transmitter and receiver means is tuned is carrying a call in progress, successively tuning said transmitter and receiver means to individual channels until an idle channel is determined by said detector means; and wherein said mobile stations are adapted for use in regions wherein the predetermined home channel may be unavailable for transmission and reception by a mobile station, each mobile station further comprising:

means for detecting unavailability of said predetermined home channel;

means for establishing an alternate home channel; and tuning means responsive to unavailability of said predetermined home channel for automatically tuning said transmitter and receiver means to said alternate home channel when said mobile station is not party to a call in process.

11. A multi-channel mobile radio telephone system of the type wherein mobile stations are capable of initiating and receiving calls to and from other mobile stations and a public telephone system, wherein a base station serves as a relay link for all calls and is capable of transmitting and receiving signals via each of said channels, and wherein a plurality of mobile stations are each assigned a unique identification number and are individually tunable to respective channels for purposes of transmitting and receiving signals during calls, said system being characterized in that mobile stations which are normally serviced by other base stations are able to utilize said system for initiating calls, said system comprising:

operator-actuable equipment at said base station for enabling an operator to transmit and receive signals and to initiate and receive calls on any of said channels;

actuable call-initiating means at each mobile station;

means at each mobile station responsive to actuation of said call-initiating means for seizing an unused channel and transmitting thereon a coded identification signal representing the identification number of the mobile station;

metering means at said base station for monitoring the elapsed time of calls within and outside said system initiated by mobile stations normally assigned to said base station; and means at said base station responsive to reception of a coded identification signal from a mobile station having no metering means at said base station for automatically connecting said operator-actuable equipment to the channel which was seized by the calling mobile station.

12. In a multi-channel mobile radio-telephone system of the type wherein mobile stations are capable of initiating and receiving calls to and from other mobile stations and a public telephone system, and wherein a base station serves as a relay link for all calls and is capable of transmitting and receiving signals via each of said channels, wherein a plurality of mobile stations are each individually tunable to respective channels for purposes of transmitting and receiving signals during calls, the method comprising the steps of:

conducting calls between a mobile station and a station in said public telephone system in a duplex communication mode;

conducting calls between a calling mobile station and a called mobile station in a duplex communication mode, utilizing two of said channels, when the called mobile station initiates the call by seizing a channel other than the home channel of the called mobile station; and conducting calls between a calling mobile station and a called mobile station in a semi duplex communication mode, utilizing only one of said channels, when the calling mobile station seizes the home channel of the called mobile station in initiating a call.

13. In a multi-channel mobile radio telephone system of the type wherein mobile stations are capable of initiating and receiving calls to and from other mobile stations and stations in a public telephone system, wherein a base station serves as a relay-link for all calls and is capable of transmitting and receiving signals via each of said channels, wherein a plurality of mobile stations are each individually tunable to respective channels for purposes of transmitting and receiving signals during calls, a method of communication characterized in that said mobile stations seize any channel upon initiating calls, said method comprising the steps of:

transmitting from said base station an idle marker signal on each channel on which no call is in progress;

initiating a call at a mobile station on an idle channel by:

monitoring said channels at each mobile station to detect the presence of said idle marker signal; and automatically tuning the mobile station to a channel on which said idle marker is detected when a call is to be initiated from that mobile station;

wherein each mobile station is assigned a unique identification number, and wherein each mobile station responds to seizure of a channel by that mobile station in initiating a call by automatically transmitting the identification of that channel in coded form to said base station via the seized channel; and wherein said mobile stations constitute subscribers for the system assigned to said base station, and wherein said base station automatically monitors and accumulates charges for calls initiated by each subscriber on a meter dedicated to that subscriber.

14. The method according to claim 13 comprising the further steps, at said base station, of:

responding to reception of a coded mobile station identification signal on a channel seized by a calling mobile station by determining whether or not a meter is present at said base station for said calling mobile station; and responding to a determination that ticketing means is present at said base station for said calling mobile station by returning a dial tone signal to said calling mobile station via said seized channel.

15. The method according to claim 14 wherein each mobile station is responsive to a dial tone on a channel seized by that mobile station to selectively transmit to said base station the telephone number in coded form of a telephone station being called, wherein said base station responds to reception of a coded telephone number from a calling mobile station by removing dial tone from the channel seized by the calling mobile station and transmitting the received telephone number in coded form to the telephone station having the received telephone number.

16. The system according to claim 15 wherein said base station is connected to a plurality of lines in said public telephone system, each line beng dedicated to carrying telephone calls for a respective one of said channels, and comprising the further steps, at said base station, of:

detecting whether a received telephone number correspsonds to a number in said public telephone system or to the identification number of another mobile station in said radiotelephone system; and responding to detection of a received telephone number in said public telephone system for applying the received telephone number to the line dedicated to the channel seized by the calling mobile station.

17. The method according to claim 16 further comprising the step, at said base station, of responding to detection of a received telephone number corresponding to the identification number of another of said mobile stations by transmitting that identification number in coded form to the corresponding mobile station.

18. The method according to claim 17 further comprising the step of establishing a semi-duplex communication mode between a calling mobile station and a called mobile station when the calling mobile station seizes the channel to which the called mobile station is tuned.

19. The method according to claim 14 further comprising the steps of:

at said base station:

detecting calls intended for its mobile station subscribers; responding to a detected call for one of said mobile stations by determining if that mobile station is busy; responding to a determination that the called mobile station is busy by transmitting a busy signal to the calling station; and responding to a determination that the called mobile station is idle by transmitting to the called mobile station in coded form the identification number of the called subscriber; and at each mobile station: monitoring, when the mobile station is idle, each coded identification number transmitted to that mobile station and providing a decode complete signal when the monitored identification number corresponds to the identification number for that mobile station; and transmitting said decode complete signal, when provided, back to said base station.

20. The method according to claim 19 wherein each mobile station is assigned a home channel on which the mobile station may be called and to which the mobile station is automatically tuned when not party to a call, said method further comprising the step, at said base station, of restoring said idle marker signal to the home channel of a called mobile station if the decode complete signal is not received from the called mobile station at said base station within a predetermined time period after the coded identification signal for that mobile station is transmitted by said base station.

21. The method according to claim 20 further characterized in that said base station is capable of automatically indicating the difference between a called mobile station being out-of-service and being party to another call, said method including the steps at said base station of:

storing a busy indication for each mobile station which initiates a call in progress;

automatically detecting whether a busy indication is stored for a called mobile station if a decode complete signal is not received within said predetermined time period from said called mobile station;

returning a busy signal to the calling party if a busy indication is detected for said called mobile station;

returning an out-of-service signal to the calling party if a busy indication is not stored for a called mobile station for which a decode complete signal has not been received in said predetermined time period.

22. A radio telephone system having multiple radio channels of the type wherein mobile subscriber stations are capable of initiating and receiving calls to and from other mobile stations and stations in a public telephone company, wherein a base station serves as a relay link for calls to and from said mobile stations, said system being characterized by:

one telephone voice channel for each radio channel, each telephone voice channel connecting said base station to said public telephone system, each telephone voice channel serving a respective radio channel exclusively;

transmitter-receiver means at each subscriber station capable of operating on each of said radio channels;

automatic metering means at said base station for registering charges incurred by individual mobile subscriber stations in initiating calls via said system; and means for periodically automatically printing out billing statements for said mobile subscriber stations, said billing statements indicating the charges registered by said automatic metering means.

23. A mobile station for use in a radio telephone system employing multiple communication channels via each of which said mobile station is capable of transmitting and receiving radio signals, said mobile station comprising:

tunable transmitter and receiver means capable of being tuned to each of said individual channels;

detector means responsive to signals received by said transmitter and receiver means for determining whether the channel to which said transmitter and receiver means is tuned is idle or is carrying a call in process;

means for automatically tuning said transmitter and receiver means to a predetermined home channel when said mobile station is not party to a call in process;

switch means actuable when a call is to be initiated from said mobile station; and control means responsive to actuation of said switch means for monitoring said detector means and, if the channel to which said transmitter and receiver means is tuned is carrying a call in progress, successively tuning said transmitter and receiver means to individual channels until an idle channel is determined by said detector means;

wherein said mobile station is adapted for use in a region wherein said predetermined home channel is unavailable for transmission and reception by said mobile station, said mobile station further comprising:

means for detecting unavailability of said predetermined home channel;

means for establishing an alternate home channel; and tuning means responsive to unavailability of said predetermined home channel for automatically tuning said transmitter and receiver means to said alternate home channel when said mobile station is not party to a call in process.

24. The mobile station according to claim 23:

wherein said alternate home channel carries a predetermined coded signal;

wherein said means for establishing an alternate home channel comprises a decoder arranged to recognizing said predetermined coded signal when received by said transmitter and receiver means;

and wherein said tuning means comprises means for operating said control means, in response to unavability of said predetermined home channel and no call in progress at said mobile station, to successively tune said transmitter and receiver means to different channels until said predetermined coded signal is recognized by said decoder.

25. The mobile station according to claim 24 further comprising call recognition means, operative when said mobile station is not party to a call in process and responsive to reception of a predetermined identification code by said transmitter and receiver means, for applying a "decode complete" signal to said transmitter and receiver means for transmission via the channel to which said transmitter and receiver means is tuned.

26. A mobile station for use in a radio telephone system employing multiple communication channels via each of which said mobile station is capable of transmitting and receiving radio signals, said mobile station comprising:

tunable transmitter and receiver means capable of being tuned to each of said individual channels;

detector means responsive to signals received by said transmitter and receiver means for determining whether the channel to which said transmitter and receiver means is tuned is idle or is carrying a call in process;

means for automatically tuning said transmitter and receiver means to a predetermined home channel when said mobile station is not party to a call in process;

switch means actuable when a call is to be initiated from said mobile station;

control means responsive to actuation of said switch means for monitoring said detector means and, if the channel to which said transmitter and receiver means is tuned is carrying a call in progress, successively tuning said transmitter and receiver means to individual channels until an idle channel is determined by said detector means; and call recognition means, operative when said mobile station is not party to a call in progress and responsive to reception of a predetermined identification code by said transmitter and receiver means, for applying a decode complete signal to said transmitter and receiver means for transmission via the channel to which said transmitter and receiver means is tuned.

27. A mobile station for use in a radio telephone system employing multiple communication channels via each of which said mobile station is capable of transmitting and receiving radio signals, said mobile station having a home channel on which it receives calls, said mobile station being characterized in that it is adapted for use in areas where its home channel is not available, said mobile station comprising:

means for detecting unavailability of the home channel of said mobile station;

means for establishing an alternate home channel; and tuning means responsive to unavailability of said home channel for automatically tuning said mobile station to said alternate home channel.

28. The mobile station according to claim 27:

wherein said alternate home channel carries a predetermined coded signal;

wherein said means for establishing an alternate home channel comprises a decoder arranged to recognize said predetermined signal when received at said mobile station;

and wherein said tuning means is responsive to unavailability of said home channel and no call in progress at said mobile station for successively tuning said mobile station to different channels until said predetermined coded signal is recognized by said decoder.

29. A multi-channel mobile radio-telephone system of the type wherein mobile subscriber stations are capable of initiating and receiving calls to and from both other mobile stations and stations in a public telephone system, wherein a base station serves as a relay link for all calls and is capable of transmitting and receiving signals via each of said channels, said base station communicating with a central office in said public telephone system via a plurality of telephone circuits, and wherein a plurality of mobile stations are each individually tunable to said channels for purposes of transmitting and receiving signals during calls, and wherein each mobile station is assigned a unique identification number, and system including:

one of said telephone circuits for each of said channels, each of said telephone circuits being dedicated to conducting calls for only one respective channel;

operator-actuable call-initiating means at each mobile station;

means at each mobile station responsive to actuation of said call-initiating means for automatically transmitting to said base station a coded identification signal representing the identification number of the mobile station;

a plurality of call metering circuits at said base station, one for each mobile subscriber station in said system;

decoding means at said base station for receiving and decoding identification signals received from calling mobile stations;

means for determining whether or not a metering circuit for a calling mobile station is present at said base station; and control means responsive to determination that a metering circuit for a calling mobile is present at said base station for enabling the calling mobile station to place a call.

30. The system according to claim 29 further comprising:

operator equipment at said base station for permitting an operator to transmit and receive signals and to initiate and receive calls on any selected channel; and means responsive to a determination that no metering circuit is present for a calling mobile station at said base station for automatically connecting said operator equipment to the channel on which the calling mobile station initiated its call.

31. The system according to claim 30 wherein said operator-equipment includes display means for automatically displaying the identification number of a calling mobile station which has no metering circuit at said base station.

32. The system according to claim 29 further comprising:

a plurality of memory circuits at said base station, one memory circuit for each mobile subscriber station of said system;

means responsive to initiation of a call at one of said mobile subscriber stations for storing an in-use indication in the memory circuit for that mobile subscriber station; and means for clearing the in-use indication from the memory circuit of a mobile subscriber station upon termination of a call to which that mobile subscriber station is a party.

33. In a multi-channel mobile radio-telephone system of the type wherein mobile subscriber stations are capable of initiating and receiving calls to and from both other mobile stations and stations in a public telephone system, wherein a base station serves as a relay link for all calls and is capable of transmitting and receiving signals via each of said channels. said base station communicating with a central office in said public telephone system via a plurality of telephone circuits, and wherein a plurality of mobile stations are each individually tunable to said channels for purposes of transmitting and receiving signals during calls, and wherein each mobile station is assigned a unique identification number, a method comprising the steps of:

in response to initiation of a call at each mobile station, automatically transmitting to said base station a coded identification signal representing the identification number of the mobile station;

decoding identification signals received at said base station from calling mobile stations;

determining whether or not a metering circuit for a calling mobile station is present at said base station; and in response to a determination that a metering circuit for a calling mobile is present at said base station, enabling the calling mobile station to place a call.

34. A multi-channel mobile radio telephone system of the type wherein mobile stations are capable of initiating and receiving calls to and from other mobile stations and stations in a public telephone system, wherein a base station serves as a relay-link for all calls and is capable of transmitting and receiving signals via each of said channels, wherein a plurality of mobile stations are each individually tunable to respective channels for purposes of transmitting and receiving signals during calls, said system being characterized by the absence of channel-switching at each mobile station when a call is not in progress at that station and in that each mobile station can initiate calls on any idle channel, said system comprising:

channel marker means at said base station for transmitting an idle marker signal on each channel on which no call is in progress; and selectively actuable call-initiating means at each mobile station for automatically seizing any idle channel upon actuation, said call-initiating means comprising:

means for automatically scanning said channels to detect the presence of said idle marker signal; and channel seizing means responsive to actuation of said call-initiating means for automatically tuning the mobile station to one of the channels on which said idle marker signal is detected;

wherein each mobile station is assigned a unique identification number;

wherein each mobile station includes means responsive to seizure of a channel by that mobile station for automatically transmitting the identification number of that mobile station in coded form to said base station;

wherein said mobile stations constitute system subscribers assigned to said base station; and wherein said base station includes:

ticketing means for each system subscriber for monitoring the time duration of at least subscriber-initiated calls;

means for removing said idle marker signal from a chanel seized by a calling mobile station;

logic means responsive to reception of a coded identification number on a channel seized by a calling mobile station for determining whether or not ticketing means is present at said base station for said calling mobile station; and means responsive to a determination that ticketing means is present at said base station for said calling mobile station for returning a dial tone signal to said calling mobile station via the channel seized by the calling mobile station.

35. The system according to claim 34 further characterized in that said base station communicates with said public telephone system via a number of telephone lines equal to the number of channels capable of conducting calls in said system.

36. The system according to claim 35 further comprising means for automatically printing out charges accumulated by said mobile station subscriber in utilizing said system.

37. The system according to claim 34 further comprising at said base station;

a meter for each of said mobile stations; and circuit means responsive to a call in progress initiated by a mobile station for actuating the meter for that mobile station.

38. The system according to claim 34 wherein said mobile stations each comprise:

tunable transmitter and receiver means capable of being tuned to each of said channels individually;

detector means responsive to signals received by said transmitter and receiver means for determining if the channel to which said transmitter and receiver means is tuned is idle or is carrying a call in process;

switch means actuable when a call is to be initiated from said mobile station;

control means responsive to actuation of said switch means for monitoring said detector means and, if the channel to which said transmitter and receiver means is tuned is carrying a call in progress, successively tuning said transmitter and receiver means to individual channels until an idle channel is determined by said detector means.

39. The system according to claim 38 further comprising at each mobile station: call recognition means, operative when said mobile station is not party to a call in process and responsive to reception of a predetermined identification code by said transmitter and receiver means, for applying a decode complete signal to said transmitter and receiver means for transmission via the channel to which said transmitter and receiver means is tuned.

40. The system according to claim 34 further comprising at said base station:

operator-actuable equipment to permit an operator to transmit and receive signals and to initiate and receive calls on any selected channel; and means responsive to a determination that no ticketing means is present for a calling mobile station at said base station for automatically connecting said operator-actuable equipment to the channel seized by said calling mobile station.

41. The system according to claim 40 wherein said operator-equipment includes display means for automatically displaying the identification number of a calling mobile station which has no ticketing means at said base station.

42. The system according to claim 34 wherein each mobile station includes means responsive to a dial tone on a channel seized by that mobile station for selectively transmitting to said base station the telephone number in coded form of a telephone station being called, wherein said base station includes means responsive to reception of a coded telephone number from a calling mobile station for removing dial tone from the channel seized by the calling mobile station and transmitting the received telephone number in coded form to the telephone station having the received telephone number.

43. The system according to claim 42 wherein said base station is connected to a plurality of call-carrying lines in said public telephone system, the number of lines being equal to the number of said channels, and wherein said base station includes:

means for detecting whether a received telephone number corresponds to a number in said public telephone system or to the identification number of another mobile station in said radio-telephone system; and means responsive to detection of a received telephone number in said public telephone system for initiating a call to the telephone corresponding to the received telephone number via one of said telephone lines.

44. The system according to claim 43 further comprising means at said base station responsive to detection of a received telephone number corresponding to the identification number of another of said mobile stations for transmitting that identification number in coded form to the corresponding mobile station.

45. The system according to claim 44 further comprising means for establishing a semi-duplex communication mode when one mobile station calls another mobile station in said system.

* * * * *